US012454825B2

(12) United States Patent
Macallen et al.

(10) Patent No.: US 12,454,825 B2
(45) Date of Patent: Oct. 28, 2025

(54) DIFFUSE LIGHTING SYSTEMS

(71) Applicant: MOLO DESIGN, LTD., Vancouver (CA)

(72) Inventors: Todd P. Macallen, Vancouver (CA); Stephanie J. Forsythe, Vancouver (CA)

(73) Assignee: MOLO DESIGN, LTD., Vancouver (CA)

( * ) Notice: Subject to any disclaimer, the term of this patent is extended or adjusted under 35 U.S.C. 154(b) by 244 days.

(21) Appl. No.: 18/345,720

(22) Filed: Jun. 30, 2023

(65) Prior Publication Data

US 2023/0349153 A1 Nov. 2, 2023

Related U.S. Application Data

(63) Continuation of application No. 17/577,571, filed on Jan. 18, 2022, now Pat. No. 11,718,986, which is a
(Continued)

(51) Int. Cl.
*F21V 3/02* (2006.01)
*E04B 2/74* (2006.01)
(Continued)

(52) U.S. Cl.
CPC .............. *E04B 2/7405* (2013.01); *F21S 4/26* (2016.01); *F21V 3/026* (2013.01); *F21V 33/006* (2013.01); *E04B 2002/7488* (2013.01)

(58) Field of Classification Search
CPC ................................. F21V 3/023; F21V 3/026
See application file for complete search history.

(56) References Cited

U.S. PATENT DOCUMENTS

| | | | |
|---|---|---|---|
| D45,539 | S | 3/1914 | Meyers |
| D97,213 | S | 10/1935 | Stone |

(Continued)

FOREIGN PATENT DOCUMENTS

| | | |
|---|---|---|
| CA | 2297822 | 2/1999 |
| CN | 103775872 | 5/2014 |

(Continued)

OTHER PUBLICATIONS

International Search Report issued in corresponding PCT Application No. PCT/CA2019/050227; Search completed Apr. 4, 2019.

(Continued)

*Primary Examiner* — Sean P Gramling
(74) *Attorney, Agent, or Firm* — Marks & Clerk; Wilfred P. So

(57) ABSTRACT

Light fixtures often have bright spots caused by the light sources that can be unpleasant or uncomfortable to look at. A light system is provided that diffuses the light. The light system includes a circular exterior body defining a void therein. A circular internal structure and an outer ring, which has a larger diameter than the circular internal structure, are positioned within the void. A plurality support pieces (for example, lines) extend radially from the circular internal structure to the outer ring. The internal structure comprises at least a web and a flange extending from the web, and one or more lights positioned thereon. The circular internal structure and the outer ring support the exterior body.

36 Claims, 49 Drawing Sheets

Related U.S. Application Data continuation-in-part of application No. 16/976,521, filed as application No. PCT/CA2019/050227 on Feb. 26, 2019, now Pat. No. 11,280,457.

(60) Provisional application No. 62/636,923, filed on Mar. 1, 2018.

(51) Int. Cl.

| | |
|---|---|
| ***F21S 4/26*** | (2016.01) |
| ***F21V 33/00*** | (2006.01) |

(56) References Cited

U.S. PATENT DOCUMENTS

| | | | | |
|---|---|---|---|---|
| D106,992 | S | 11/1937 | Schroeder | |
| D112,841 | S | 1/1939 | Manning | |
| D112,842 | S | 1/1939 | Manning | |
| D124,617 | S | 1/1941 | Strassburg | |
| D125,751 | S | 3/1941 | Biller | |
| D127,397 | S | 5/1941 | Johnston | |
| D141,068 | S | 5/1945 | Maurette | |
| 2,807,405 | A | 9/1957 | Lambert | |
| 3,600,572 | A | 8/1971 | Grunwald | |
| D236,999 | S | 9/1975 | Tongson | |
| D242,378 | S | 11/1976 | Leung | |
| D260,938 | S | 9/1981 | Zurcher | |
| 4,307,768 | A | 12/1981 | Anderson | |
| D286,445 | S | 10/1986 | Sink | |
| 4,654,767 | A | 3/1987 | Yamaguchi | |
| D294,648 | S | 3/1988 | Platner | |
| D455,516 | S | 4/2002 | Casciani | |
| 6,427,409 | B2 | 8/2002 | Colson | |
| D525,738 | S | 7/2006 | Waycaster | |
| D536,468 | S | 2/2007 | Crosby | |
| D536,820 | S | 2/2007 | Crosby | |
| D557,445 | S | 12/2007 | Blum | |
| D592,789 | S | 5/2009 | Sabernig | |
| 7,866,366 | B2 | 1/2011 | Macallen | |
| D658,801 | S | 5/2012 | Yon | |
| D659,887 | S | 5/2012 | Holder | |
| D668,371 | S | 10/2012 | Alpaslan | |
| D671,676 | S | 11/2012 | Komarov | |
| D690,051 | S | 9/2013 | Sabernig | |
| 8,561,666 | B2 | 10/2013 | Macallen | |
| D698,983 | S | 2/2014 | Rampolla | |
| 9,309,668 | B2 | 4/2016 | Macallen | |
| D761,991 | S | 7/2016 | Clark | |
| 9,394,686 | B2 | 7/2016 | Macallen | |
| D764,095 | S | 8/2016 | Clark | |
| D768,905 | S | 10/2016 | Sonneman | |
| D774,239 | S | 12/2016 | Pardo | |
| D783,197 | S | 4/2017 | Arndt | |
| D784,597 | S | 4/2017 | Wilson | |
| 9,689,161 | B2 | 6/2017 | Macallen | |
| 9,777,902 | B1 * | 10/2017 | Katterheinrich | F21V 17/12 |
| 9,797,134 | B2 | 10/2017 | Macallen | |
| 11,280,457 | B2 | 3/2022 | Macallen | |
| 11,718,986 | B2 | 8/2023 | Macallen | |
| 2006/0082987 | A1 | 4/2006 | Dorsey | |
| 2007/0017172 | A1 | 1/2007 | Kennedy | |
| 2007/0247842 | A1 | 10/2007 | Zampini | |
| 2013/0098567 | A1 | 4/2013 | Ashelin | |
| 2014/0153257 | A1 | 6/2014 | Smith | |
| 2015/0204506 | A1 | 7/2015 | Wu | |
| 2015/0260361 | A1 | 9/2015 | Cho | |
| 2015/0300605 | A1 | 10/2015 | Clark | |
| 2016/0178135 | A1 | 6/2016 | Xu | |
| 2016/0245488 | A1 | 8/2016 | Clark | |
| 2017/0248286 | A1 | 8/2017 | Wouters | |
| 2017/0268752 | A1 | 9/2017 | Horvath | |
| 2018/0142863 | A1 | 5/2018 | Cho | |
| 2018/0334804 | A1 | 11/2018 | Patterson | |
| 2019/0088241 | A1 | 3/2019 | Czech | |
| 2019/0106883 | A1 | 4/2019 | Moore | |
| 2021/0048157 | A1 | 2/2021 | Macallen | |
| 2021/0071853 | A1 | 3/2021 | Tiessen | |
| 2021/0090542 | A1 | 3/2021 | Elmvang | |
| 2022/0136239 | A1 | 5/2022 | Macallen | |

FOREIGN PATENT DOCUMENTS

| | | |
|---|---|---|
| CN | 104180248 | 12/2014 |
| CN | 206875223 | 1/2018 |
| JP | S4987173 | 8/1974 |
| JP | H0520204 | 1/1993 |
| JP | H06299629 | 10/1994 |

OTHER PUBLICATIONS

"First Step Soft Housing"; published online as of Nov. 6, 2003; archived at Internet Archive Wayback Machine; URL: <https://web.archive.org/web/20031106051417/http:/www.commonground.org/org_info/media/press_releases/soft.jpg>.

"Collection of Winning Works of DBEW International Design Competition"; Design Beyond East & West; Mar. 2004 Tianjin University Press; China.

"Golden Prize"; DBEW International Design Competition 2004; published online as of May 9, 2004; archived at Internet Archive Wayback Machine; URL: <at https://web.archive.org/web/20040509111623/http:/www.hanssemcompe.com:80/english/PRI/2003/2003_gp02.asp>.

"LED installation guide for softwall + softblock modular system"; Molo Design, Ltd.; published Feb. 22, 2011.

"Molo design photos"; Facebook.com; retrieved Jun. 16, 2021; published Jul. 15, 2014; URL: <https://www.facebook.com/molodesign/photos/a.10150653000854321/10152554531114321/?type=3&theater> by Molo Design, Ltd.

"Molo design photos—Softwall Paper Honeycomb Partition"; Facebook.com; retrieved Jun. 16, 2021; published Nov. 4, 2014; URL: <https://www.facebook.com/molodesign/photos/a.10150108302379321/10152827249179321/?type=3&theater> by Molo Design, Ltd.

"Molo design photos"; Facebook. com; retrieved Jun. 16, 2021; published Nov. 16, 2015; URL: <https://www.facebook.com/molodesign/photos/a.10150108302379321/10153727221904321/?type=3&theater> by Molo Design, Ltd.

"Lalhaveli Antique Pendant Ceiling Light Paper Vintage"; Amazon.com; retrieved Dec. 12, 2022; published Jan. 1, 2016; URL: <https://www.amazon.com/Lalhaveli-Antique-Pendant-Ceiling-Vintage/dp/B01DY5YYGS>.

2007 installation of molo product; photo taken 2007.

* cited by examiner

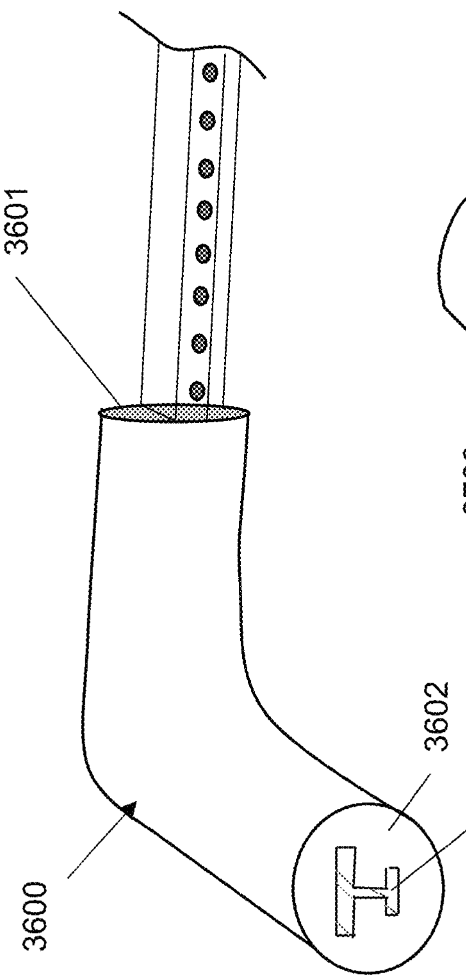
FIG. 36
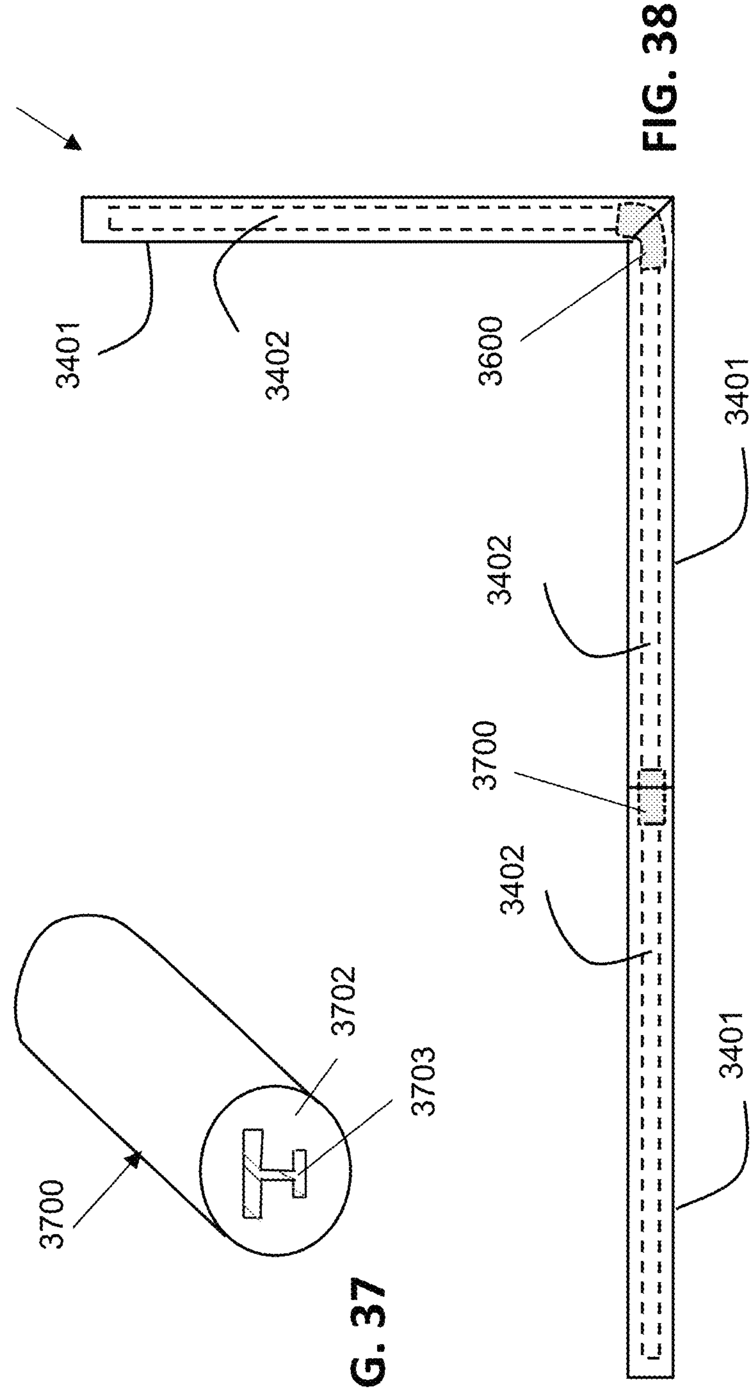
FIG. 37
FIG. 38

DIFFUSE LIGHTING SYSTEMS

CROSS-REFERENCE TO RELATED APPLICATIONS

This application is a Continuation of U.S. patent application Ser. No. 17/577,571 filed on Jan. 18, 2022 and titled "Hanging Wall Systems With Diffuse Lighting", which is a Continuation-In-Part of U.S. patent application Ser. No. 16/976,521 filed on Aug. 28, 2020 and titled "Diffuse Lighting Systems", which is a national phase entry of International PCT Application No. PCT/CA2019/050227 filed on Feb. 26, 2019 and titled "Diffuse Lighting Systems", which claims priority to U.S. Provisional Patent Application No. 62/636,923 filed on Mar. 1, 2018 and titled "Diffuse Lighting Systems", the entire contents of which are hereby incorporated by reference.

TECHNICAL FIELD

The following generally relates to diffuse lighting systems.

DESCRIPTION OF THE RELATED ART

Lighting systems are used to illuminate a space, such as a room. Lighting systems are a staple product used in domestic, working and public environments. Lighting systems can be hung from an overhead structure, such as a ceiling, or mounted to a wall, or supported from a movable base.

Lighting systems typically include light bulbs or light emitting diodes (LEDs) that form points of light. To diffuse the light being emitted, it is typical to use light shades. These light shades can be made from cardboard, plastic, colored or stained glass, etc. Examples of light shades include lamp shades. Light shades or lamp shades are commonly used in light fixtures, pendant lights, chandeliers, hanging lights, and floor lamps.

It is herein recognized that, even with light shades, the light is not even distributed across the light shade. A person can see a point source of light, although its point source is somewhat diffused. In other words, the portion of the light shade surface that is closest to the light bulb or LED is significantly brighter than other portions of the light shade surface. Diffusing a point source of light with a light shade is even more difficult if the light shade has holes or apertures.

Moreover, illuminating a larger space becomes more difficult. For example, using a single light source (e.g., one light bulb or one LED) creates a very bright point of light. It is very difficult to diffuse a single light source using a light shade that is intended to be bright enough to light an entire room. Typically, such a light source would also generate heat, which could potentially cause a fire hazard.

Many points of lights, for example many light bulbs or LEDs, could be incorporated into a lighting system used to illuminate a large space more evenly. However, these multiple points of light could also potentially cause a fire hazard as they generate a lot of heat in aggregate. It is further recognized that the light emitted these multiple points of light may also be difficult to diffuse, so as to generate a "look" or a perception that the lighting system is a single large light source.

It is also herein recognized that the larger the lighting system, typically the larger the physical structure is used to support the lighting system. For example, lighting fixtures for large ceiling chandeliers can include large metal rings with spokes to hold up a ring of light bulbs. Therefore, a large-sized light system can be very heavy. Typically, the larger the light system, the more difficult it is to pack and transport. For example, many larger light systems have a voluminous rigid framework that is cumbersome, or costly, or both, to transport. These larger light systems would also require significant storage space and would be difficult to setup and takedown.

It also recognized that, as a result of the inconvenient transport, storage, setup, or takedown, or combinations thereof, these larger lighting systems are not well suited for illuminating open plan areas that are temporarily purposed (e.g., temporary display areas, temporary work places, temporary meeting areas, retail rooms, theatrical settings, etc.).

The above disadvantages are herein recognized.

BRIEF DESCRIPTION OF THE DRAWINGS

Example embodiments of a diffuse lighting system will now be described by way of example only with reference to the accompanying drawings in which:

FIG. 36 is a perspective view of an elbow connector that has ends for connecting to two internal structures, according to another example embodiment.

FIG. 37 is a perspective view of a linear connector that has ends for connecting two internal structures, according to another example embodiment.

FIG. 38 is a top view of the vertically oriented lighting panels of FIG. 34 fastened together, and further showing the elbow connector of FIG. 36 and the linear connector of FIG. 37.

DETAILED DESCRIPTION

Figure 1:
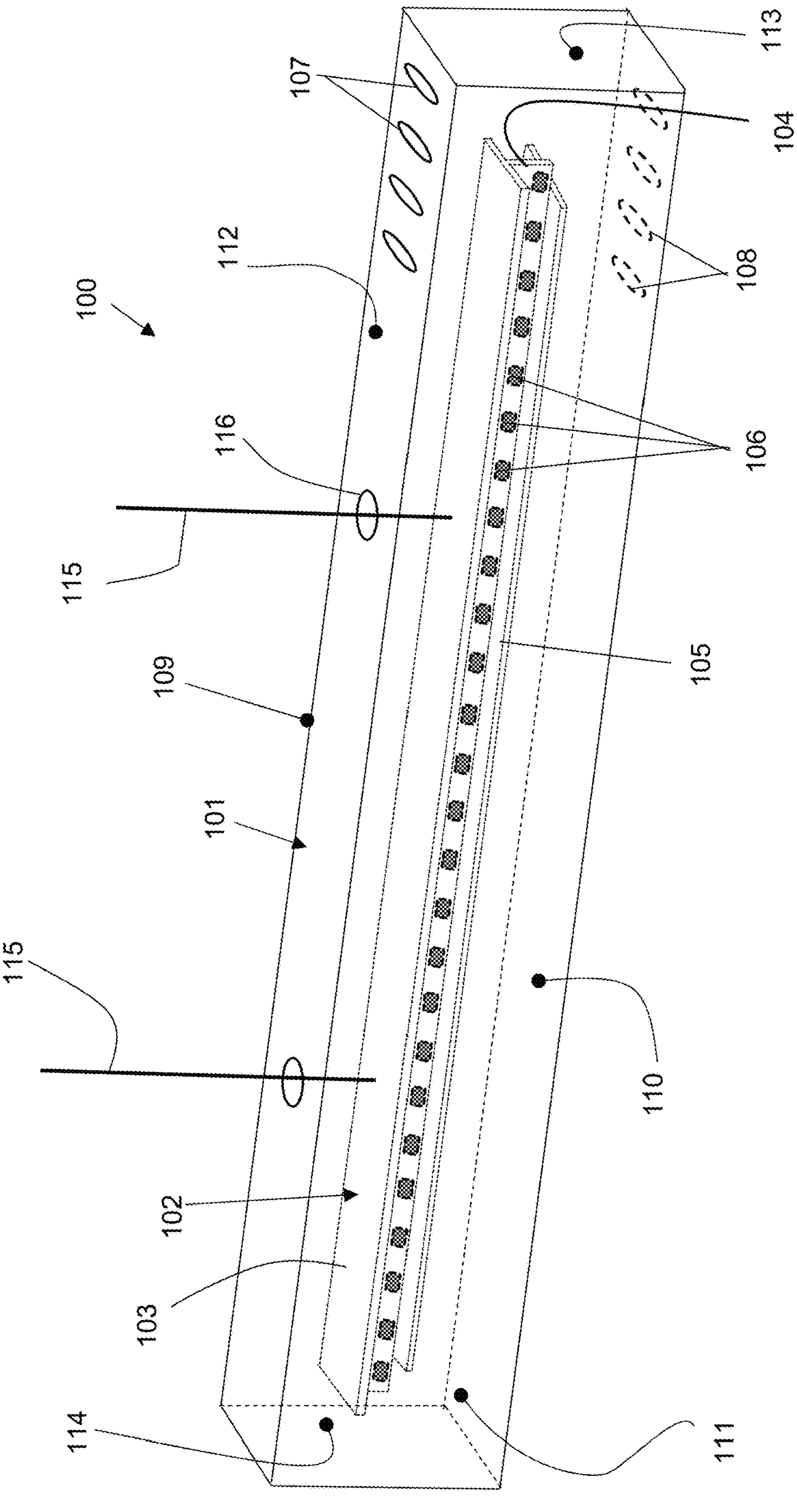
FIG. 1 is a perspective view of an example embodiment of a hanging lighting system, showing an internal supporting structure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Turning to FIG. 1, an example embodiment of a lighting system 100 is shown. It includes an exterior body 101 that houses within it an internal supporting structure 102. In particular, the exterior body 101 defines an interior space or cavity, and the internal supporting structure 102 is positioned within this interior space. The internal supporting structure 102 supports the exterior body 101. This support could be implemented in various ways. For example, an interior surface of the exterior body 101 rests on the internal supporting structure 102. In another example, the exterior body has a frame (not shown) and the frame rests on the internal supporting structure 102, or the frame is joined or attached to the internal supporting structure 102.

The exterior body 101, in this example, has a top surface 109, a bottom surface 110, two opposite side surfaces 111, 112, and two opposite end surfaces 113, 114. In an example embodiment, these surfaces are translucent. The surfaces can have holes or apertures defined therein to allow for light to pass through the surfaces. The holes or apertures in these surfaces also allow air to pass into and out of the exterior body 101, which facilitates convective heat transfer from the one or more light elements 106 on the internal supporting structure 102.

For example, the holes 107 are positioned on the top surface 109 and the holes 108 are positioned on the bottom surface 110, and the opposite side surfaces 111, 112 do not have holes. Although not shown, in other embodiments, the holes can be positioned all along the length of the exterior body 101, on its top surface and on its bottom surface. Therefore, light rays from the lights 106 positioned on the web 104 of the internal supporting structure 102 reflect off or pass through different internal surfaces, or both, before passing through the holes in the top surface or the bottom surface. For example, some light reflects off a given flange of the internal supporting structure 102 (if the flange is opaque); some light passes through a given flange of the internal supporting structure 102 (if the flange is translucent); or some light reflects off the internal surfaces of the exterior body; or a combination thereof, before passing through the holes. Some other light rays from the lights 106 transmit and scatter as it passes through the side walls 111, 112 of the exterior body 101.

It can be appreciated that the placement, shape, and number of holes can vary according to the design of the lighting system. In the example shown in FIG. 1, there are also holes 116 in the top surface 109, through which support cables or support rods 115 pass through. For example, one end of each given support cable or support rod is connected to the internal supporting structure 102 and the other end of each given support cable or support rod is connected to an overhead structure (e.g., a ceiling structure, a truss, a beam, etc.).

It will be appreciated that the shape and dimensions of the exterior body 101 can vary from what is shown in the figures provided herein according to design. It can be appreciated that there are many configurations of the exterior body that have a void for an internal structure (e.g., panels joined at edges, a frame with a covering material mounted thereon, cellular structures, etc.).

The surfaces that make the exterior body 101 can be made of various materials that are opaque or translucent. Whilst a translucent material is preferred, it will be apparent that opaque or different colored materials may also be utilized. If the surfaces are opaque, then holes or apertures would be needed to allow light to emit from the lighting system. Examples of surface materials include, but are not limited to, plastics, woven fabrics, non-woven fabrics, glass, paper, paper composites, and fabric composites. For example, the material under the trade name Tyvek from DuPont could be used to form the surfaces of the exterior body 101.

In an alternative example embodiment (not shown in FIG. 1), there are no holes in surfaces of the exterior body.

Continuing with FIG. 1, the internal supporting structure 102 is rigid and shaped as an I-beam. It includes an upper horizontal element, also called a flange 103, a vertical element, also called a web 104, and a lower horizontal element, also called a flange 105. In the example shown, the upper flange 103 and the web 104 are integrally formed, forming T-channel or T-beam, and the lower flange 105 is attached or fixed to the web 104. In an alternative example embodiment, these three elements of the I-beam are integrally formed. In another alternative example, each of these three elements are attached or fixed together to form the I-beam.

Lights 106 are mounted to the web 104. For example, a series of LEDs are adhered or attached in some other manner to the sides surface (or surfaces) of the web 104. In another example, a series of other types of lights (e.g., incandescent, fluorescent, etc.) are mounted to the web 104. In another example embodiment, a long light source is mounted to a side surface of the web 104, or two long light source are respectively mounted to the two side surfaces of the web 104. For example, the long light source extends along the entire length of the web 104, or extends along the majority of the length of the web 104. For example, the long light source is a fluorescent tube. In another example, the long light source is a strip of organic light emitting diode. It will be appreciated that other types of currently known and future known light sources can be applied to the lighting systems described herein.

In an example embodiment, the upper flange 103 and the web 104 are opaque, and the lower flange 105 is translucent.

In another example embodiment, both the upper flange 103 and the lower flange 105 are opaque. The web 104 is translucent, transparent or opaque.

In another example embodiment, both the upper flange 103 and the lower flange 105 are translucent. The web 104 is translucent, transparent or opaque.

In another example embodiment, the upper flange 103 is translucent and the lower flange 105 is opaque. The web 104 is translucent, transparent or opaque.

In an example aspect, the upper flange 103 or the lower flange 105, or both, are colored to match the same color, or to be a similar color, as the color of the exterior body 101. In this way, when an observer looks at the lighting system, it is difficult to see or notice the internal supporting structure housed within the exterior body.

Figure 2:
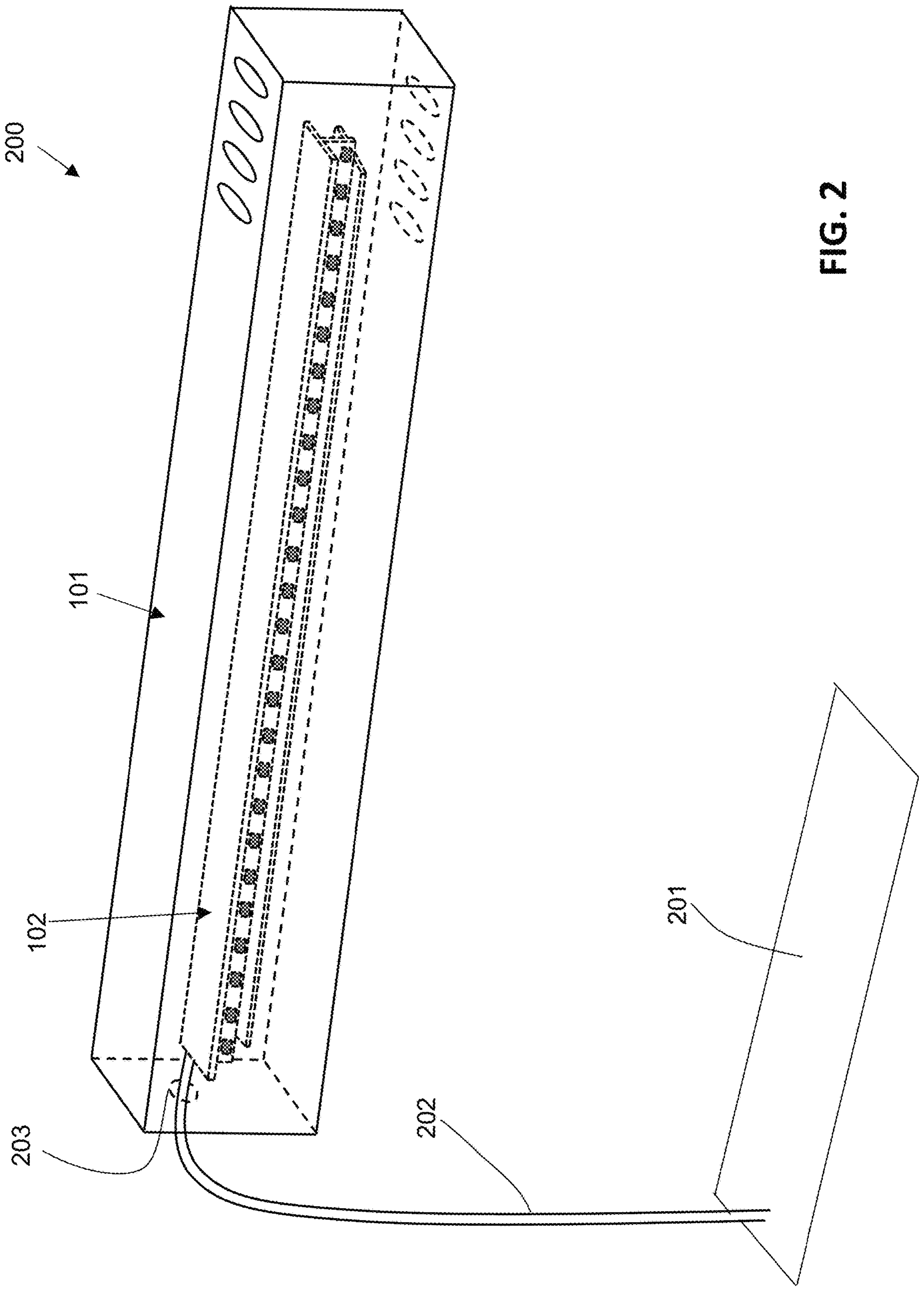
FIG. 2 is a perspective view of another example embodiment of a lighting system with a supporting arm connected to an internal supporting structure.

FIG. 2 shows a variant of the lighting system in FIG. 1, but the lighting system 200 shown in FIG. 2 is instead supported using an armature 202 that is joined or fixed to the internal structure 102. The armature 202 is connected to a base 201 that sits on a floor or other surface, and the armature 202 passes through a hole or opening 203 in the surface of the exterior body 101.

There are variants to the shape and the configuration of the internal supporting structure. Examples of these variants are described below. There are also variants to the shape and configuration of the external body, and examples of these variants are described below. It will be appreciated that different combinations of internal supporting structures and external bodies are applicable to the principles described herein, even if these combinations are not explicitly described herein.

FIGS. 3 to 7 show various examples of internal structures in isolation, which are shaped as an I-beam, that could be used in a lighting system.

Figure 3:
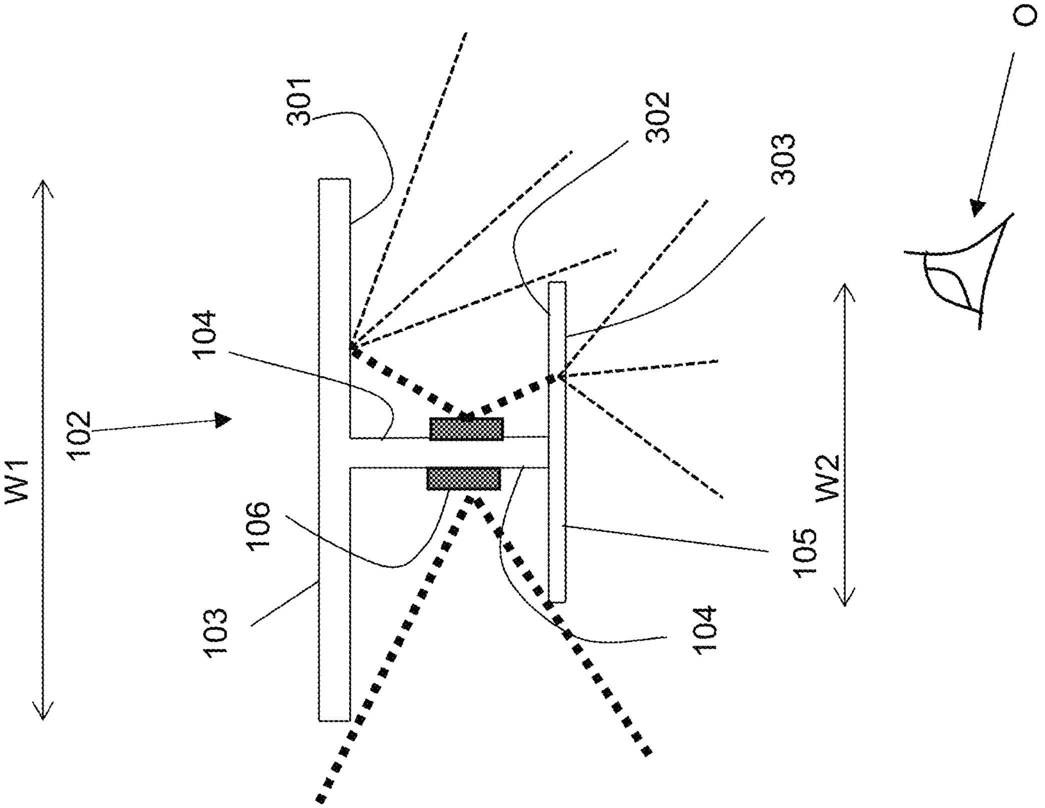
FIG. 3 is a front view or rear view of an example of an internal supporting structure shown in isolation, and that includes lights and translucent surfaces.

FIG. 3 shows the example embodiment of the internal structure 102 as illustrated in the lighting systems of FIGS. 1 and 2. As can be seen from the front view or rear view in FIG. 3, there are lights 106 positioned on both sides of the web 104. Dotted lines show example rays of light that are emitted from the lights 106. For example, light rays are emitted from the lights 106 and some of the light rays pass through a translucent material of the lower flange 105. In particular, as light rays enter through the top surface 302 of the lower flange 105 and exits through the lower surface 303 of the lower flange 105, the light rays scatter and are diffused. In this way, as an observer (O) is positioned below and looks up at the lighting system, even when looking at the location of the lights 106, there are no intense bright points of light. The light is further diffused as it passes through the material of the exterior body 101.

In an example embodiment, the flange 105 is a translucent glass or a translucent plastic. Other translucent materials may be used.

In an example embodiment, the translucent material of the flange allows less light to pass through compared to the amount of light that is able to pass through the material of the exterior body. Or, in other words, the material of the exterior body is more translucent than the material of the flange 105.

In an alternative embodiment, the material of the exterior body is equally translucent to the material of the flange 105.

In yet another alternative embodiment, the material of the exterior body is less translucent compared to the material of the flange 105. For example, the exterior body is opaque and includes holes to allow for light to pass through.

In an example embodiment, the flange 105 is colored to be the same color or have a similar color shade as the exterior body 101. In another example embodiment, the flange 105 has a different color compared to the color of the exterior body. In another example embodiment, the flange 105 does not have a color per se, such as the appearance or effect of frosted glass. The frosted glass effect is not necessarily produced using glass, but can also be achieved by other materials, such as by films or coatings, or a combination thereof.

Continuing with FIG. 3, the upper flange 103 and the web are opaque. The lower surface 301 of the upper flange 103 has an uneven surface or a textured surface in order to scatter the light rays that hit it, and to at least partially reflect the scattered light waves downwards to the observer (O). For example, the lower surface 301 has a powder coated surface which includes numerous and very small bumps that scatter the light rays. The texture of the power coated surface reduces the sheen of the light rays and reduces the hot spots. In another example, the texture of the lower surface 301 is produced by mechanically "roughing" the surface. This can be done by making imprints or scratches on the lower surface 301. These numerous and small undulations and angled surfaces scatter the light rays that hit the lower surface 301. In another example embodiment, another type of textured coating is sprayed or adhered to the lower surface. It is appreciated that there are other ways to manufacture an uneven or textured surface. In an example aspect, the surfaces of the web are also uneven or textured.

The width W1 of the upper flange 103 is wider than the width W2 of the lower flange 105. This allows more light rays to be cast downwards. In another example aspect, as best seen in the perspective views of FIG. 1 and FIG. 2, the length of the lower flange 105 is shorter than the length of the upper flange 103. This also allows more light rays to be cast downwards. In another example embodiment, the widths W1 and W2 are equal.

As can be seen from FIG. 3, the majority of the light is cast downwards in an evenly diffused manner. Therefore, when this internal supporting structure is used with an exterior body, from the perspective of the observer, the entire lighting system appears to be evenly illuminated. The visual effect of evenly distributed lighting is also achieved with very large-sized lighting systems.

Furthermore, the web 104 and the upper flange 103 are made of thermally conductive material (e.g., a metal or metal alloy) that functions as a heat sink. In particular, the lights 106 mounted or positioned on the sides of the web 104 generate heat, and this heat is conducted through the web 104 and the upper flange 103. As air passes over the large surface area of the web 104 and the upper flange 103, the heat is transferred from the internal supporting structure 102 to the surrounding air by convection. This removes effectively removes heat from the lights 106 and reduces or avoids thermal hots spots on the internal structure 102. In particular, the heat is evenly distributed across the web and across the upper flange. In turn, the reduction of hot spots reduces fire hazards. For example, if paper, textile or fabric material in the exterior body is positioned near the internal supporting structure 102 or touches the internal supporting structure 102, then it is even more important that there are no hot spots that could burn the paper, textile or fabric materials.

Similar principles and features are shown in the examples of FIGS. 4 to 7.

Figure 4:
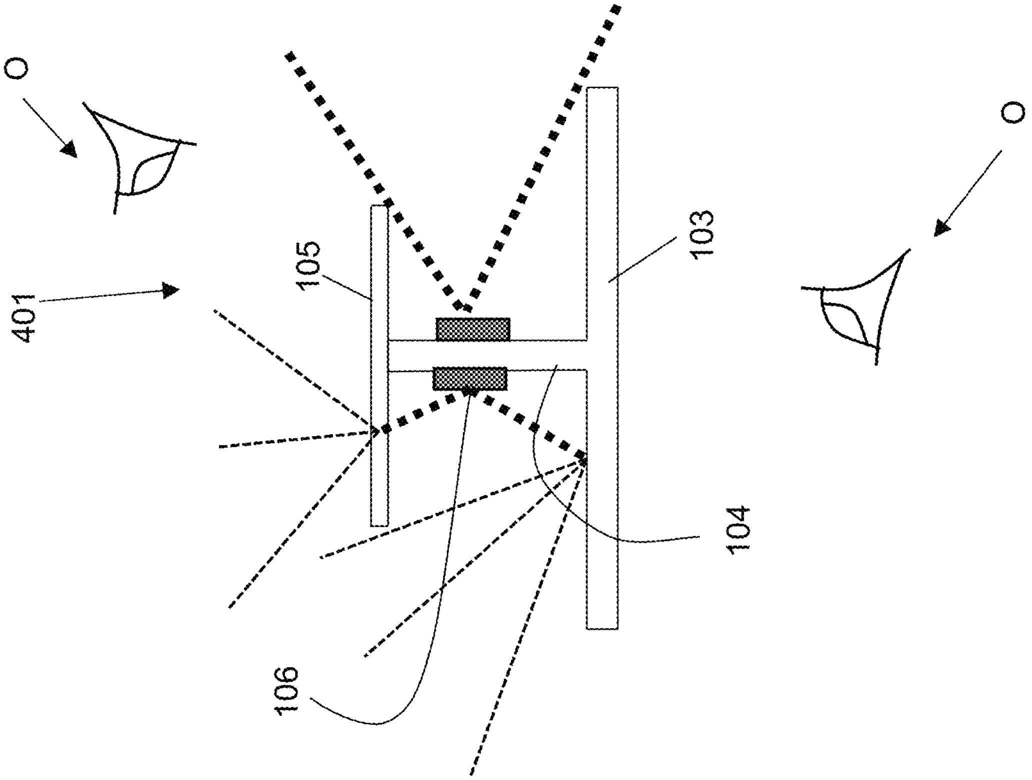
FIG. 4 is a front view or rear view of an example of another internal supporting structure shown in isolation. The supporting structure in FIG. 4 is oriented upside-down relative to the embodiment shown in FIG. 3.

In FIG. 4, the internal supporting structure 401 is very similar to the internal supporting structure 102, but flipped upside down. As a result, the observer (O) positioned below the internal supporting structure 401 sees less light being cast downwards. Using the internal supporting structure 401, more light is cast or directed upwards. This may be desirable to provide up-lighting. For example, it is also understood that an observer (O) may be positioned above the lighting system and that it is also desirable to reduce the bright spots seen by an observer positioned overhead. Consider a multi-level open-air atrium in which a lighting system is positioned mid-way between two levels, and there are observers positioned on the second level above the lighting system. The lighting system having the internal supporting structure 401 provides up-lighting to the second level while being pleasing to eyes of those observers on the second level.

Figure 5:
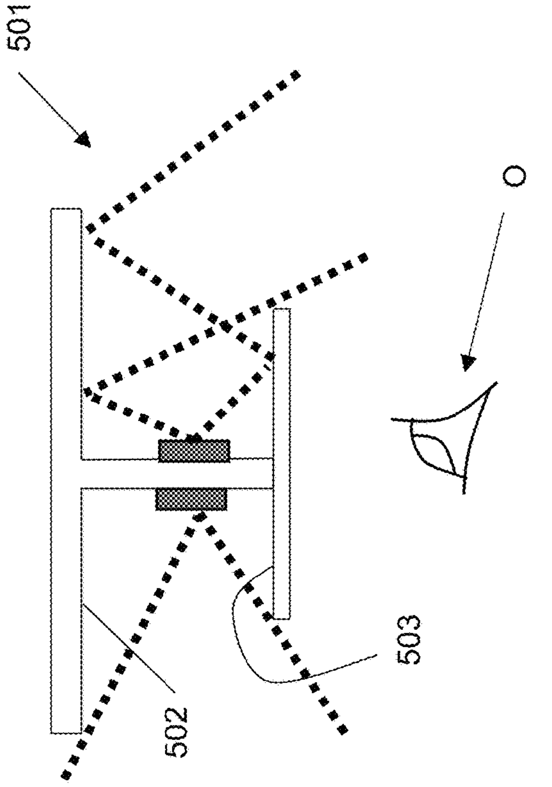
FIG. 5 is a front view or rear view of an example of another internal supporting structure shown in isolation, and that includes lights and reflective surfaces.

In FIG. 5, another example of an internal supporting structure 501 is shown. While similar in shape to the internal supporting structure 102, the materials or surfaces, or both, are different. The upper surface 503 of the lower flange and the lower surface 502 of the upper flange are opaque. In example embodiment, these surfaces 502 and 503 are reflective surfaces. For example, these surfaces 502 and 503 are a reflective metal surface, a mirrored surface, a reflective coating, etc. These reflective surfaces are not textured. In another example embodiment, these reflective surfaces are textured, which would scatter the light rays. The lower flange in FIG. 5 has a smaller width relative to the upper flange, which allows more light to be cast downwards.

Figure 6:
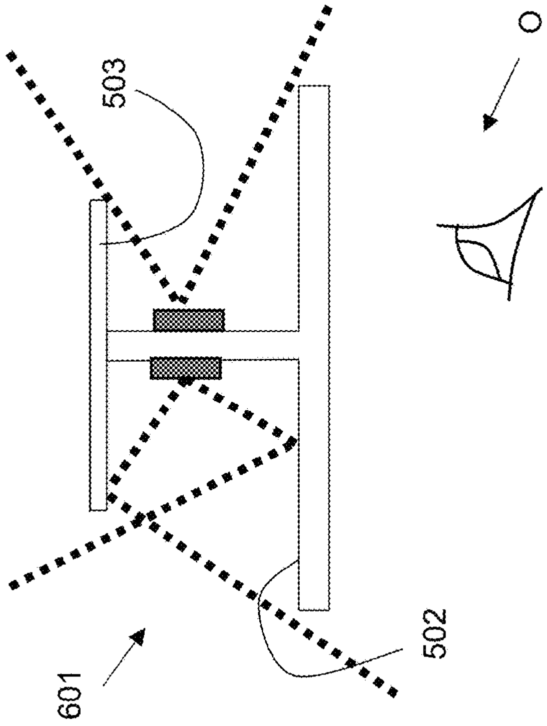
FIG. 6 is a front view or rear view of an example of another internal supporting structure shown in isolation. The supporting structure in FIG. 6 is oriented upside-down relative to the embodiment shown in FIG. 5.

FIG. 6 shows another example of an internal supporting structure 601, which is the same as the internal supporting structure 501, but oriented upside down. In this way, more light is cast upwards since the lower flange is wider than the upper flange.

Figure 7:
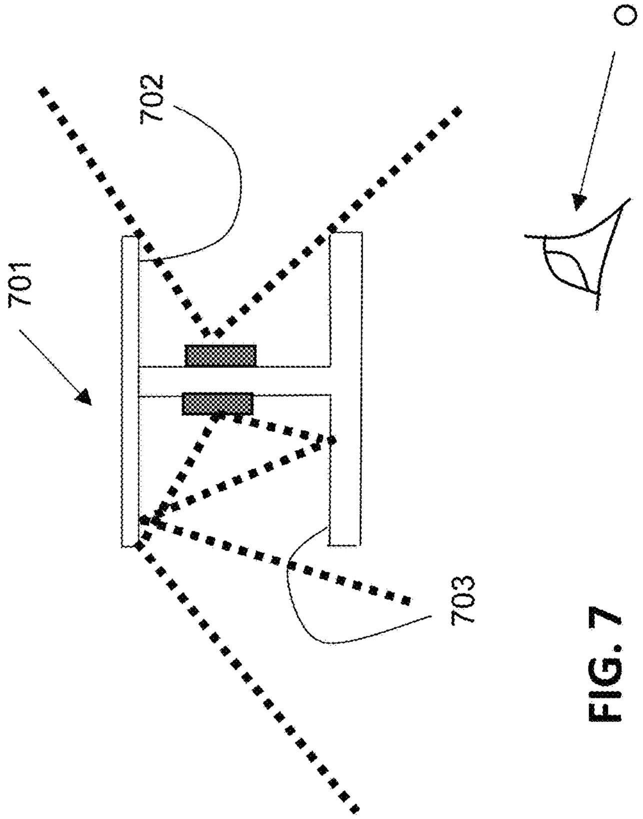
FIG. 7 is a front view or rear view of an example of another internal supporting structure shown in isolation, and that includes upper and lower reflective surfaces of substantially the same width.

FIG. 7 shows another example of an internal supporting structure 701 which includes an upper flange with a lower surface 702 that is reflective, and a lower flange with an upper surface 703 that is reflective. The upper flange and the lower flange are of the same width.

While it is preferred that an exterior body be used in combination with the internal supporting structures described herein, in other example embodiments, there is no exterior body. In other words, a given internal supporting structure is used by itself and it is not further covered or obstructed.

In other example embodiments, a different covering or shading (e.g., an exterior body) is used with a given internal supporting structure to further diffuse the light. In yet another alternative example, a given internal supporting structure is positioned within an exterior body, but the exterior body is supported by some other means (e.g., wires or another structure) instead of by the internal supporting structure that has the lights.

In other words, a given internal supporting structure can also be utilized so that it is not "internal" relative to a covering body, or the structure is not "supporting" a covering body, or both.

It is also appreciated that, whilst many of the examples show the lights positioned on the web of an internal structure, the lights may alternatively or additionally be positioned on one or more flanges.

Figure 8:
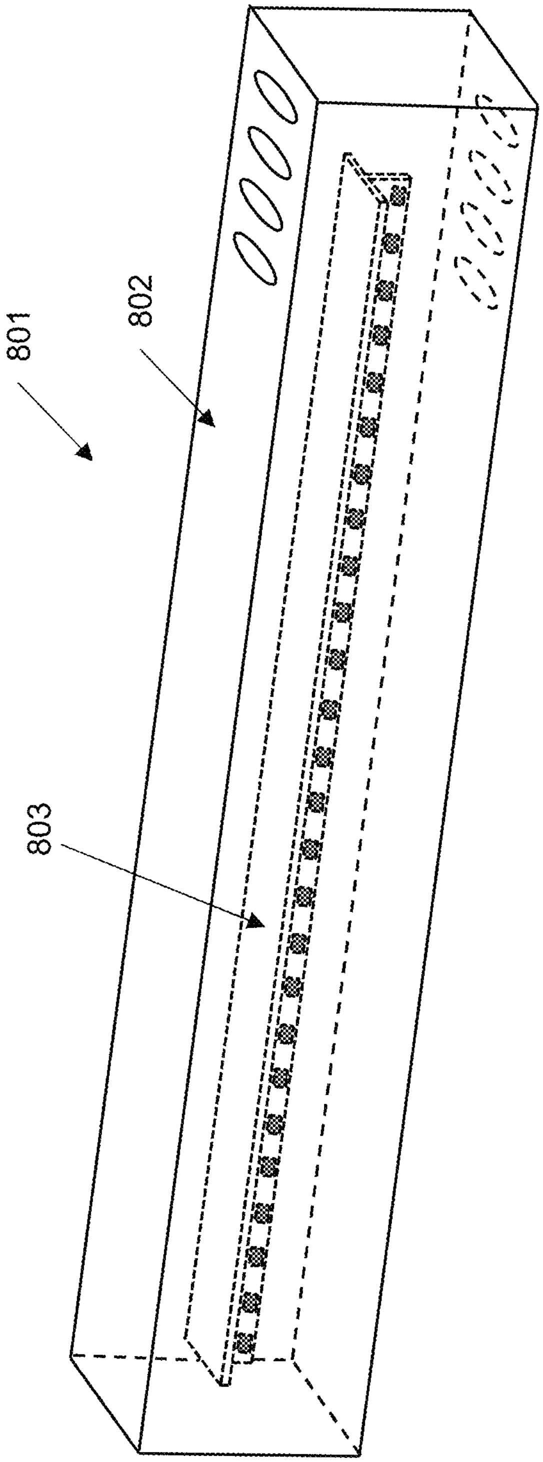
FIG. 8 is a perspective view of another example of a lighting system with a T-shaped internal structure.
Figure 9:
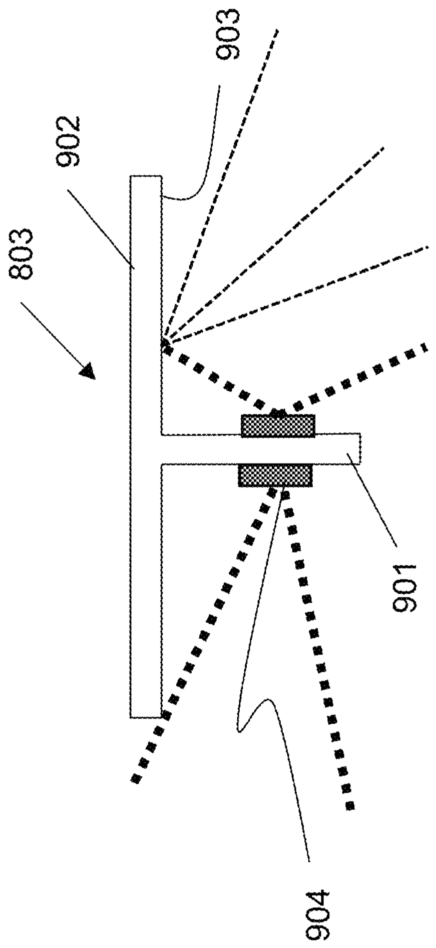
FIG. 9 is a front view or a rear view of the T-shaped internal structure of FIG. 8, but shown in isolation.

Turning to FIGS. 8 and 9, another example embodiment of a lighting system 801 is shown. It includes an exterior body 802 and an internal structure 803, which is shown in isolation in FIG. 9. The internal structure 803 is a T-shaped beam that includes an upper flange 902 and a vertical web 901 that protrudes from the middle, or near the middle, of the width of the upper flange 902. Light sources (e.g., light bulbs, LEDs, etc.) 904 are, or an elongate light strip is, positioned along each side surface of the web 901. The lower surfaces 903 of the upper flange 903 is, for example, an opaque surface that is textured or uneven, so as to scatter the light rays. Examples of textured surfaces or uneven surfaces were described with respect to the flange 103 in FIG. 3.

Figure 10:
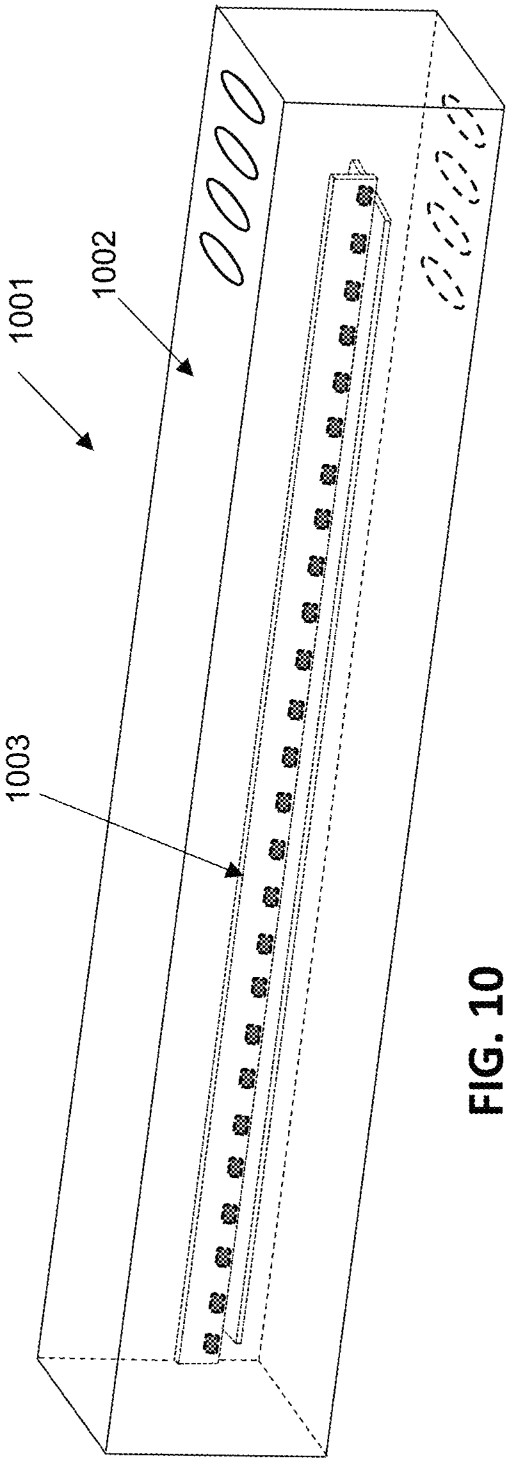
FIG. 10 is a perspective view of another example of a lighting system with an upside-down oriented T-shaped internal structure.
Figure 11:
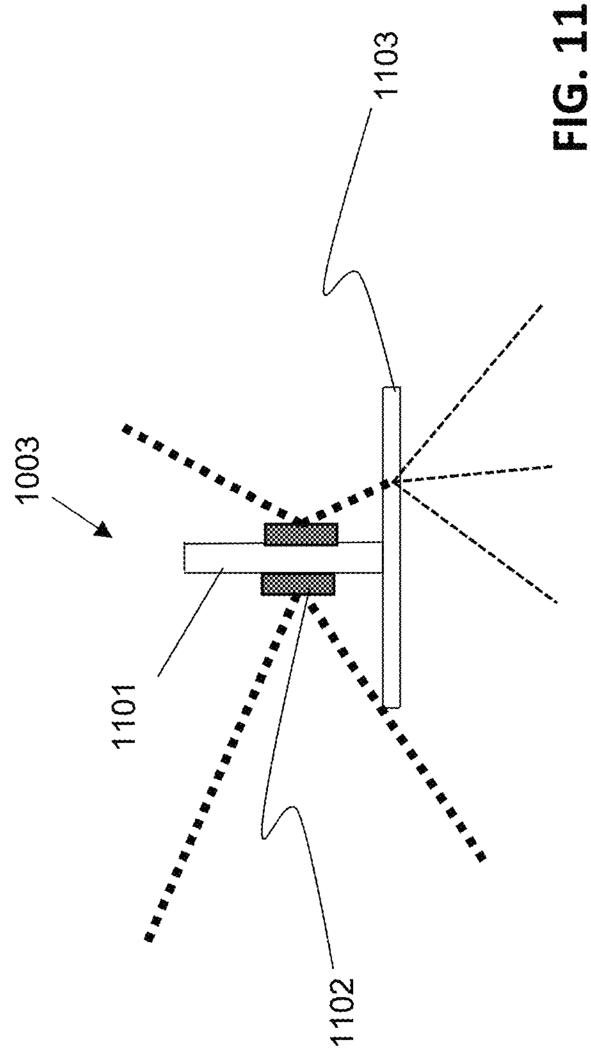
FIG. 11 is a front view or a rear view of the upside-down oriented T-shaped internal structure of FIG. 10, but shown in isolation.

FIGS. 10 and 11 show another example embodiment of a lighting system 1001. It includes an exterior body 1002 and an internal structure 1003, which is shown in isolation in FIG. 11. The internal structure 1103 is an upside down T-shaped beam that includes a lower flange 1003 and a vertical web 1101 that protrudes from the middle, or near the middle, of the width of the lower flange 1103. Light sources (e.g., light bulbs, LEDs, etc.) 1102 are positioned along each side surface of the web 1101, or an elongate light strip is positioned along each side surface of the web 1101. The lower flange 1103 is a translucent material. Examples of translucent materials and example characteristics of different translucent materials are described above with respect to the flange 105 in FIG. 3.

Figure 13:
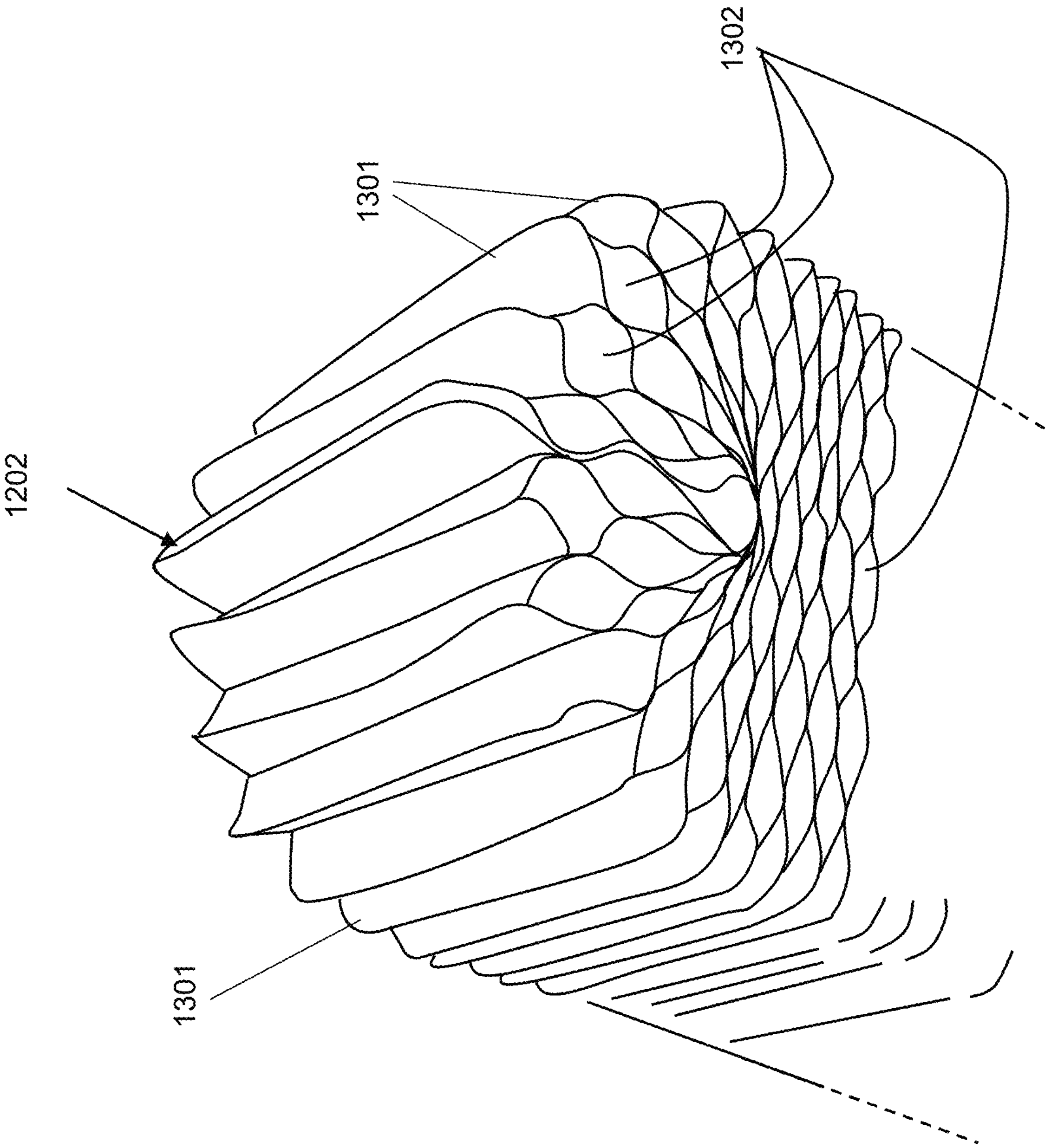
FIG. 13 is a bottom perspective view of a portion of the lighting system shown in FIG. 12.
Figure 14:
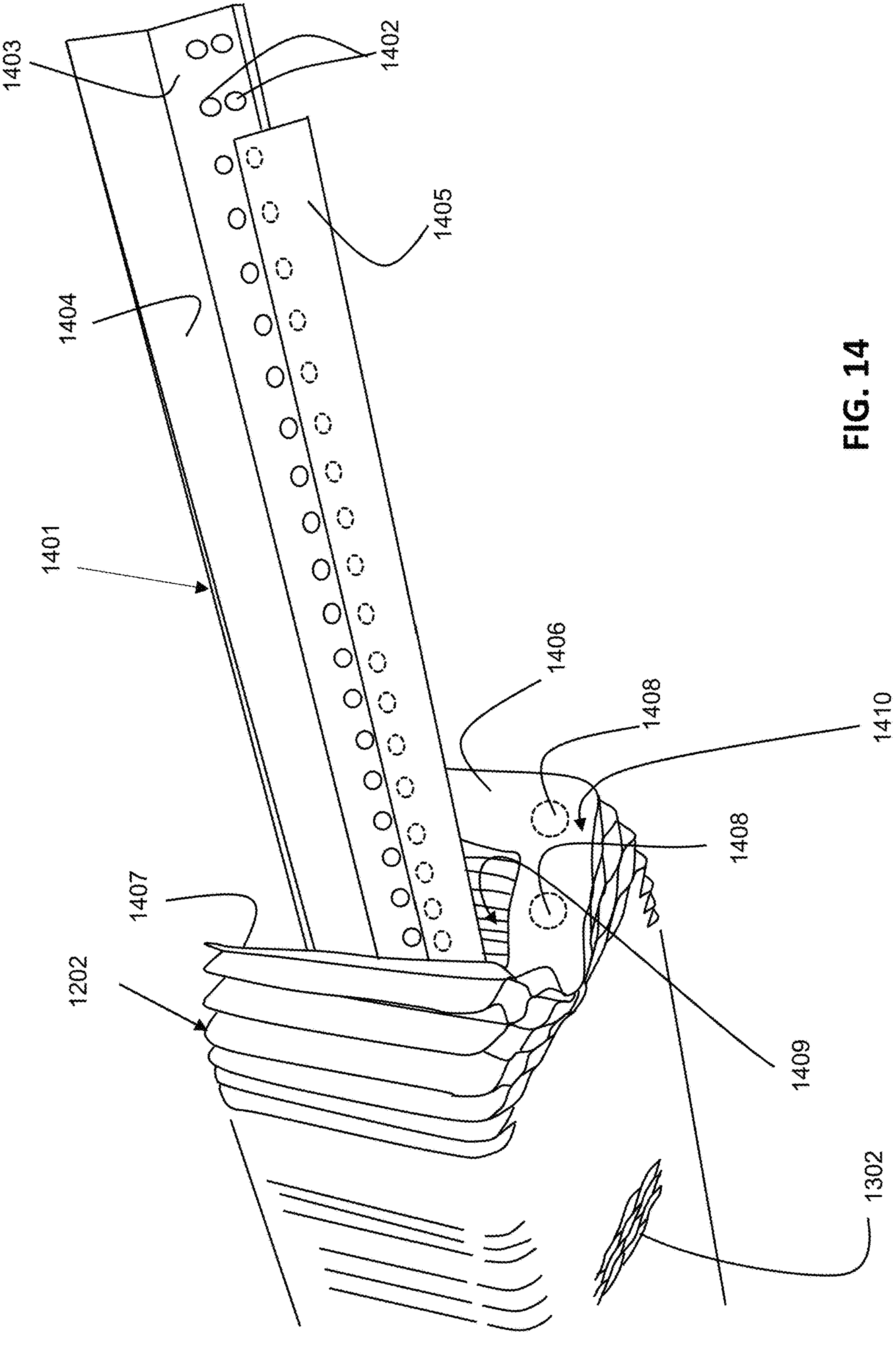
FIG. 14 is a perspective view of the lighting system shown in FIG. 12, and with the flexible light shade pulled back to show an internal structure.
Figure 15B:
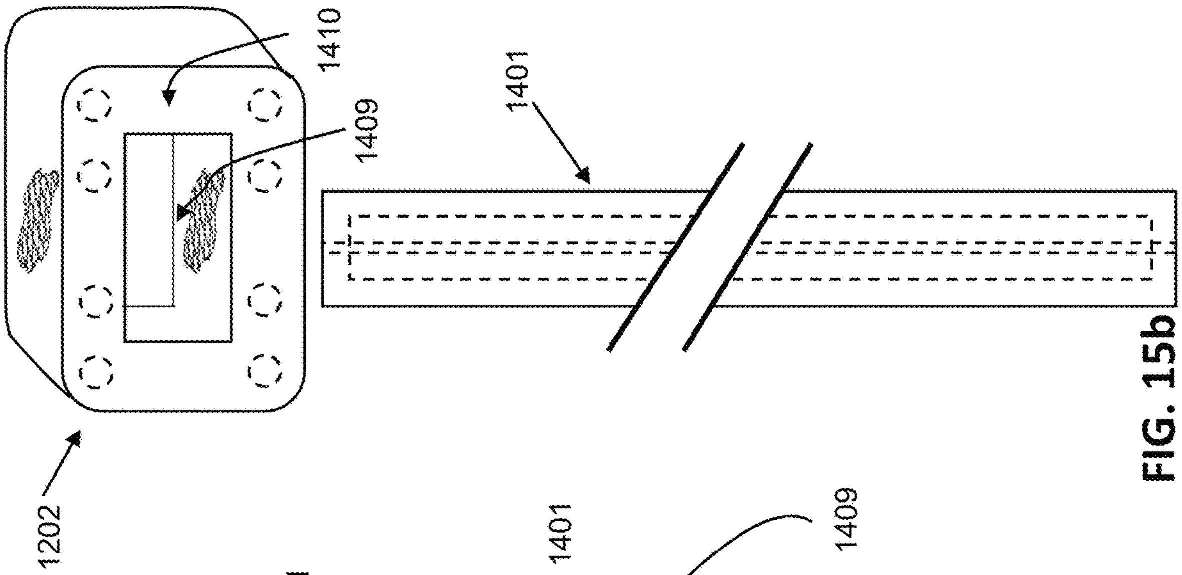
FIG. 15*b* is a kit of parts of the lighting system shown in FIG. 12, including the flexible light shade in a compressed stated and the internal structure in a disassembled state.
Figure 15A:
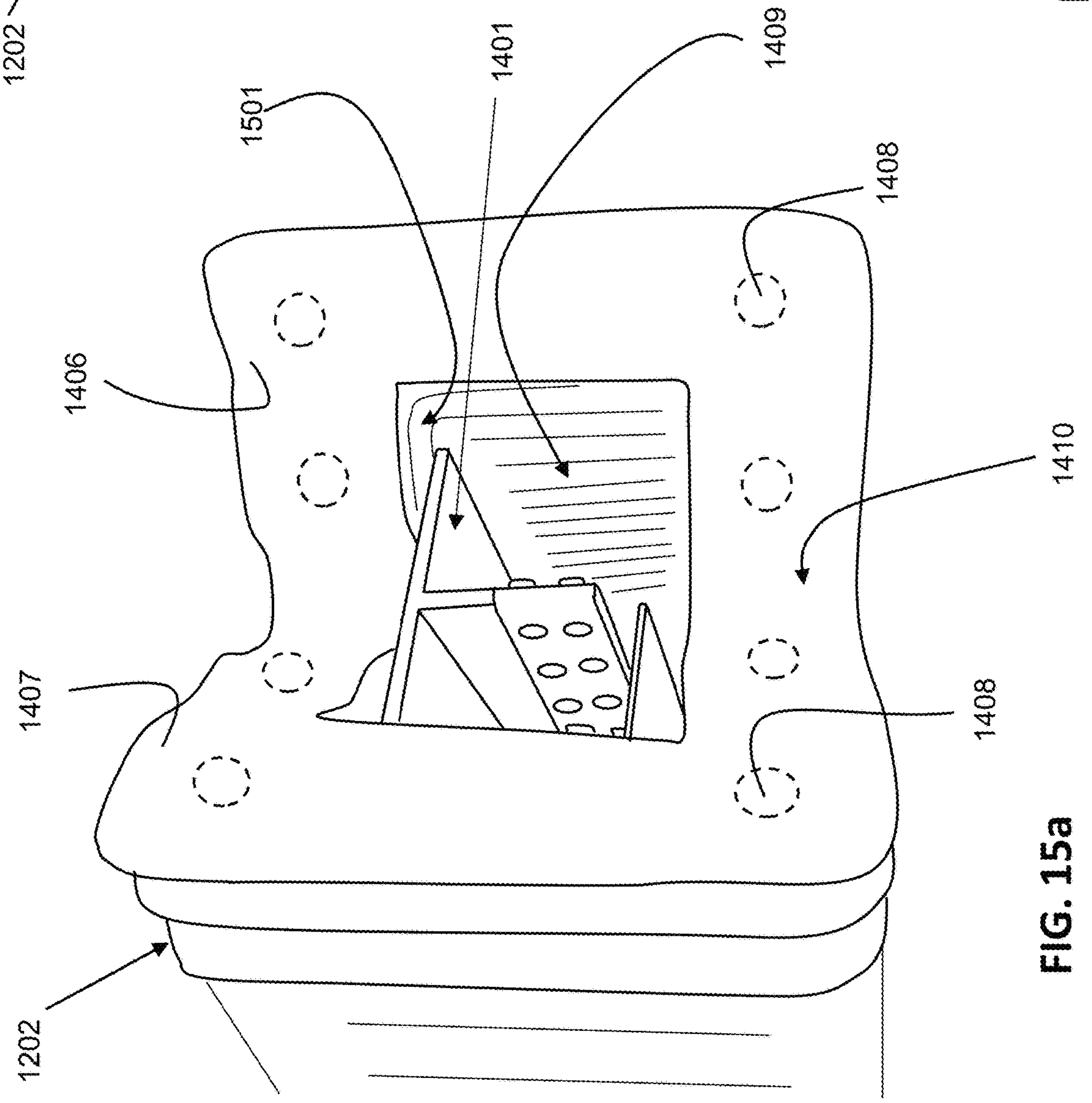
FIG. 15*a* is another perspective view of the lighting system shown in FIG. 12, and with the flexible light shade opened at one end to show the internal structure.

FIGS. 12 to 15*a* and 15*b* show an example embodiment of a lighting system 1201 that includes an exterior body 1202 and support rods or support wires 1203 that are connected to an internal supporting structure 1401. The internal supporting structure 1401 is located within a void 1409 within the exterior body 1202. The void 1409 extends along the majority of the length of the supporting structure, and the structure 1401 spans along the majority of the length of the exterior body 1202. As best shown in FIG. 15*a*, the upper surface or surfaces 1501 that define the void 1409, rests on top of the upper flange of the internal supporting structure 1401. In this way, the internal supporting structure 1401 supports the exterior body 1202.

The exterior body 1202 has a series of vertical channels 1302 that are separated from each other by vertically oriented surfaces and that extend from a bottom side of the exterior body to the top side of the exterior body. This is best shown in FIGS. 13 and 14. Light from the internal supporting structure is emitted through the openings in these channels. Preferably, the material of the exterior body is translucent, so that light is also to be emitted through the material of the exterior body. The shape of the channels, as best shown in FIG. 13, is like a honey comb. However, other shapes of these vertical channels can be used. For example, the channels may be circular shaped, diamond shaped, oval shaped, or irregularly shaped.

In a preferred embodiment, the exterior body 1202 is collapsible and expandable for easy storage and shipping. For example, folds in the material or joints between pieces of the material, or both, facilitate the horizontal collapsing and the horizontal expansion of the exterior body. While the exterior body 1202 is collapsible and expandable, other types of exterior bodies that are not collapsible and expandable are still able to be used with the various internal structures described herein.

In an example embodiment, the exterior body 1202 is a flexible article can be collapsed and extended. The exterior body comprises a core and a pair of end panels at opposite ends of the core. The core is formed from a plurality of panels. The panels in the core each have a pair of oppositely-directed major faces. The panels are preferably formed from a flexible flaccid material. In an alternative embodiment, the panels are formed from a rigid material or semi-rigid material. The material forming the panels is a flame retardant material that could be formed of tissue paper, a non-woven textile, or a woven textile. For example, Tyvek from DuPont could be used to form the panels. Other materials include cardboard, cardboard composites, plastics, and plastic composites. It will be appreciated that materials could be combined in different ways. Each panel has a major dimension or height and a width which may be adjusted to suit particular environments. Adjacent panels are inter-connected to one another at spaced intervals that alternate across the width of the face of the panel. The connection between adjacent panels is through a series of parallel, laterally-spaced strips on the face of a given panel. The strips are defined by stripes of adhesive, or some other joining mechanism or process, which joins the adjacent panels to one another. This same construction can be used to form the exterior body of other example embodiments described below (e.g., hanging walls, doors, and other lighting systems).

Each of the panels is therefore alternately connected to adjacent given panels on opposite sides so that, upon extension of the panel in a horizontal direction, a cellular structure having vertical channels 1302, which are vertical voids, is formed within the core. The voids extend vertically from top to bottom of the core with the panels providing a continuous transverse barrier. The lateral outer ends of each of the panels are connected so as to form vertical pleats 1301 on the exterior faces of the core.

As shown in FIG. 15*a*, for example, the upper surface or surfaces 1501 that define part of the void 1409 are formed from multiple edges of each panel that form the flexible exterior body 1202. When the core of the exterior body 1202 is extended, the edges of the panels that define the upper portion of the void 1409 spread apart from each other forming a discontinuous surface 1501. In other words, a collection of edge surfaces of the panels form the overall surface 1501 or boundary that defines the upper portion of the void 1409. This internal surface 1501 or boundary of the internal void 1409 rests on the internal structure, which extends through the internal void.

Figure 12:
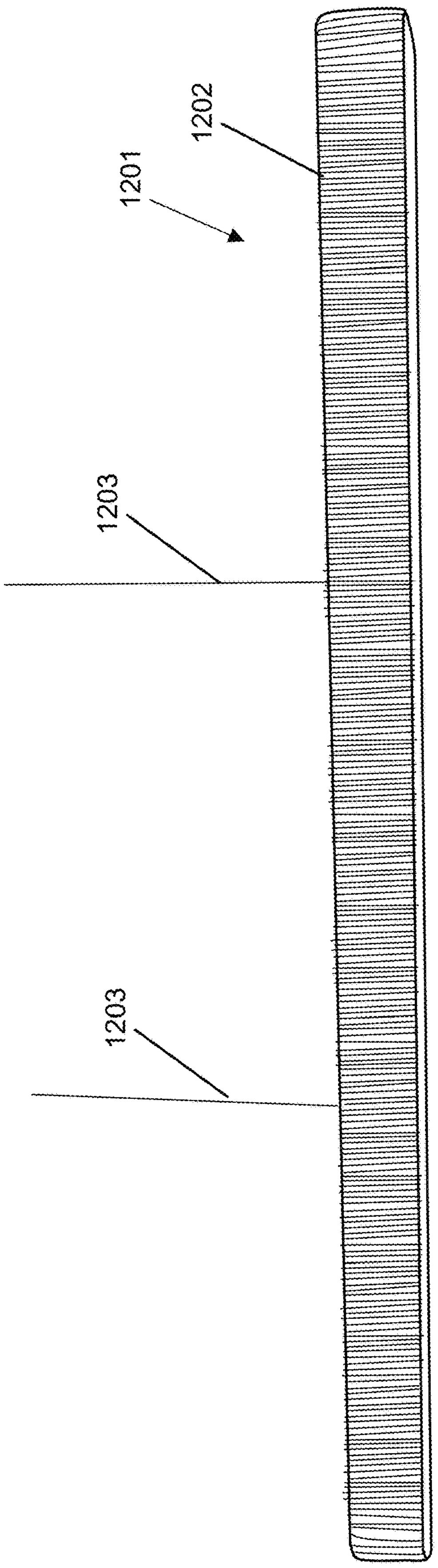
FIG. 12 is a perspective view of a lighting system with a flexible light shade, according to an example embodiment.

As best shown in FIGS. 14 and 15*a*, an end panel 1410 is show in an open position to show the void 1409 that extends horizontally along the exterior body 1202. The end panel 1410 is formed from a flexible material and is adhered to the panels positioned at the end of the core. The opposite ends 1407 and 1406 of the end panel 1410 can be folded together to face each other, as shown in FIG. 13. FIG. 12 also shows that both end panels of the exterior body 1202 are in the closed or folded position. Turning back to FIGS. 14 and 15*a*, the end panel has magnets 1408 that are positioned on opposite sides 1407, 1406 so as to hold or fasten the opposite sides together in a closed position. Other types of fasteners may be used, including, but not limited to: hook and loop fasteners (e.g., available under the trade name Velcro), adhesives, clasps, magnets and magnetic material (e.g., metals or metallics), string, or combinations thereof.

The internal void 1409 that extends along the length of the exterior body 1201 may be conveniently formed with the core in a collapsed condition by using a paper drill bit or similar device, or die cut. The shape of the internal void 1409 can be designed to suit the dimensions of the internal structure 1401.

In an example embodiment, the exterior body 1202 has the characteristics of a flexible article described in U.S. Pat. No. 9,512,615, titled "Flexible Furniture System", and incorporated herein by reference.

The internal structure 1401 includes an upper flange 1404, a web 1403 and a lower flange 1405. Two rows of lights 1402 are positioned on both sides of the web 1403. The lower flange 1405 is a translucent material. The upper flange 1404 is opaque and is powder coated, or textured in another manner, to diffuse the light.

In an example embodiment, the exterior body 1202 is a white translucent material, the upper flange 1404 and the web 1403 are painted with a white powder coating, and the lower flange 1405 is a white translucent material. It will be appreciated that other colors can be used.

A kit of parts of the lighting system 1201 is very easy to pack for storage and shipment, and is easy to assemble. As shown in FIG. 15*b*, the kit of parts includes the exterior body 1202, which is shown in a collapsed to small size so that it is easy for transport and storage. The kit of parts also includes the rigid internal supporting structure 1401, shown in a top-down view. The structure 1401 is preferably robust and not easily damaged. Furthermore, as the lights are located towards the middle of the internal supporting structure on the web 1403, the upper and the lower flanges offer some protection to the lights from objects that may knock against the internal supporting structure 1401. Other hardware (e.g., hanging wires, cables, support arms, power supply with wires, etc.) can also be included in the kits of parts.

In assembly, the collapsed exterior body is put over the structure 1401, and one or both ends of the exterior body are pulled away from each other to extend the exterior body along the length of the structure. The end panels 1410 on opposite ends of the exterior body 1202 are closed.

In an alternative process to assemble the kit of parts, a first end panel of the collapsed exterior body is closed first. A first end of the internal structure 1401 is then placed into the void 1409, and it abuts the closed end of the void. The second end of the collapsed exterior body is then pulled along the length of the internal structure 1401, until it passes over the second end of the internal structure 1401. Afterwards, the second end panel of the exterior body, which is now extended, is closed, which in turn, encloses the internal structure 1401.

Other approaches of assembling the lighting system 1201 can also be used.

Figure 17:
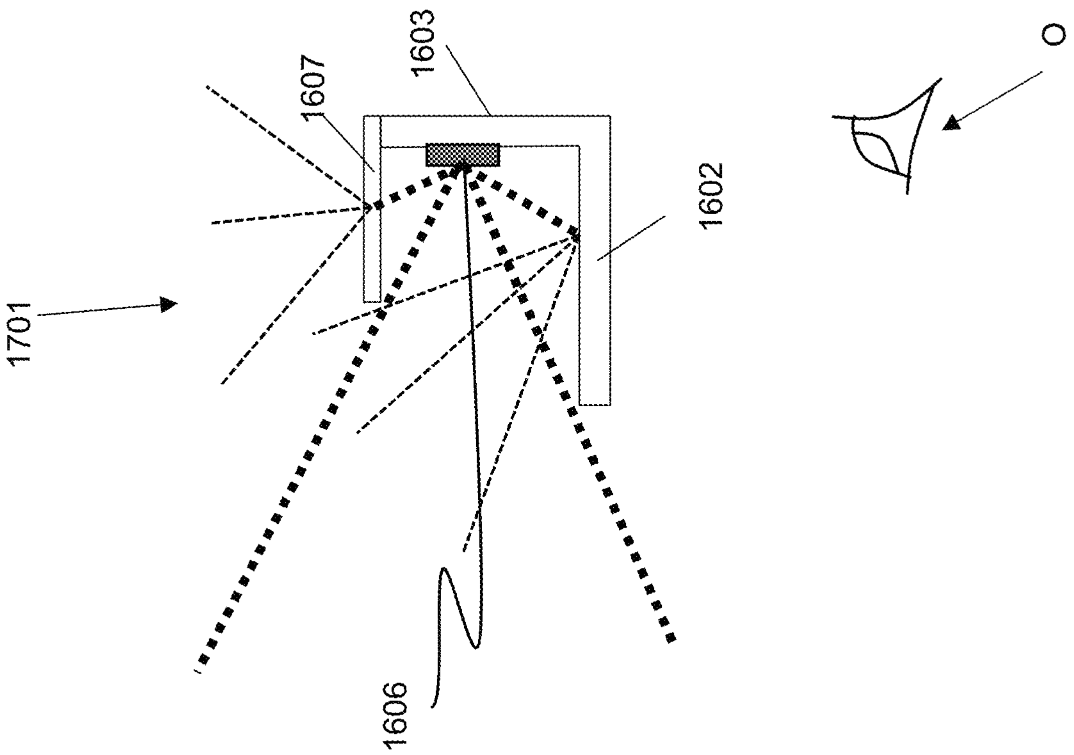
FIG. 17 is a front view or a rear view of an internal structure according to another example embodiment. The internal structure of FIG. 17 is oriented upside-down relative to the example embodiment shown in FIG. 16.
Figure 16:
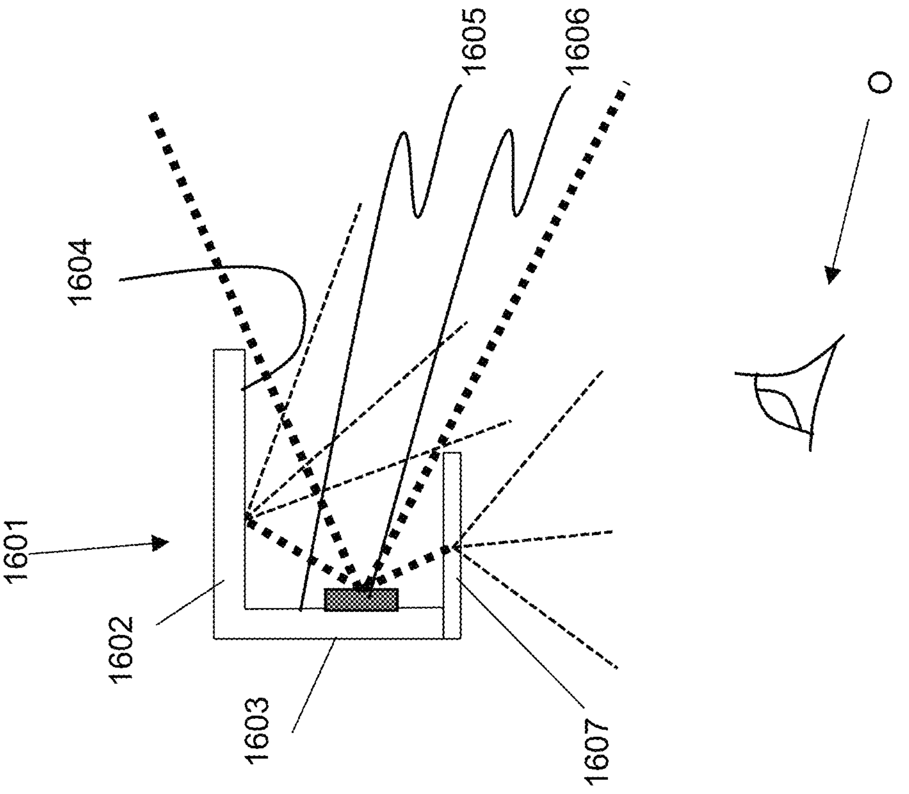
FIG. 16 is a front view or rear view of a C-shaped internal structure, including a translucent surface, according to an example embodiment.

Turning to FIGS. 16 and 17, internal supporting structures 1601 and 1701 having a C-shaped beam or channel are shown.

In FIG. 16, the structure 1601 includes an upper flange 1602 and a web 1603 positioned to the side of the upper flange. For example, the upper flange and the web are unitary is an L-shaped beam. A lower flange 1607 is mounted below the web 1603. The upper flange 1604 is opaque and its lower surface 1604 is textured. Lights or a light 1606 is mounted to the side surface 1605 that is on the same side as the upper flange 1602 and the lower flange 1607. The lower flange 1607 is translucent. The lower flange is also shown to have a shorter width than the upper flange. However, in other example embodiments, the lower flange width can be longer or the same as the upper flange.

FIG. 17 shows the structure 1701, which is similar to the structure 1601, but oriented upside down.

Figure 19:
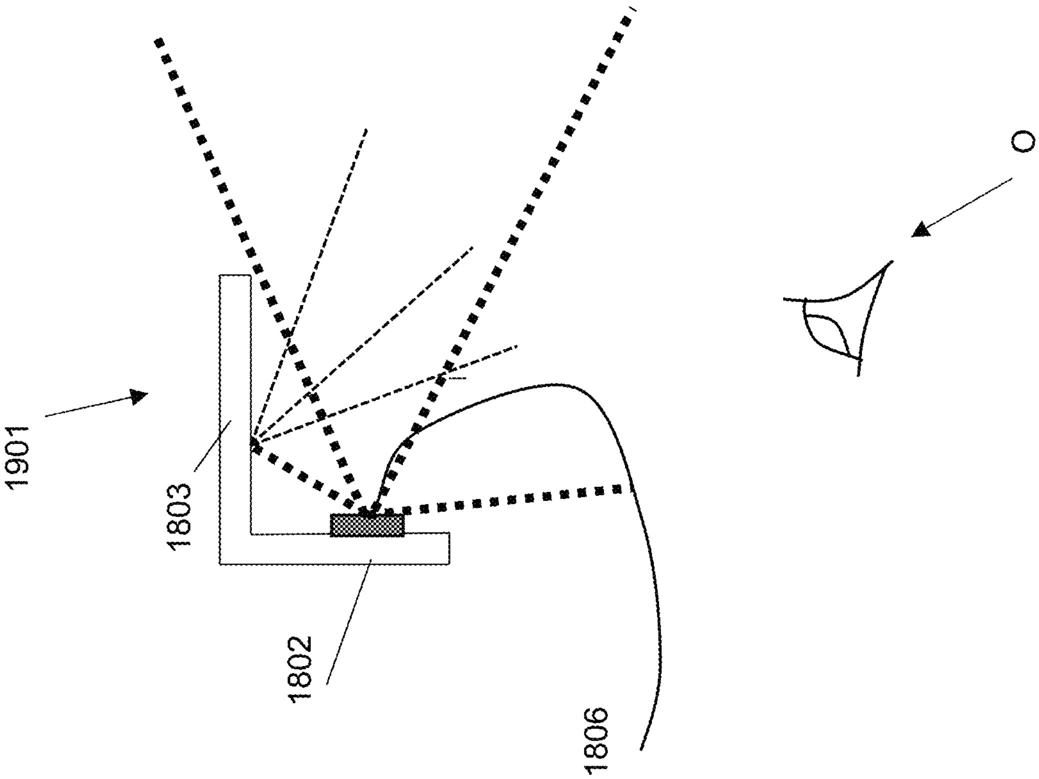
FIG. 19 is a front view or a rear view of an internal structure according to another example embodiment. The internal structure of FIG. 19 is oriented upside-down relative to the example embodiment shown in FIG. 18.
Figure 18:
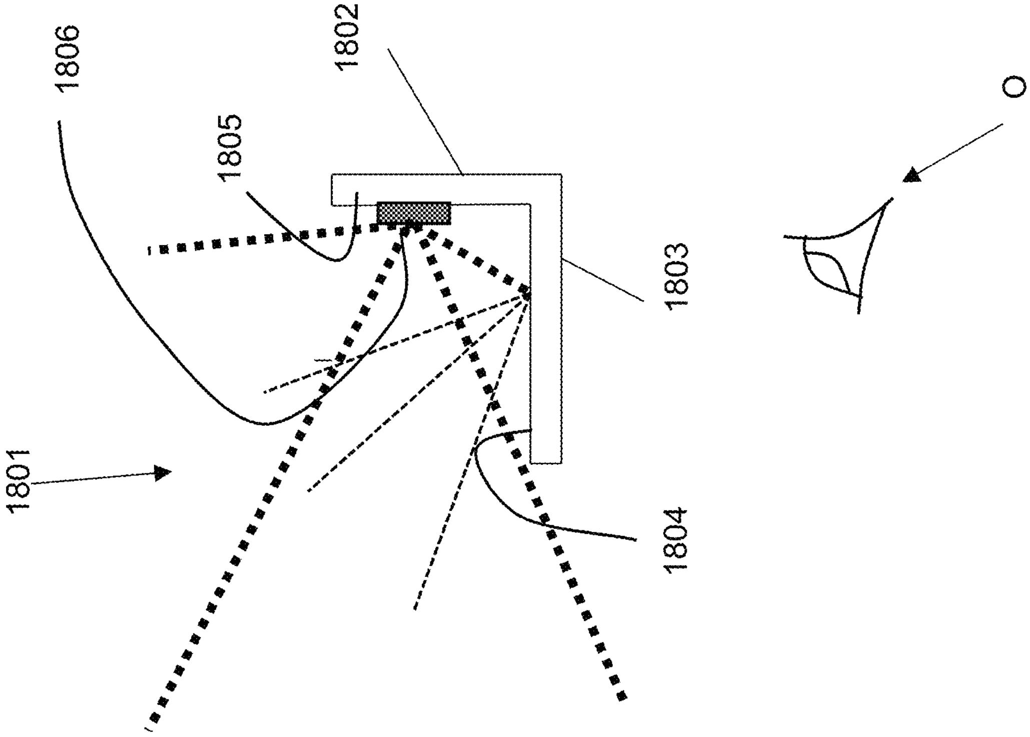
FIG. 18 is a front view or a rear view of an L-shaped internal structure that includes a diffusive reflective surface, according to another example embodiment.

FIGS. 18 and 19 show internal supporting structures 1801 and 1901 that have an L-shaped beam. The structure 1901 is oriented upside down relative to the structure 1801.

The web 1802 and the flange 1803 are unitary, or they are separate pieces. A light or lights 1806 are mounted on the side surface 1805 of the web 1802 that faces the direction to which the flange 1803 extends. The surface 1804 of the flange 1803 is textured to diffuse the light.

Figure 21:
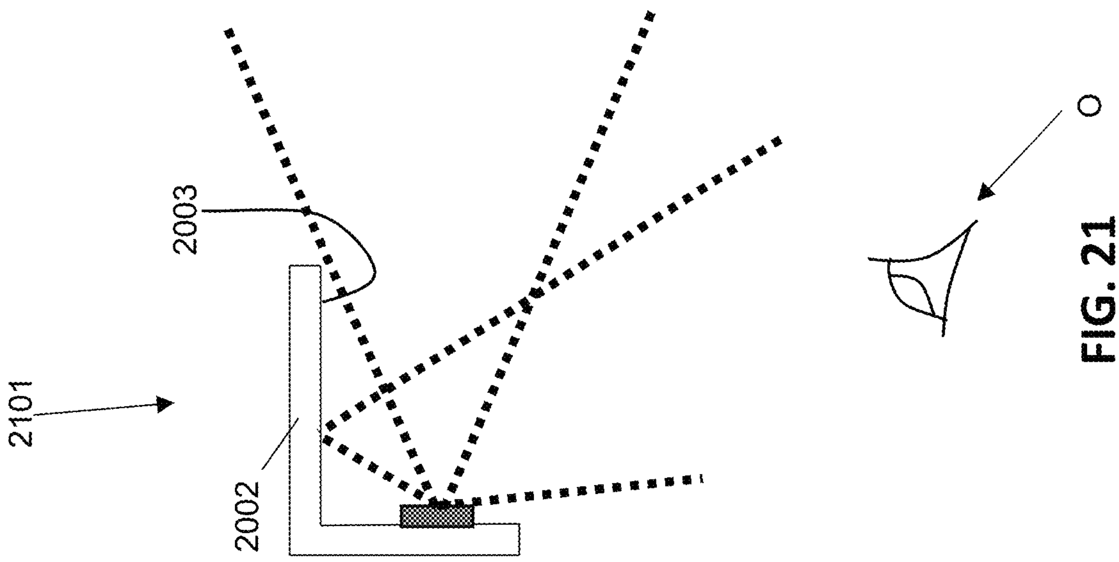
FIG. 21 is a front view or a rear view of an internal structure according to another example embodiment. The internal structure of FIG. 21 is oriented upside-down relative to the example embodiment shown in FIG. 20.
Figure 20:
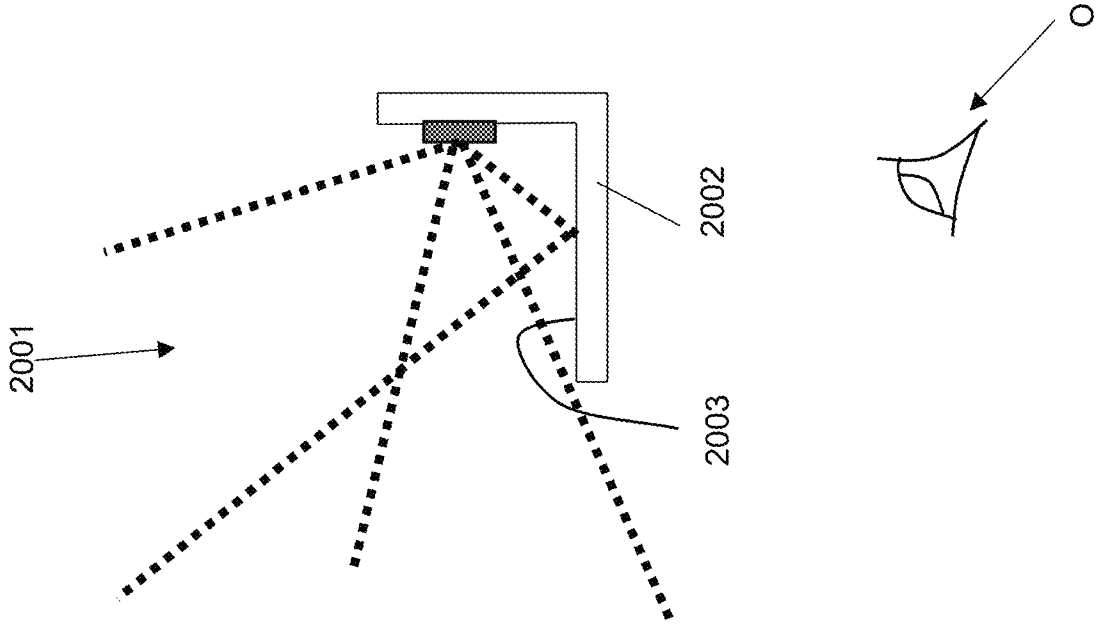
FIG. 20 is a front view or a rear view of an L-shaped internal structure that includes a reflective surface that is relatively less diffusive compared to the surface in FIG. 18.

FIGS. 20 and 21 also show L-shaped beams for the internal supporting structures 2001, 2101. However, the surface 2003 of the flange 2002 is reflective (e.g., a mirror, or like a mirror).

Figure 22:
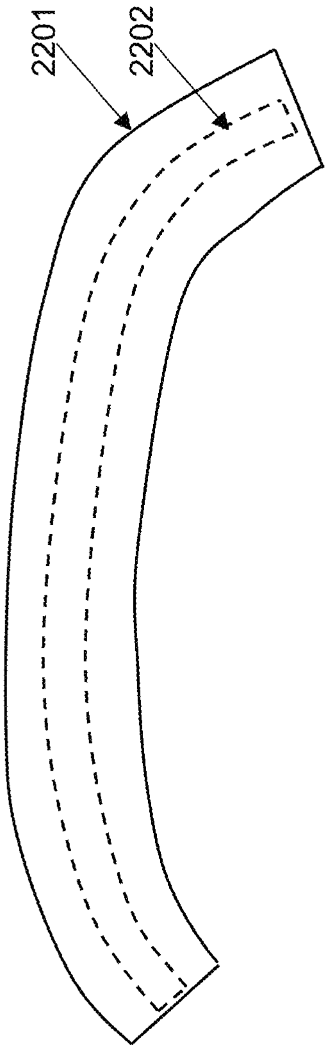
FIG. 22 is a top view of a lighting system showing an internal structure according to an example shape.

FIG. 22 shows, from a top-down view, an example of a curved internal support structure 2202 positioned within an exterior body 2201 that is also curved. In other words, the internal support structure does not have to be linear or straight. It can include curves, bends, angles, or combinations thereof. These curves, bends and angles can be oriented along different axes to make more complex three-dimensional shapes. It will be appreciated that the exterior body shape can vary as well, such as an exterior body for a suspended wall, an exterior body for a light, an exterior body for a door, and an exterior body for a ceiling or overhead structure.

Figure 23:
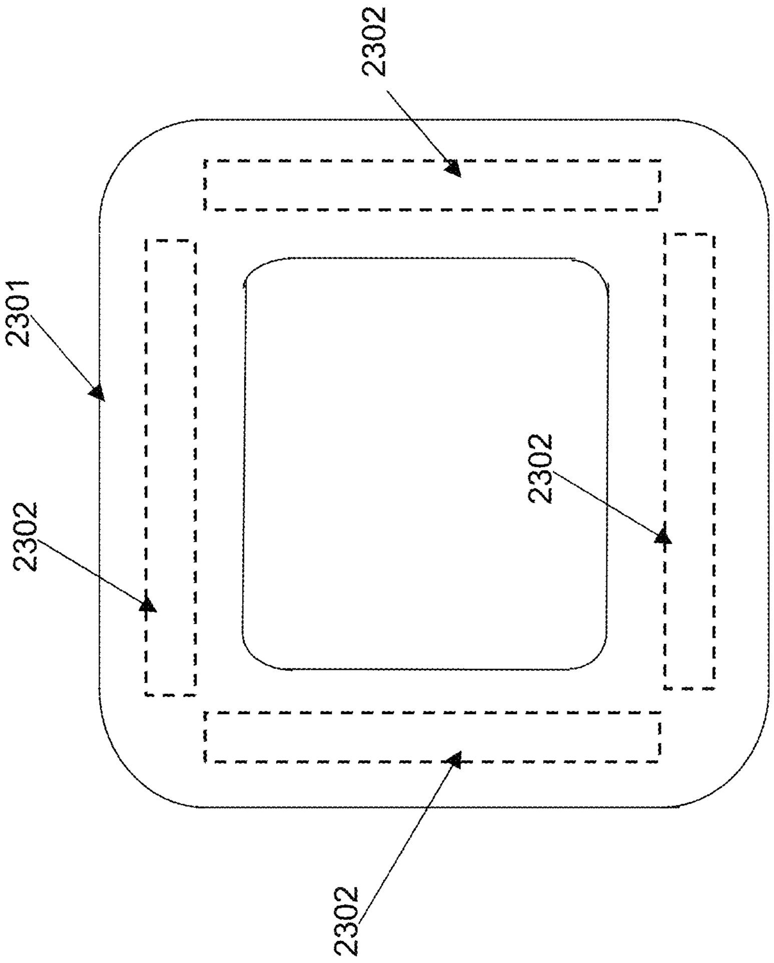
FIG. 23 is a top view of a lighting system showing multiple internal structures, according to an example embodiment.

FIG. 23 shows, from a top-down view, multiple internal support structures 2302 that positioned within an exterior body 2301. In an example aspect, the structures 2302 are spaced apart from each other. The structures 2302 are angled relative to each other. In the example shown, four internal support structures 2302 form four sides of a square.

In other examples, not shown, the multiple internal support structures are connected to each other. The structures can also be linear to form a very long support structure.

In a preferred example embodiment, the exterior body 2201 or the exterior body 2301 (or both) is formed from a collapsible and expandable exterior body as described with respect to the exterior body 1202, or multiple ones of such collapsible and expandable exterior bodies. In other words, the exterior body can flex around a curve as it is extended. Also, using fasteners (e.g., magnets or other types of fasteners) located at the end panels, multiple exterior bodies can be fastened together to form a large and continuous-looking loop as shown in FIG. 23.

In another example, the exterior body 2201 or the exterior body 2301, or both, are not flexible and are custom made to match the shape of one or more internal supporting structures.

Figure 24:
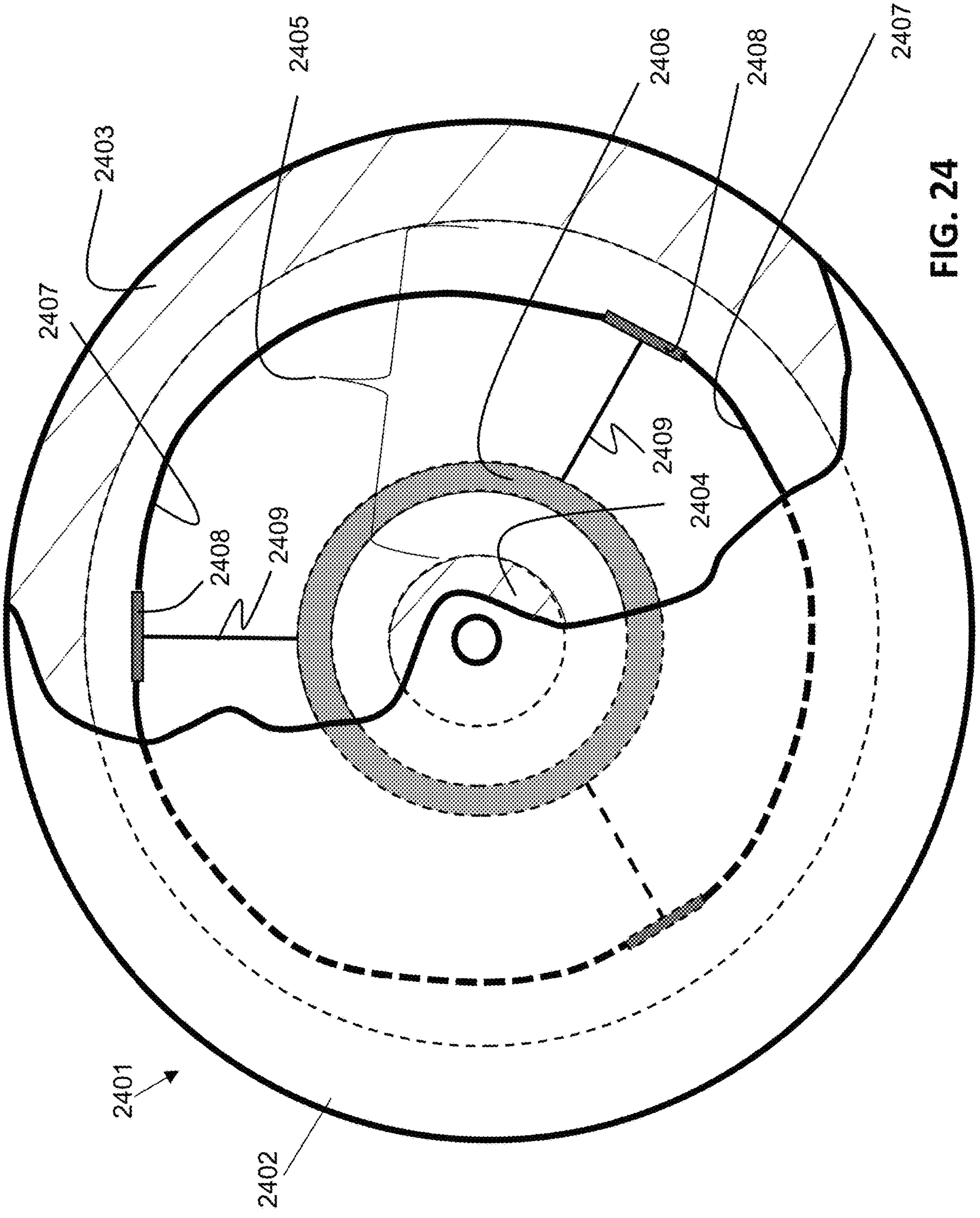
FIG. 24 is a top view of a torus shaped lighting system including a cutaway that shows an internal structure and connected armature within a cavity of a light shade.

FIG. 24 shows a top-down view of another example lighting system 2401 that is circular shaped. In an example embodiment, it is shaped as a torus. The lighting system includes an exterior body 2402 and an internal supporting structure 2404 positioned within an internal void 2405 of the exterior body 2402. The internal supporting structure 2406 is rigid or semi-rigid and has lights positioned on it. As can be seen from the top-down view, the structure 2406 is also circular and extends along the circular void 2405. The cross-sectional view of the supporting structure 2406 can be the same or similar to the front or rear views of the various internal supporting structures described herein (e.g., having one or more flanges, a web, and one or multiple lights arranged in seriatim extending along the structure).

A partial cut-away view shows an outer wall 2403 and an inner wall 2404 of the exterior body 2402, which define in part the internal void 2405.

An outer ring formed by one or more rods 2407 has a larger radius than the internal supporting structure 2404. The outer ring is connected to the internal supporting structure by connection pieces 2409. The outer ring, the connection pieces 2409, and the internal supporting structure 2404 are all positioned within the void 2405.

In a preferred example embodiment, there are multiple rods 2407 that are connected together by joints 2408. Each of the rods 2407, in a relaxed condition, is straight, but can be flexed to form an arc as shown in FIG. 24. Preferably, the rods are resiliently flexible or resiliently deformable. In other words, the rods 2407 can be dismantled from the joints 2408 and the rods will resiliently return back to its relaxed condition (i.e., straight). These rods, when attached at their ends using the joints 2408, form a taught outer ring that has some flexibility. The joints 2408 are, for example, rigid and straight and the opposite ends of each joint connect to an end of a rod. Furthermore, the connection pieces 2409 are wires, string or cable that are pulled taught between the internal support structure 2406 and the outer ring. The tension along the connection pieces 2409 can vary according the desired look or appearance of the light system 2401. The connection pieces 2409 are connected to the joints 2408. The connection pieces 2409 can also be called lines, or tension lines, or connection pieces in tension. In particular, a given string, wire or cable is connected to a side of a given joint 2408 and, preferably, although not necessarily, is connected to a mid-way point along the length of the given joint 2408. While the connection pieces 2409 are preferably thin and flexible, in another example embodiment, the connection pieces 2409 are rigid.

In an example embodiment, the rods 2407 and the internal supporting structure 2404 are the same color as the exterior body 2402. Thus, if the exterior body has holes on its bottom surface, and when a person looks up at the lighting system, it will be difficult to visually notice the rods and the internal supporting structure within the exterior body.

In an alternative example embodiment, the rods 2407 are rigid and permanently have a curved shape. In another alternative embodiment, a single rod structure is used to form an outer ring. In another alternative embodiment, the connection pieces 2409 are rigid or semi-rigid rods.

Although not shown, supports (e.g., wires, strings, rods, etc.) can be used to hang the light system 2401 from above. For example, wires, string, rods, etc. can be attached to the joints 2408, or the internal support structure 2406, or the exterior body 2402, or the connection pieces 2409, or a combination thereof.

Alternatively, supports (e.g., rods) can be used to support the light system 2401 from below.

Figure 25:
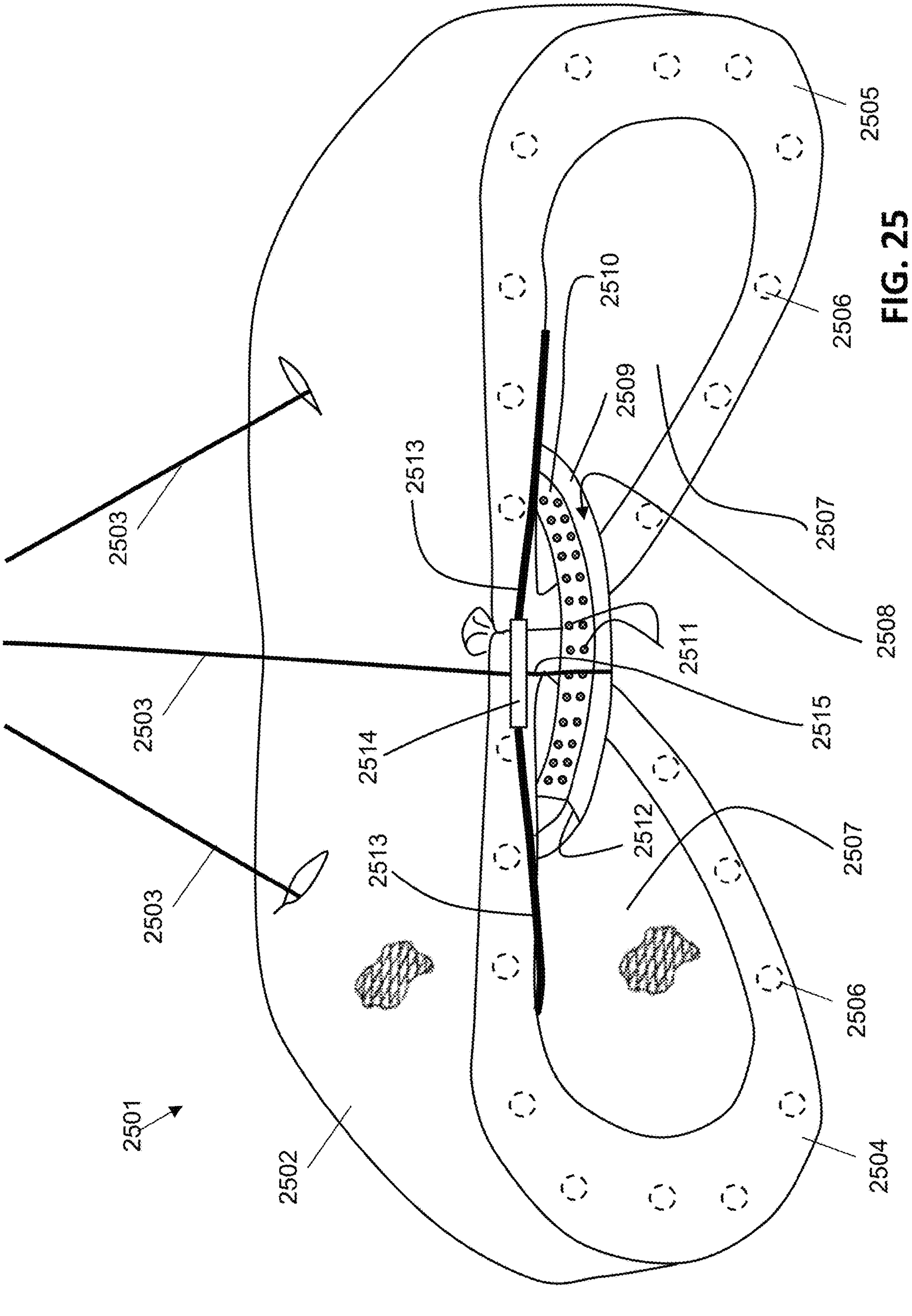
FIG. 25 is a perspective view of an example embodiment a torus shaped lighting system that is partially opened to show an internal structure and connected armature within a cavity of a light shade.
Figure 26:
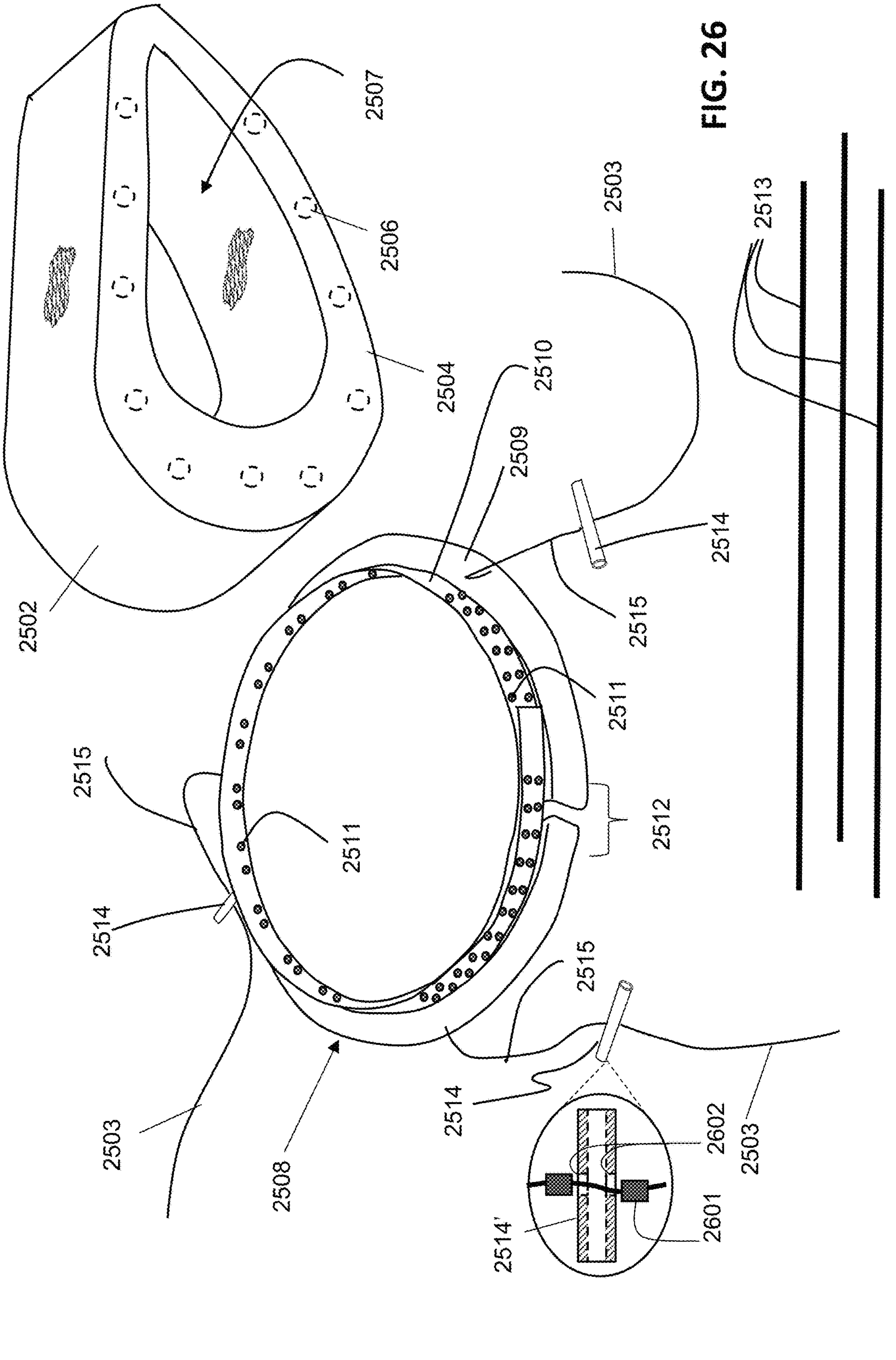
FIG. 26 shows a kit of parts used to form the lighting system of FIG. 25.

FIGS. 25 and 26 show another example embodiment of a torus shaped lighting system 2501. FIG. 25 shows an assembled lighting system 2501 with the exterior body 2502 partly opened to show internal components, and FIG. 26 shows an unassembled kit of parts used to form the lighting system 2501.

In FIG. 25, the exterior body 2502 is partially opened. The exterior body 2502 is made of different panels that can be compressed together and extended apart from each other. There are vertical voids between the panels. This is similar to the collapsible and expandable exterior body described with respect to the embodiment in FIGS. 12 to 15*a* and 15*b*, although the shape is different. When the exterior body 2502 is fully closed, the end panel surfaces 2504 and 2505 abut each other and can be fastened to each other using magnets 2506. In the closed state, the exterior body 2502 forms a circle. The magnets are, for example, embedded or covered by the end panels 2504 and 2505. In the expanded state, a void 2507 is formed within the exterior body. The void 2507 is also circle-shaped when the exterior body 2505 is flexed to form a circle.

As can be seen in FIG. 25, the internal supporting structure 2508 is positioned within the circle-shaped void 2507. The structure 2508 has an L-shaped cross section, which includes a web 2510 and a lower flange 2509 extending outwards from the web 2510. Lights 2511 (e.g., LEDs, OLEDs, etc.) or a long strip of light are positioned on the outward facing side of the web 2510. As can be seen in FIG. 26, lights 2511 are also positioned on the inward facing side of the web 2510. In the example shown, there are more lights positioned on the outward facing side of the web 2510 relative to the number of lights positioned on the inward facing side of the web 2510. More generally, there is a greater light output (e.g., measurable in lumens) from the light or lights that are positioned on the outward facing side compared to the light output from the light or lights that are positioned on the inward facing side. In another example, there are no lights positioned on the inward facing side of the web.

The lower flange 2509 helps to diffuse the light. In an example embodiment, the lower flange 2509 is opaque and has a matte or textured surface finish. As a person, located below the lighting system 2501, looks upwards through the holes in the exterior body 2502, the person cannot directly see the light sources since they are visually obstructed by the lower flange 2509. It will be appreciated that other configurations of internal supporting structures can be used in the torus shaped lighting system 2501.

Continuing with FIG. 25, flexible rods 2513 are connected at their ends to joints 2514, which together form an outer ring. The outer ring is semi-rigid so as to give the lighting system 2501 a wavy shape, like a cloud. In particular, each joint 2514 is a rigid body with hollowed ends, which respectively receive and hold the ends of two separate flexible rods 2513. In total, there are three flexible rods and three joints 2514 which are used to form the outer ring. Connection wires or strings 2515 respectively connect each joint 2514 to the internal supporting structure 2508. Hanging wires 2503, in turn, are respectively connected to each of the joints 2514.

In an example embodiment, a hanging wire 2503 and a connection wire 2515 connected to a common joint 2514' are in fact a single wire (e.g., both 2503 and 2515 are a single wire) that is threaded through the width of the joint 2514'. The example of the joint 2514' is shown in FIG. 26 in a cross-sectional view along the length of the joint. For example, to fabricate the joint 2514', a tube is provided that can receive the ends of two rods. The major axis of the tube coincides with the elongate void in the tube. A hole 2602 is drilled through the tube, midway along its length, and the drill hole is made orthogonal to the major axis of the tube. This orthogonal hole can be made in other ways other than drilling. The single wire is then threaded through this orthogonal hole and the joint can be held in place along the length of the single wire by clasps 2601 attached to the single wire.

As can be seen in FIG. 25, the hanging wires 2503 pull up on the joints 2514, and the flexible rods 2513 slightly sag between the joints 2514 due to the weight to the exterior body 2502 resting on the rods 2513. This creates peaks and valleys, or undulations, giving the light system 2501 the visual effect of looking like a cloud. The thin profile of the rods 2513, the joints 2514 and the connection wires or strings 2515 reduces the surface area of the outer ring and, therefore, reduces the shadow being cast by the outer ring. In other words, the outer ring obstructs very little light being emitted from the lights 2511.

A split or gap 2512 can be formed between the ends of the internal supporting structure 2508 (e.g., which is an inner ring). Or, the ends can overlap to form a continuous circle. The split 2512 in the internal supporting structure 2508 allows for the structure 2508 to be pass through the void 2507 of the exterior body 2502. The ends of the internal supporting structure can be secured or held together using a band, an adhesive, or some other type of fastener.

As can be better seen in FIG. 26, in the kit of parts, the flexible rods 2513 are in a relaxed state and are straight. They are resiliently deformable and can be arched and then return back to a straight configuration. The rods 2513, for example, are made of carbon fiber, which is a light weight and fire-resistant material. More particularly, the rods 2513 are carbon fiber tubes. In FIG. 26, the exterior body 2502 is shown in a collapsed state, which is easy to transport and store.

In an example assembly process of the kit of parts, the ring-shaped internal supporting structure 2508 is first passed through the void 2507 of the collapsed exterior body 2502, using the split 2512 in the structure 2508. The ends of the rods 2513 are then inserted into the hollows of the joints 2514 to form the outer ring. The collapsed exterior body 2502 is then extended around the internal supporting structure 2508 and the outer ring to form a torus.

Figure 27:
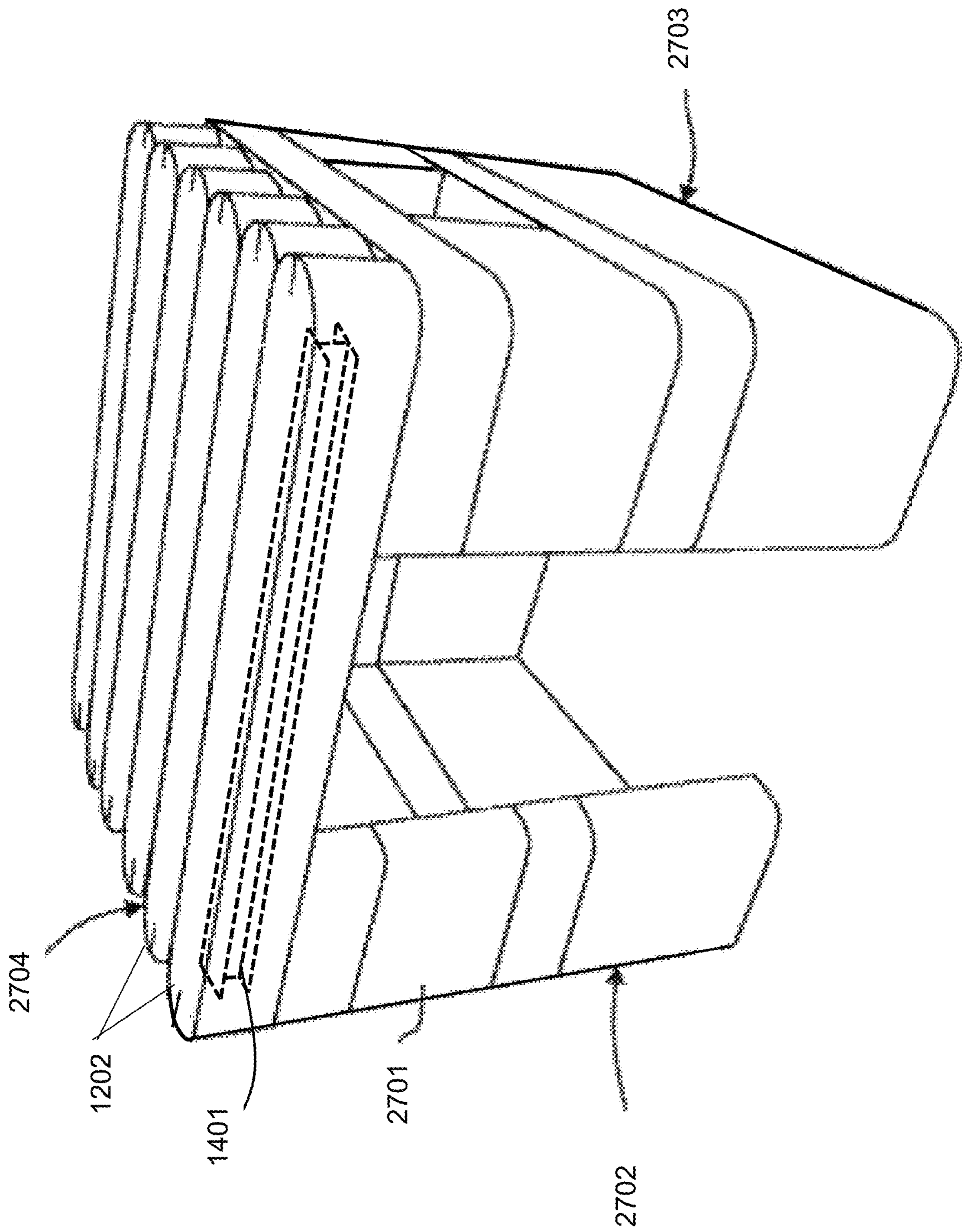
FIG. 27 is a perspective view of a building assembled from partitions, according to another example embodiment.

Turning to FIG. 27, partitions 2701 may be used to form a cubicle or room 2702, such as may be desired as a temporary structure at a trade show or to provide a degree of privacy within an open area. The room 2701 has walls 2703 formed from stacked partitions. Other ways of forming walls or assembling walls 2703 can be used.

Figure 28:
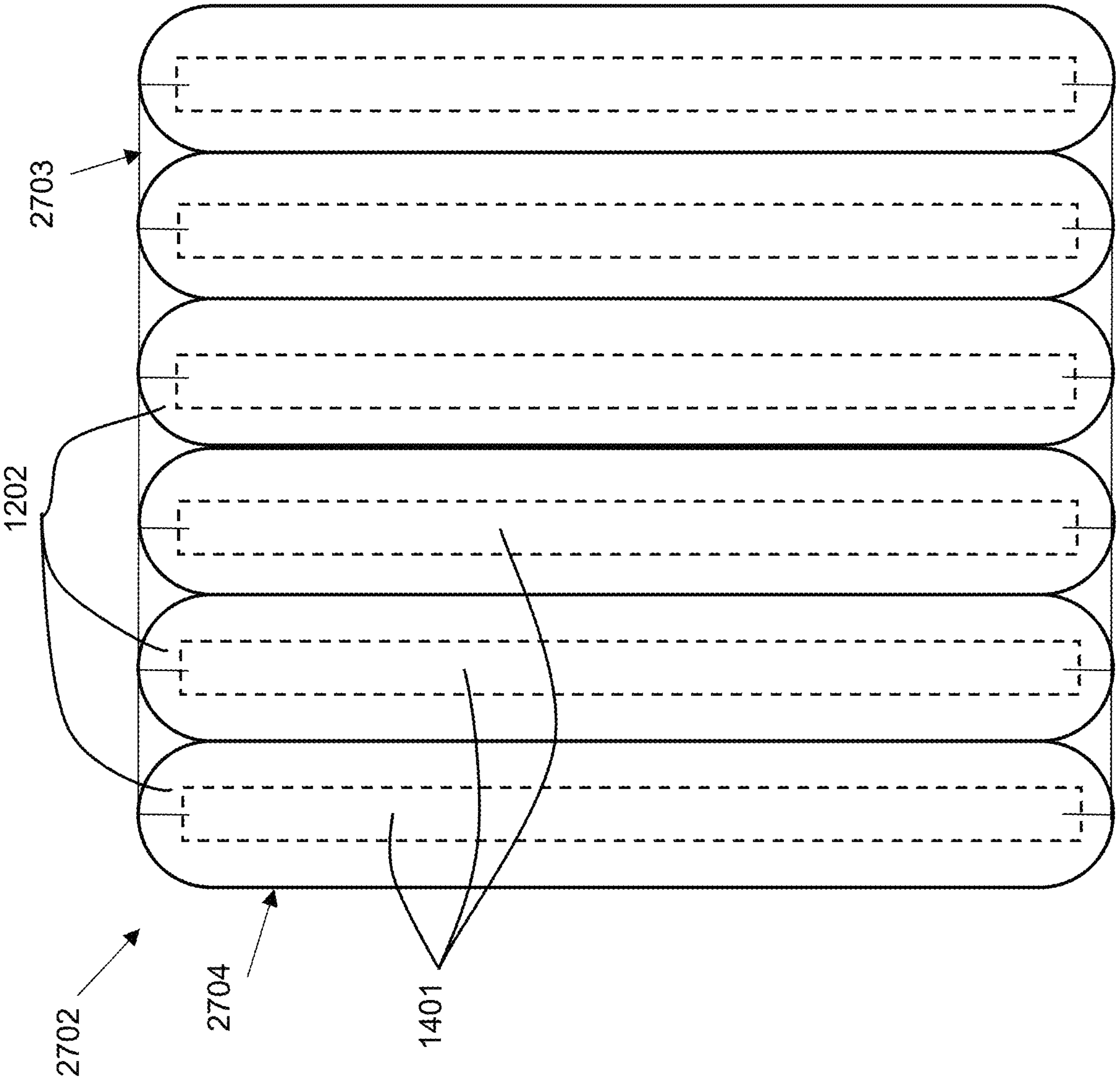
FIG. 28 is a top view of the building shown in FIG. 27, further showing the internal structures in the ceiling components.

As better seen from the top-down view in FIG. 28, a roof structure 2704 is formed by a series of individual exterior bodies 1202 each having an internal supporting structure (e.g., the structure 1401, or some other configuration of an internal supporting structure) that provides ceiling lighting. The internal supporting structures act as beams that span across the ceiling of the room 2702, and also include embedded lighting. This provides a very pleasantly diffused lighting environment within the room, which is pleasant even when a person looks up at the ceiling.

FIGS. 29*a*, 29*b*, 30*a*, 30*b*, 31*a* and 31*b* show other example configurations of internal supporting structures.

Figure 29B:
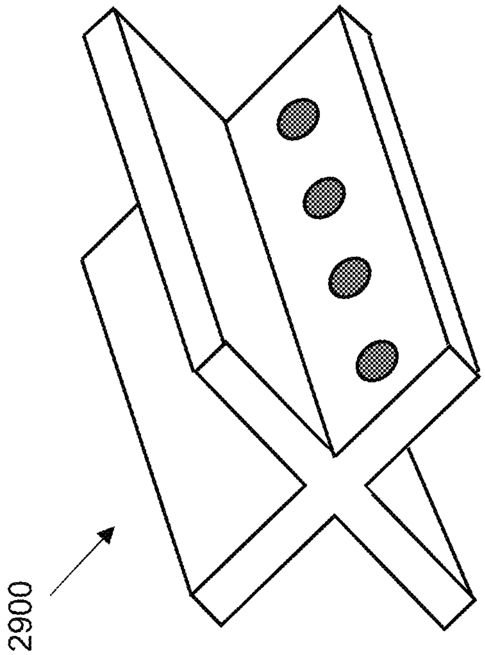
FIGS. 29*a* and 29*b* respectively show a front view or rear view of an X-shaped internal structure and a perspective view of the X-shaped internal structure, according to another example embodiment.
Figure 29A:
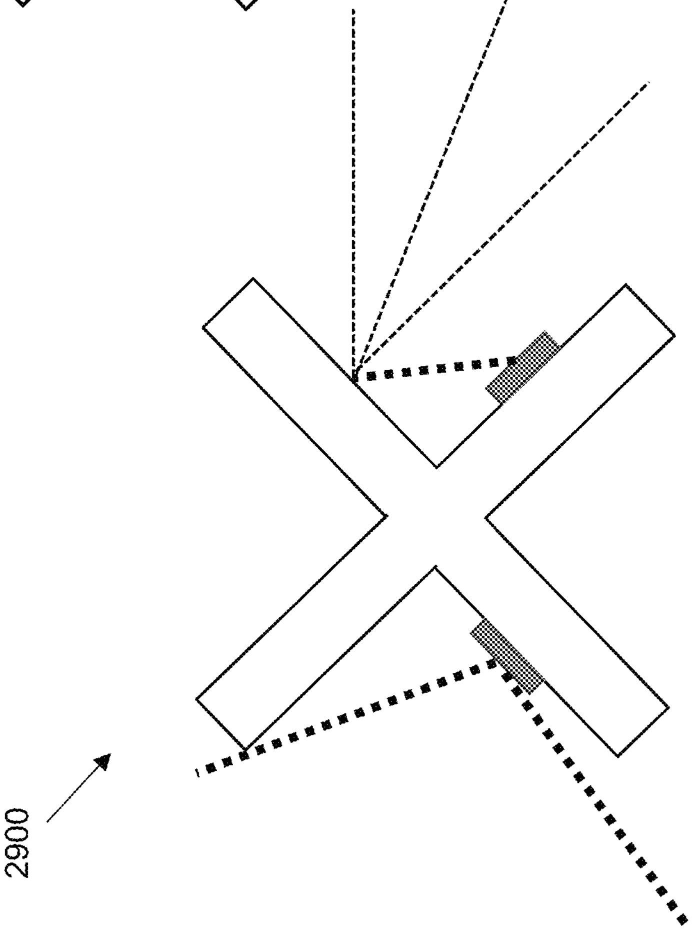

In FIGS. 29*a* and 29*b*, the internal supporting structure 2900 has four flanges that are angled relative to each other to form an X-shape. The lights are located on the lower flanges and the surfaces of the flanges are, for example, textured or matte to scatter the light rays. In an alternative example, the structure 2900 is oriented upside down.

Figure 30B:
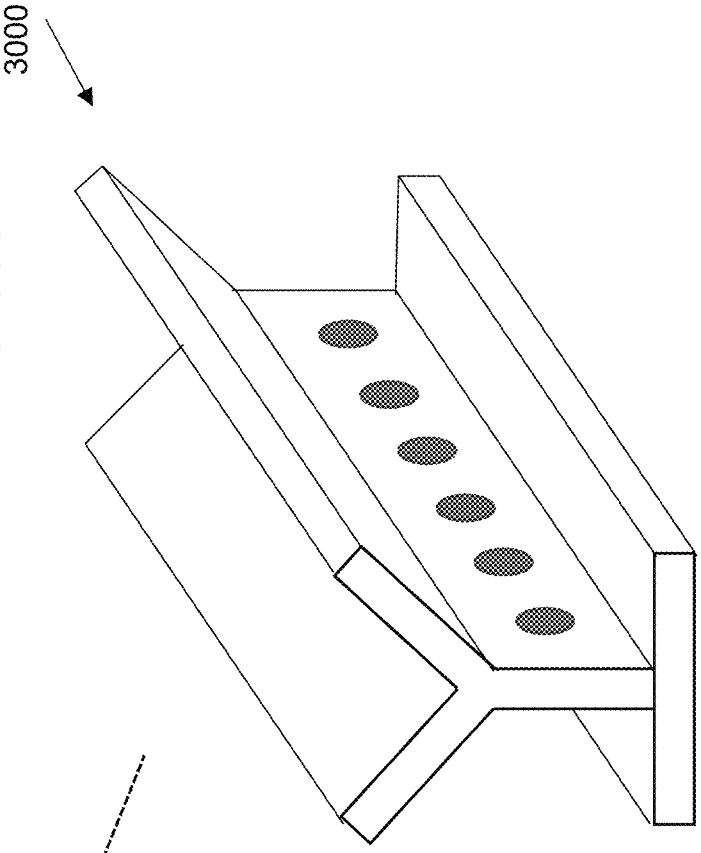
FIGS. 30*a* and 30*b* respectively show a front view or rear view of an internal structure with a Y-shaped upper flange and a perspective view of the same internal structure, according to another example embodiment.
Figure 30A:
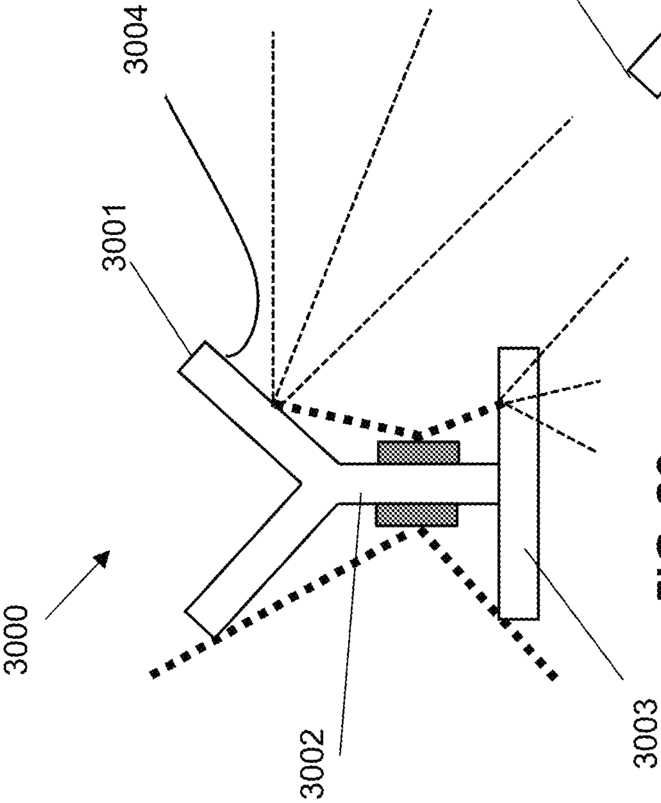

FIGS. 30*a* and 30*b* show an internal supporting structure 3000 that has a Y-shaped upper flange 3001, a web 3002, and a horizontal lower flange 3003. The lights are located on the web 3002, and light rays that pass through the translucent material of the lower flange 3003 are diffused. The light rays that reflect off the lower surface 3004 of the Y-shaped flange 3001, which has a textured or matte surface, are diffused at a greater outward angle, compared to a horizontal upper flange.

Figure 31A:
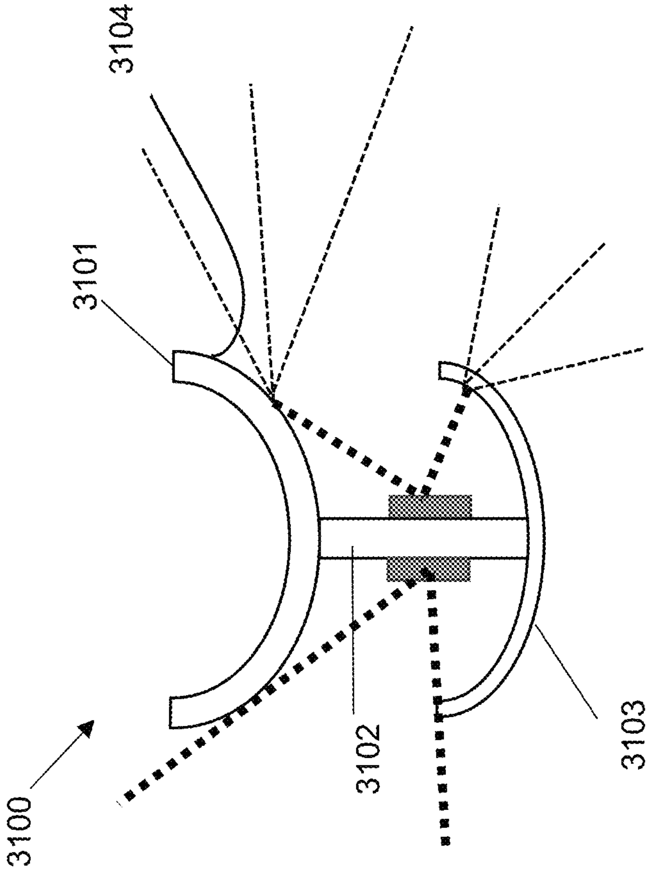
FIGS. 31*a* and 31*b* respectively show a front view or rear view of an internal structure with a U-shaped upper flange and a U-shaped lower flange, and a perspective view of the same internal structure, according to another example embodiment.
Figure 31B:
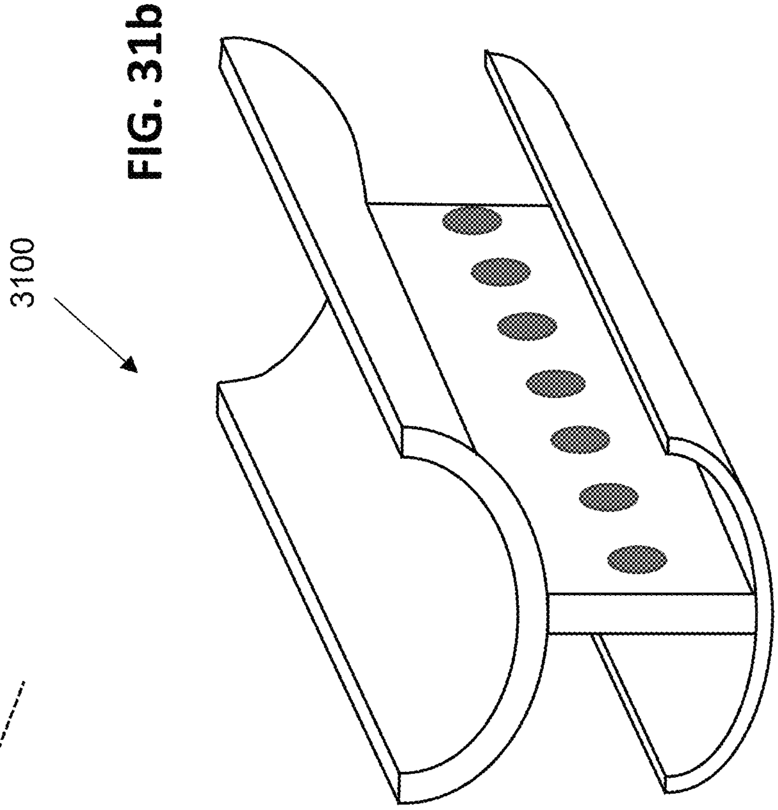

FIGS. 31*a* and 31*b* show an internal supporting structure 3100 that has a U-shaped upper flange 3101, a web 3102, and a U-shaped lower flange 3103. The lights are located on the web 3102, and light rays that pass through the translucent material of the lower flange 3103 are diffused. As a person or observer, underneath the lighting system, is located at a further distance to the left or the right of the lighting system, the U-shaped lower flange 3103 is able to still diffuse the light. The light rays that reflect off the lower surface 3104 of the U-shaped flange 3101, which has a textured or matte surface, are diffused at a greater outward angle, compared to a horizontal upper flange.

It will be appreciated that the shape of the upper flange or the shape of the lower flange, or both, can vary from a horizontal surface in order to provide different angles of light reflection and diffusion.

Figure 32:
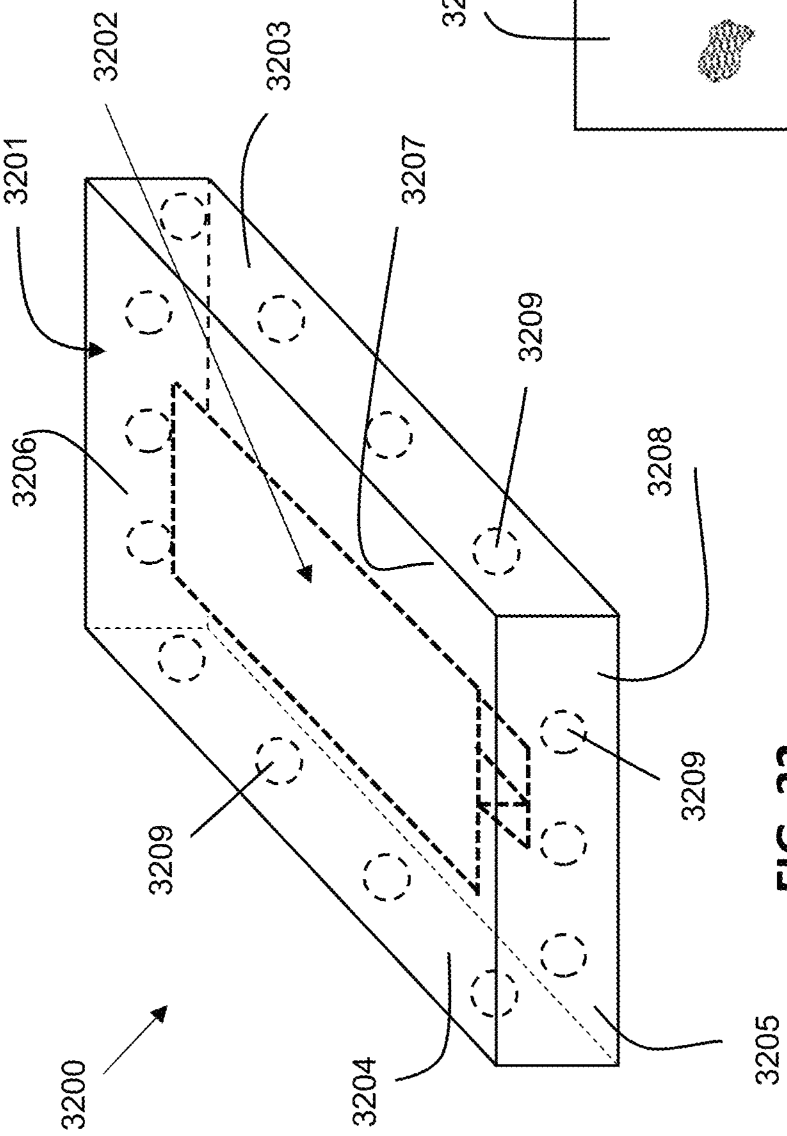
FIG. 32 is a perspective view of a lighting panel including an internal structure inside the lighting panel, and having fasteners positioned on its side surfaces.
Figure 33:
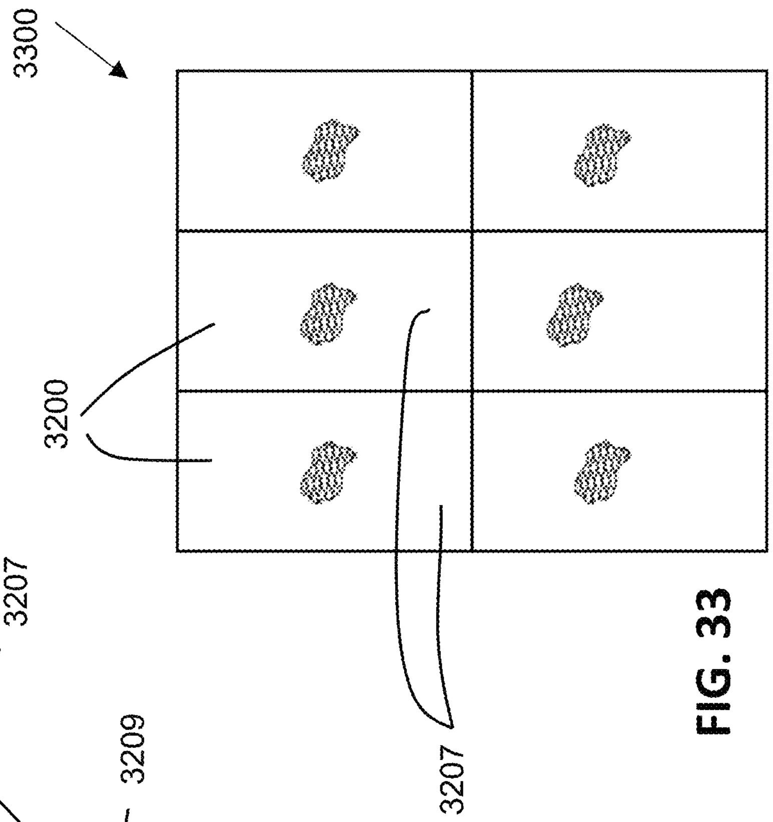
FIG. 33 is a top view of multiple ones of the lighting panels of FIG. 32 fastened together to form a light panel surface.

Turning to FIG. 32, another example embodiment of a lighting system is shown in the form of a lighting panel 3200. The lighting panel 3200 includes an exterior body 3201 and an internal supporting structure 3202 positioned within a void of the exterior body. Although not shown, there are lights positioned on the internal supporting structure 3202. Side walls 3203, 3204, 3205, 3206 each have fasteners 3209 to allow for fastening one lighting panel 3200 with another lighting panel 3200, as shown in FIG. 33. The fasteners are preferably magnetic based materials that are embedded in the side walls, or are covered with a covering material, or both. Other types of fasteners could be used, including, but not limited to, hook and loop fasteners under the tradename Velcro.

The upper and lower surfaces or walls 3207, 3208 of the exterior body 3201 preferably have holes. In an example embodiment, there are vertical channels that extend from the upper surface 3207 to the lower surface 3208, and the aggregate of the walls or material that form these vertical channels also form the exterior body 3201.

As shown in FIG. 33, a system 3300 of connected lighting panels 3200 is shown from the top view. These panels are connected by the fasteners. These panels can be used to form a larger lighting surface for a ceiling. For example, the system 3300 can be used to conveniently form drop ceilings or hanging ceilings, which includes integrated diffused lighting.

Figure 34A:
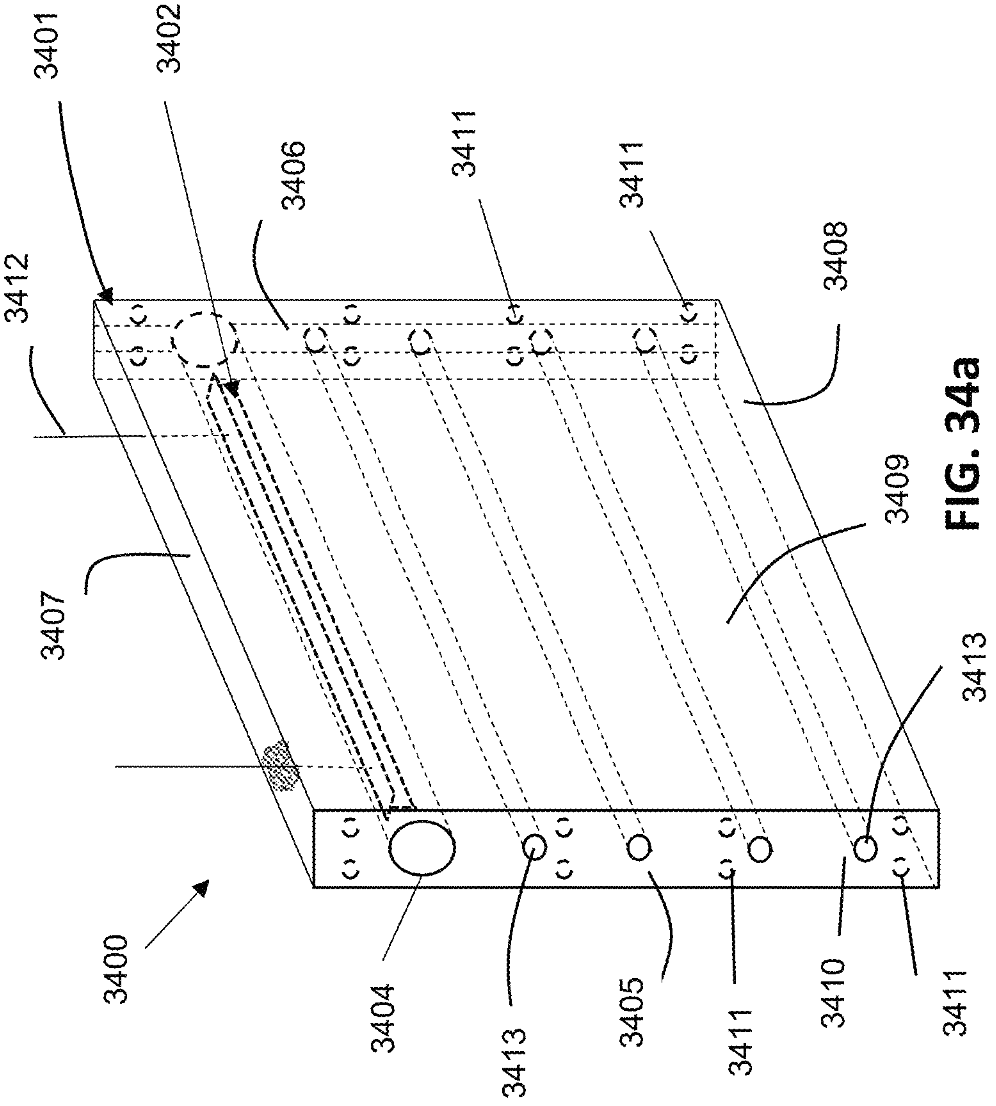
FIG. 34*a* is a perspective view of a vertically oriented lighting panel having an internal structure positioned within the lighting panel, according to an example embodiment.
Figure 34B:
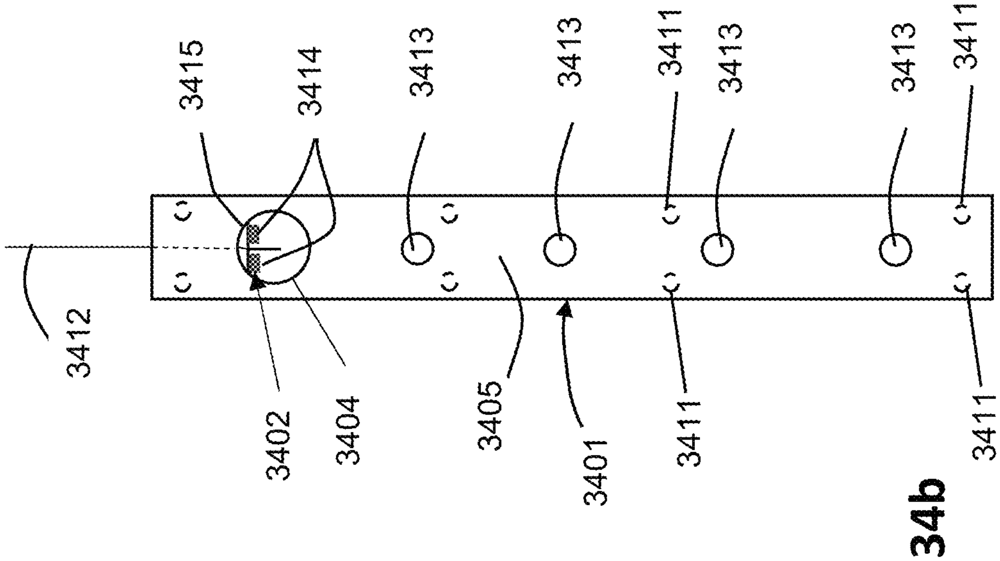
FIG. 34*b* is a side view of the vertically oriented lighting panel according to the example embodiment of FIG. 34*a*.

FIGS. 34*a* and 34*b* show another lighting system in the form of a hanging wall 3400, herein interchangeably called a lighting wall. The hanging wall 3400 is also herein called a partition. The hanging wall 3400 includes an exterior body 3401 that includes a passage 3404 or void defined therein, and extending along the horizontal length of the external body from the end surface 3405 to the end surface 3406. Within the passage 3404 is an internal supporting structure 3402 that has integrated lighting. In the example shown, the passage 3404 is located in the upper portion of the lighting wall 3400, and the entire hanging wall 3400 is hung by wires 3412 attached to the internal supporting structure 3402. By having the passage 3404 and the internal supporting structure 3402 positioned in the upper portion of the wall 3400, then the lower portion of the wall 3400 hangs downwards and the vertical orientation of the wall 3400 is maintained. As best seen in FIG. 34*b*, an upper surface or upper portion 3415 of the passage 3404 rests on the upper portion of the internal supporting structure 3402.

In another example, not shown, the passage 3404 and the internal supporting structure 3402 are positioned at a mid-way portion or at a lower portion of the hanging wall 3400. This would be useful for configuring the hanging wall 3400 to be free standing on a surface below (e.g., a ground surface). In this way, the center of gravity of the lighting wall is closer to the ground.

The exterior body 3401, for example, has multiple holes on the top surface 3407 and on the bottom surface 3408. In an example embodiment, channels run vertically from the top surface 3407 to the bottom surface 3408 of the exterior body. There may be few or no holes on the side surfaces 3409 and 3410.

In another aspect, there are fasteners 3411 located on the end surfaces 3405 and 3406 that allow multiple instances of a hanging wall 3400 to be connected end-to-end, or in seriatim. Preferably the fasteners are magnetic material, but other types of fasteners can be used. Non-limiting examples of other types of fasteners include latches, hook and loop fasteners, ties, and adhesives.

In another example aspect, one or more additional passages 3413 or voids are defined in the hanging wall, which extend from the end surface 3405 to the end surface 3406. As best seen in the end view of FIG. 34*b*, the area of the additional passages 3413 are positioned below the passage 3404, which holds the internal supporting structure 3402. In another example aspect, the additional passages 3413 are parallel to the internal passage 3404. These additional passages 3413 reduce the weight of the hanging wall and improve the transmissibility of the light, which is emitted from the internal supporting structure 3402, throughout the hanging wall. In other words, the additional passages reduce the amount of internal material, allowing light to illuminate and diffuse to the bottom of the hanging wall more evenly. In the example shown in FIGS. 34*a* and 34*b*, there are four additional passages positioned below the passage 3404. However, it will be appreciated that the number of additional passages can vary. For example, a shorter hanging wall may have a smaller number of additional passages, such as one or two additional passages. It will also be appreciated that the shape of the additional passages can vary from the circle area shape shown in FIG. 34*b*. Non-limiting examples of other shapes include square shapes, rectangle shapes, and irregular shapes.

In another aspect, the additional passages 3413 have a smaller area compared to the passage 3404 that holds the internal supporting structure 3402. In other words, the passage 3404 is sized to at least hold the internal supporting structure 3402, but the additional passages can be smaller. In this way, the reduction of structural integrity to the hanging wall caused by the additional passages 3413 of the hanging wall is lessened.

In an example aspect, the internal supporting structure 3402 has a T-shaped cross-section, including a flange and a web. The flange protrudes on both sides from the web. As best seen in FIG. 34*b*, lighting elements 3414, such as LEDs, are positioned along the underside of the flange and face downwards. The light emitted from the lighting elements 3414 is cast downwards to illuminate the partial or full height of the hanging wall 3400.

In another example aspect, the exterior body 3401 is a "softwall" or a "thinwall" sold by the company molo design, ltd. The softwall or thinwall are examples of a flexible cellular core formed from panels that, when pulled apart, form channels that extend vertically from the top surface 3407 to the bottom surface 3408. In an example aspect, the exterior body 3401 has the characteristics of a flexible article described in U.S. Pat. No. 9,512,615, titled "Flexible Furniture System", and incorporated herein by reference.

In an example aspect, fasteners 3411 are positioned towards the left edge and the right edge of an end surface 3405. The end surface 3405 is flexible and can be folded by positioning the left and right edges of the end surface 3405 together, to form a folded ending. The fasteners 3411 connect to each other to hold end surface 3405 in a folded position.

In an example aspect, the upper surface or surfaces 3415 that define part of the passage 3404 (or internal void) are formed from multiple edges of each panel that form the flexible exterior body 3401. When the core of the exterior body 3401 is extended, the edges of the panels that define the upper portion of the passage 3404 spread apart from each other forming a discontinuous surface 3415. In other words, a collection of edge surfaces of the panels form the overall surface 3415 or boundary that defines the upper portion of the void 3404. This internal surface 3415 or boundary of the internal void 3404 abuts and is supported by the internal structure 3402, which extends through the internal void 3404.

Other types of exterior bodies 3401 can be used to form the hanging wall 3400. For example, the exterior body is a rigid body or has a rigid frame. In another example, the exterior body is formed from rigid panels. The material of the exterior body is translucent to allow for light to pass through and create an illuminated wall.

Figure 34D:
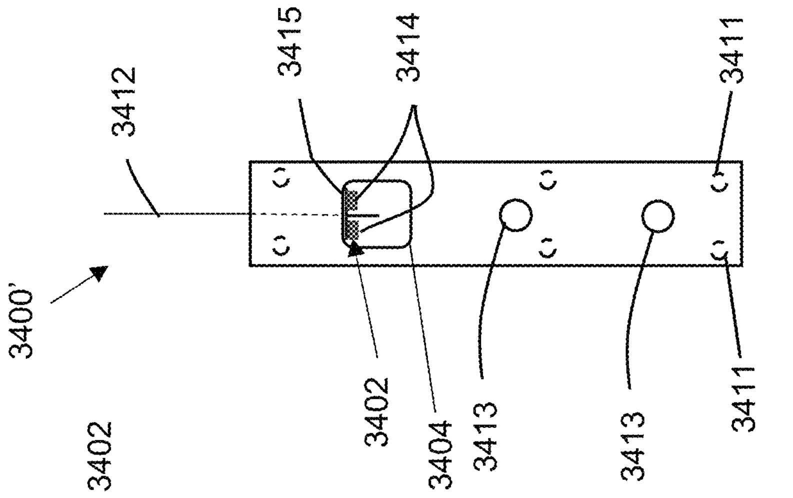
FIG. 34*d* is a side view of the vertically oriented lighting panel according to the example embodiment of FIG. 34*c*.
Figure 34C:
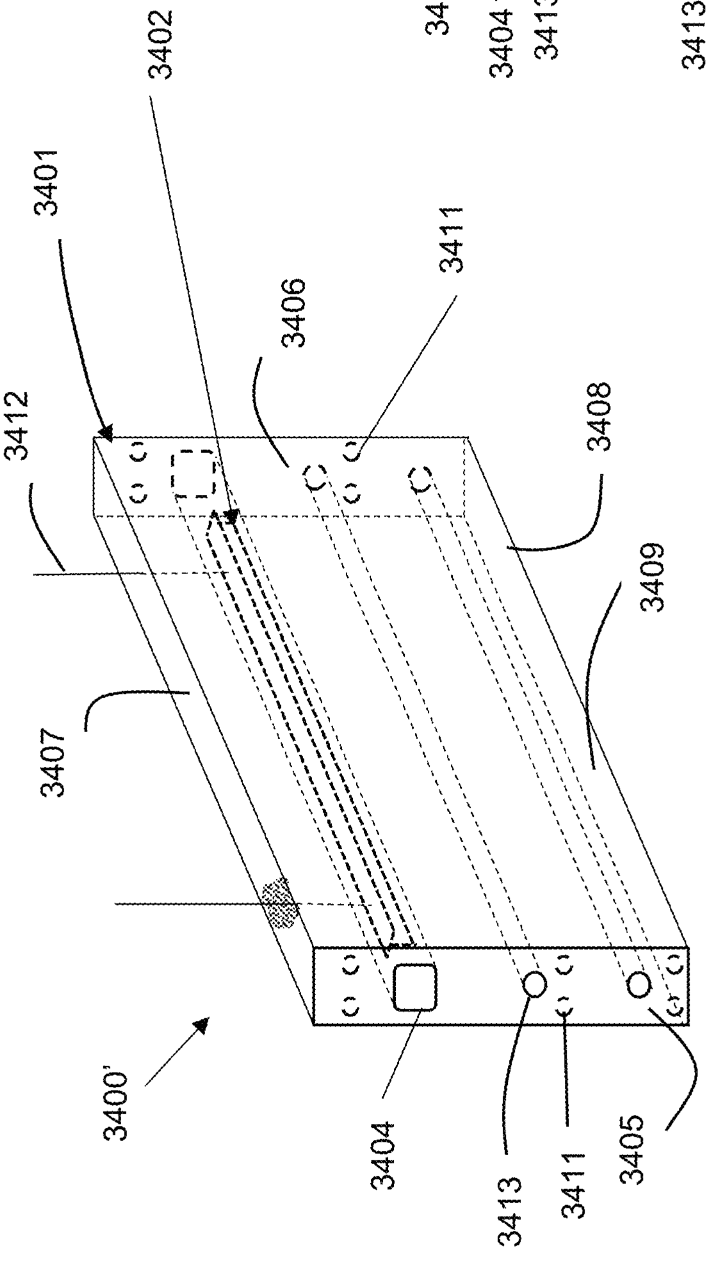
FIG. 34*c* is a perspective view of a vertically oriented lighting panel having an internal structure positioned within the lighting panel, according to another example embodiment.

Turning to FIGS. 34*c* and 34*d*, another example embodiment of a hanging wall 3400'. The height of the exterior body 3401 of the hanging wall 3400' is shorter compared to the embodiment shown in FIGS. 34*a* and 34*b*. The cross-sectional shape of the passage 3404 is square. It will be appreciated that different shapes can be used to create the passage 3404.

It will be appreciated that the height of the exterior body can vary. In some example embodiments, the height of the exterior body can range from 12 inches to 96 inches. In other example embodiments, the exterior body is taller than 96 inches. In other example embodiments, the exterior body is shorter than 12 inches, and is used as a partition, or a lighting system, or both.

Figure 34F:
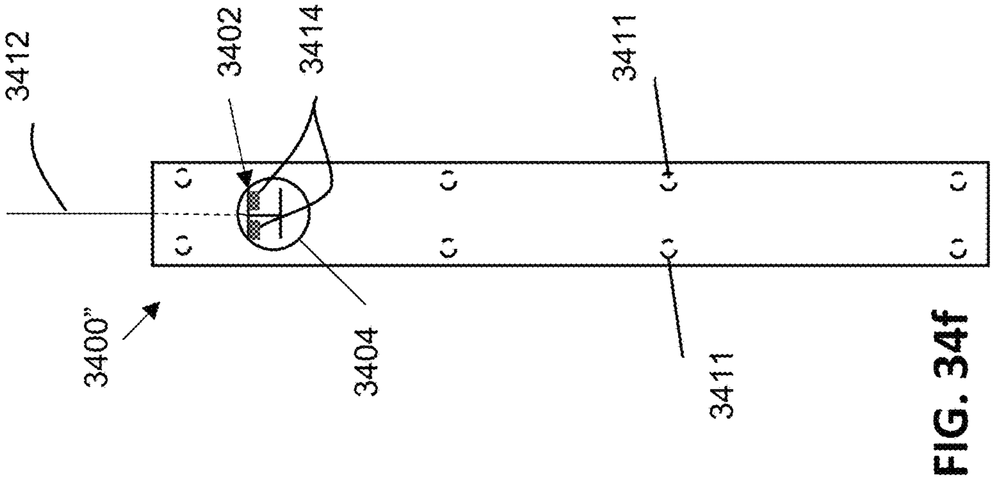
FIG. 34*f* is a side view of the vertically oriented lighting panel according to the example embodiment of FIG. 34*e*.
Figure 34E:
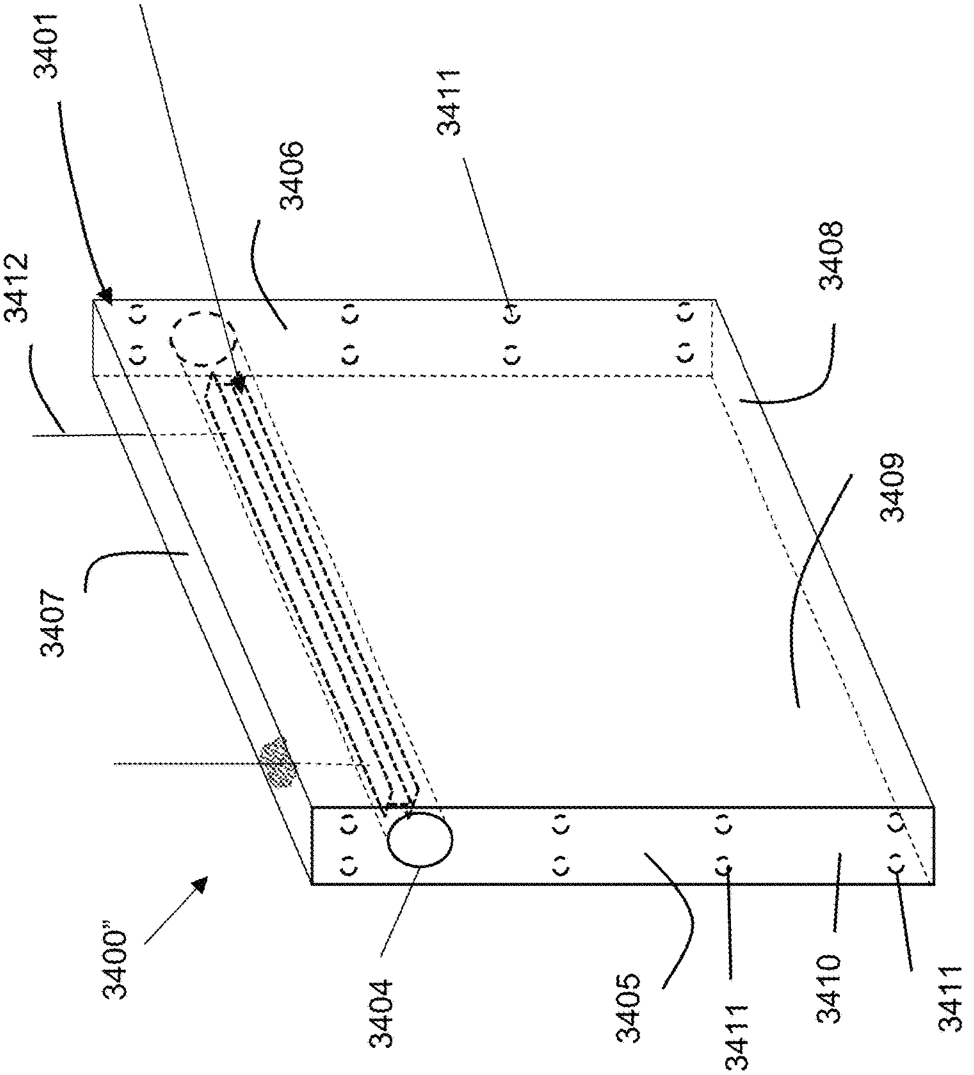
FIG. 34*e* is a perspective view of a vertically oriented lighting panel having an internal structure positioned within the lighting panel, according to another example embodiment.

Turning to FIGS. 34*e* and 34*f*, another example embodiment of a hanging wall 3400" is shown. The internal supporting structure 3402 is an I-beam with lighting elements 3402 positioned on a flange facing downwards.

It will be appreciated that different types of internal supporting structures can be used, along with different positions of lightings elements on the internal supporting structure.

Figure 35:
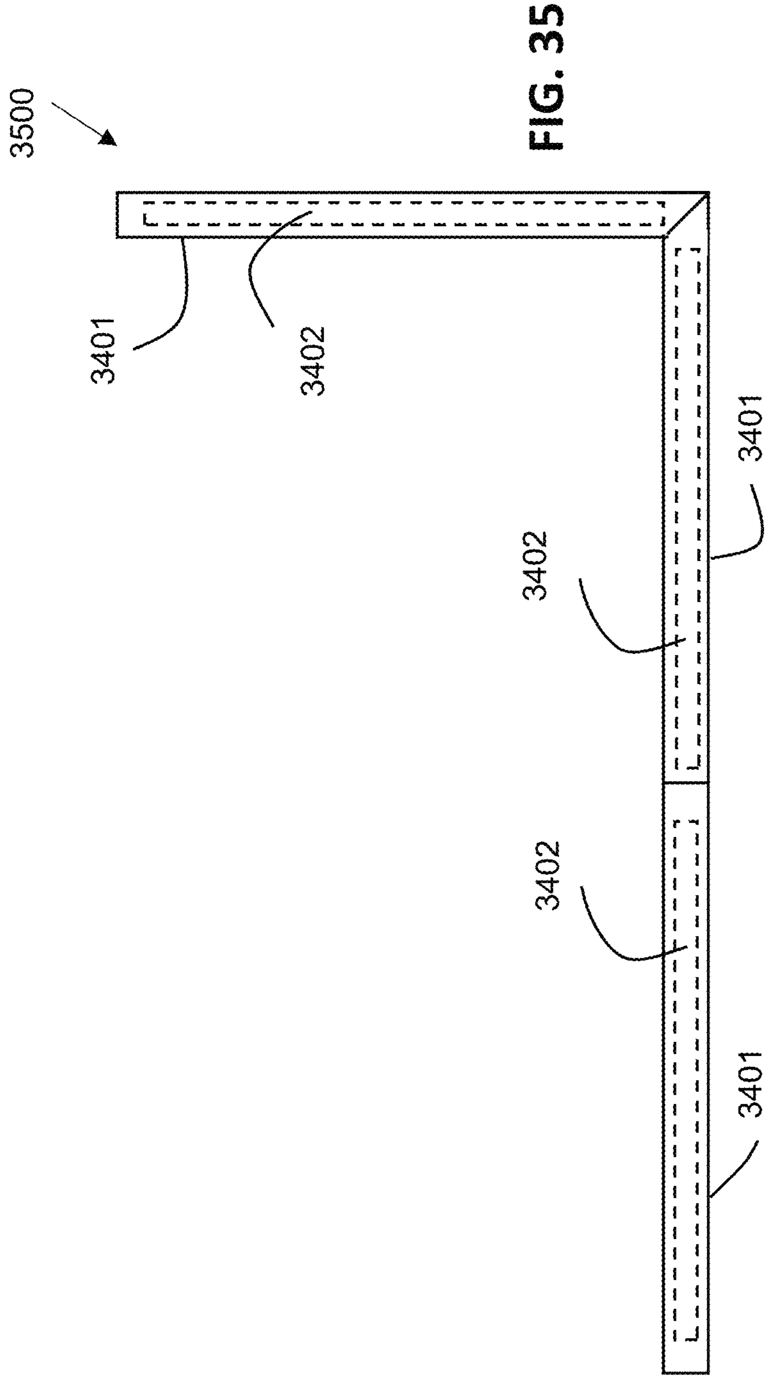
FIG. 35 is a top view of multiple ones of the vertically oriented lighting panels according to an example embodiment in any of FIGS. 34*a* to 34*f*, which are fastened together in seriatim.

FIG. 35 shows a top view of multiple hanging walls (also called lighting walls) 3400 or 3400' or 3400" connected in seriatim to form a continuous wall 3500. In particular, two of the walls 3400 are connected linearly, while another two walls are connected at an angle. As can be seen in FIG. 35, there is a gap between the ends of the internal supporting structures 3401. As can also be seen, for the two walls connected at an angle, the connected end surfaces are angled so that they can be flush with each other. For example, this end surface of a "softwall" or a "thinwall" can be angled, since this type of exterior body is flexible.

FIG. 36 shows an angled connector 3600 for connecting two internal supporting structures in place. The connector includes two end faces 3601 and 3602, which both have a receiving cavity. As best seen on the end face 3602, the receiving cavity 3603 is shaped to have a complimentary profile of an end of an internal supporting structure. For example, if the internal supporting structure is shaped like an I-beam with an upper flange that is wider than a lower flange, then the receiving cavity 3603 is shaped to match it, or to be very similar to such a shape from an end-view of the I-beam. In this way, the end of the internal structure can be inserted into the receiving cavity 3603. If the internal supporting structure has another shape, like a C-beam, a T-beam, an L-beam, an X-beam, etc., then the receiving cavity is shaped to be complimentary.

Although the angled connector 3600 is shown to have approximately a 90 degree bend, it can be appreciated that other angles or curves can be used to create other configurations of connectors.

FIG. 37 shows a linear connector 3700, including an end face 3702 and a receiving cavity 3703.

FIG. 38 shows the continuous wall 3500, but now including a linear connector 3700 and an angled connector 3600 used to hold together and connect internal support structures 3402.

Figure 39:
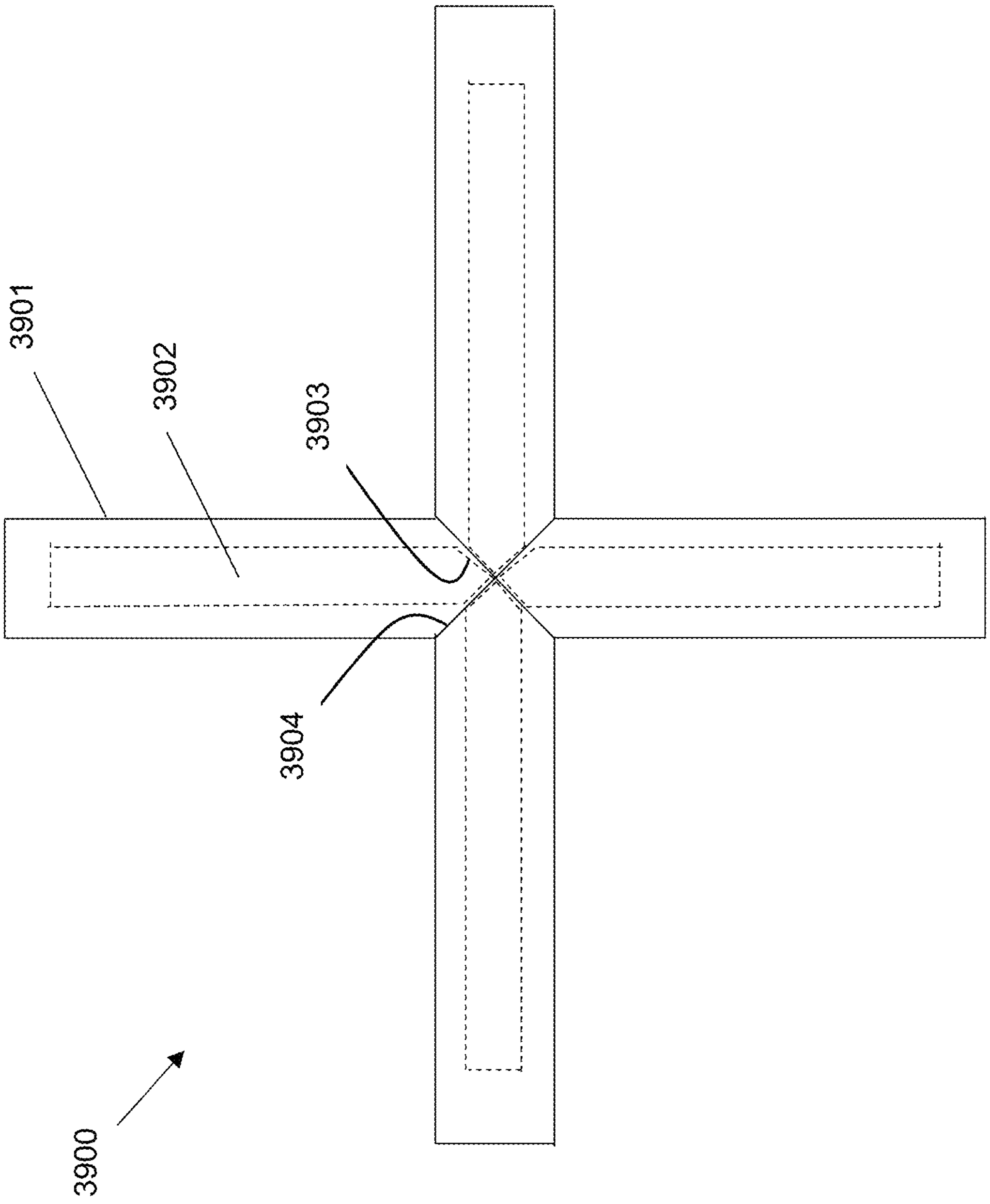
FIG. 39 is a top view of a lighting system including four exterior bodies that respectively have inside four internal structures, and these components are arranged to form a cross.

FIG. 39 shows a top view of a lighting system 3900 that includes four exterior bodies 3901 that are arranged in a cross configuration. Each of the exterior bodies have within it an internal supporting structure 3902.

In an example embodiment, an end 3903 of each of the internal supporting structure is beveled to form a peak. This allows for the ends of the internal supporting structures to be placed close together in a cross configuration. Similarly, an end 3904 of each exterior body is also angled to form a peak, so that the four exterior bodies can be joined together to form a cross.

In an example embodiment, the exterior body 3901 is the same as the exterior body 1202, described in FIGS. 12 to 15*b*. The left and the right portions 1407 and 1406 of an end panel 1410 are flexed backwards to form the peak, and the fasteners 1408 on one end panel connect to fasteners on another end panel.

In the example shown in FIG. 39, the height of the exterior body can vary. For example, the exterior body can be hanging walls (e.g., as shown in FIGS. 34*a* to 34*f*) or can be shorter (e.g., as shown in FIGS. 1 and 12).

Figure 40:
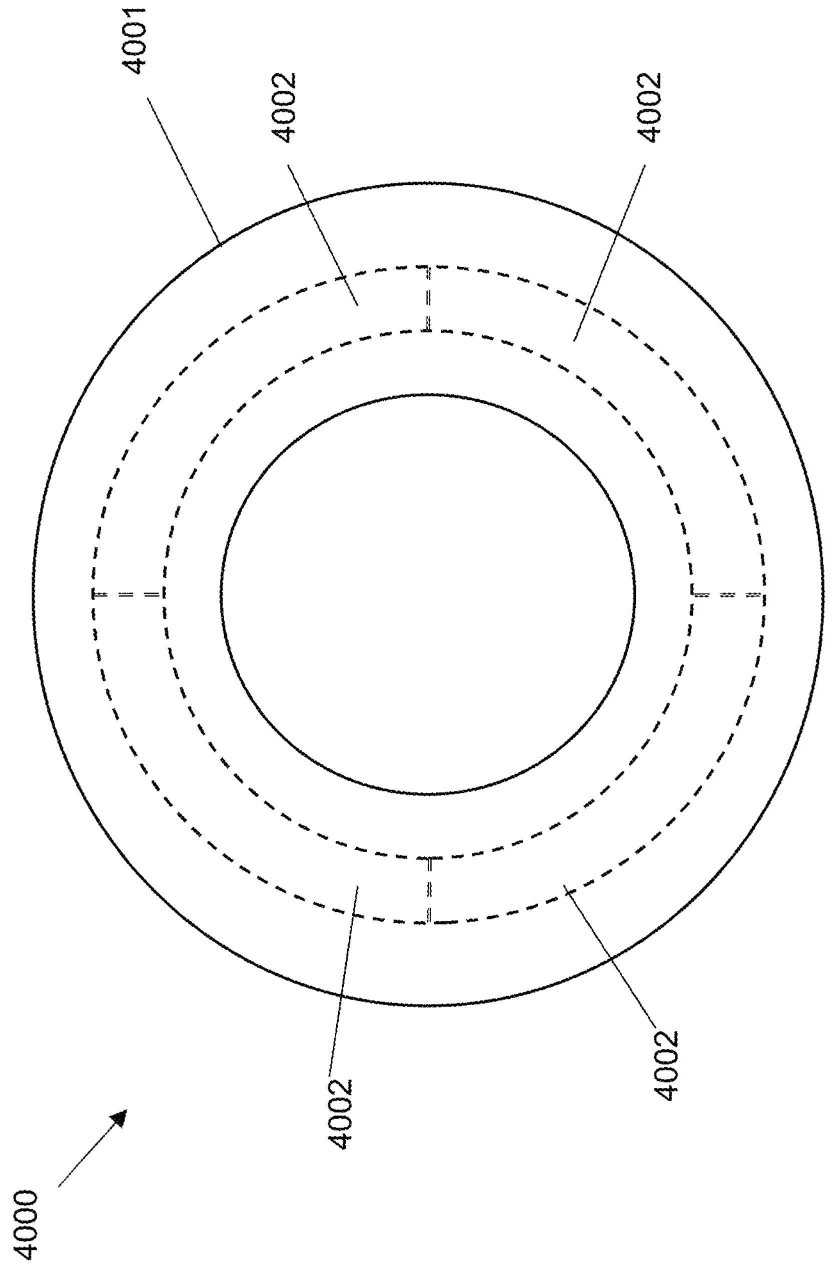
FIG. 40 is a top view of a lighting system including one or more exterior bodies that have inside four internal structures, and these components are arranged to form a circle.

FIG. 40 shows a top view of a lighting system 4000 that includes an exterior body 4001 having several curved internal supporting structures 4002 positioned therein. The system 4000 forms a circle.

In an example embodiment, the exterior body 4001 can formed from multiple smaller exterior bodies that are joined together. In another example embodiment, the one or more exterior bodies are the same as the exterior body 1202 described in FIGS. 12 to 15*b*. In other words, a flexible exterior body 1202 (or multiple instances of the body 1202 fastened together) encircle the internal supporting structures 4002.

In the example shown in FIG. 40, the height of the exterior body can vary. For example, the exterior body can be lighting walls (e.g., as shown in FIGS. 34*a* to 34*f*) or can be shorter (e.g., as shown in FIGS. 1 and 12).

Figure 41B:
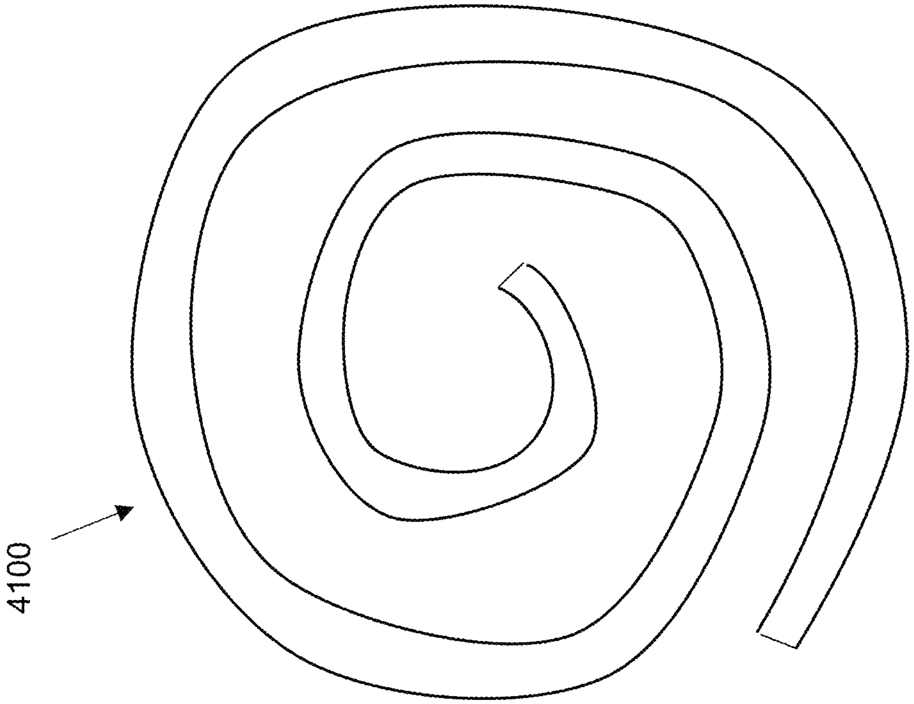
FIGS. 41*a* and 41*b* are respectively a side view and a top view of an internal structure in isolation, shaped as a conical helix.
Figure 41A:
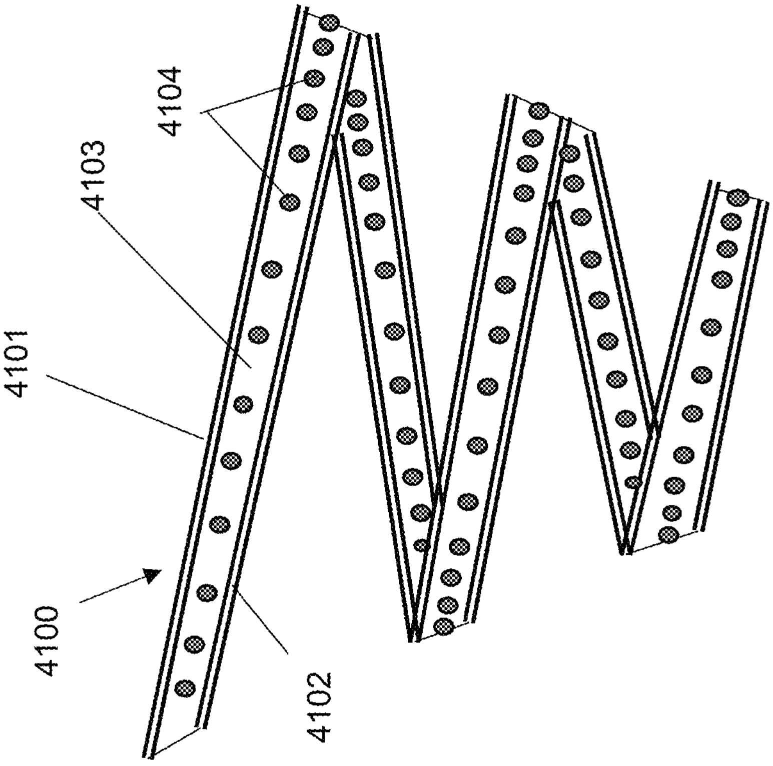

FIGS. 41*a* and 41*b* show the internal supporting structure 4100 in isolation. It has a conic helix shape. As can be seen from the side view in FIG. 41*a*, the structure 4100 includes an upper flange 4101, a web 4103 and a lower flange 4102. Lights 4104 are positioned on both sides of the web 4103.

A fabric covering can be used to cover the sides. Alternatively, one or more flexible exterior bodies 1202, as described in FIGS. 12 to 15*b*, can be used to cover the length of the structure 4100. If multiple flexible exterior bodies 1202 are used, it is appreciated that the exterior bodies 1202 are fastened together using fasteners 1408.

The internal supporting structure 4100 could be used, for example, to form a chandelier.

It is appreciated that the internal supporting structure 4100 can bend in three dimensions, along different axes, to create interesting design shapes, and while providing structural support and diffused lighting.

Figure 42:
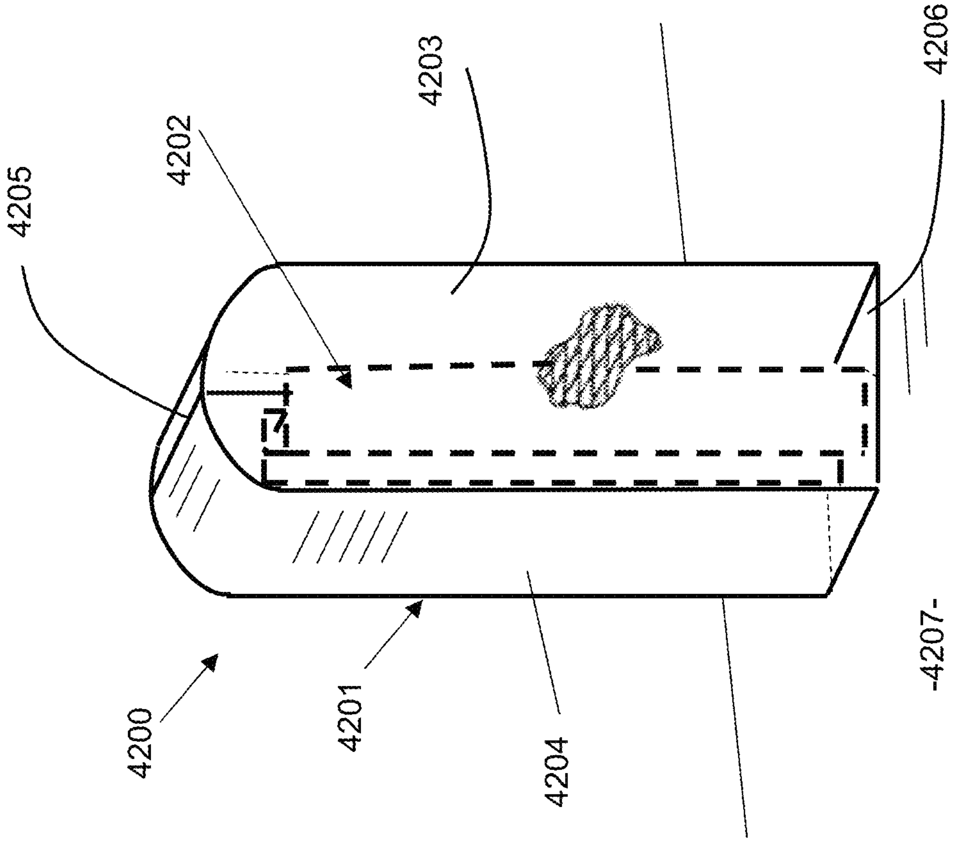
FIG. 42 is a perspective view of a vertically oriented lighting system that is self-supported and standing on a surface.

FIG. 42 shows another example embodiment of a lighting system 4205 that includes an exterior body 4201 and an internal supporting structure 4202 positioned inside the exterior body. The internal supporting structure 4202 is vertically oriented and is freestanding on a surface 4207 (e.g. a ground surface). For example, the combination of the flanges and the web support the internal supporting structure 4202 on its end. In an example embodiment, the internal supporting structure is shaped like an I-beam, as shown in the figure. However other configurations of the structure 4202 are possible.

The exterior body 4201 has a front surface 4203 and an opposite back surface that have holes. The internal support structure 4202 is oriented to that the flanges are positioned between the light and the holes, so that the lights are not directly visible through the holes. Preferably, the lights are positioned on the web of the internal support structure, although other positions are possible. The side surfaces 4204 of the exterior body do not have holes. It is appreciated that, in this vertical orientation, there is no "upper" flange or "lower flange", but simply one or more flanges that extend at an angle from a web.

In an example embodiment, the exterior body 4201 is the same as the exterior body 1201 described in FIGS. 12 to 15*b*. The top portion 4205 of the exterior body 4201 has an end panel that is folded closed, and the bottom portion 4206 has an end panel that is in the open position and rests on the ground surface 4207. The exterior body 4201 is held upright by the internal supporting structure 4202.

Figure 43:
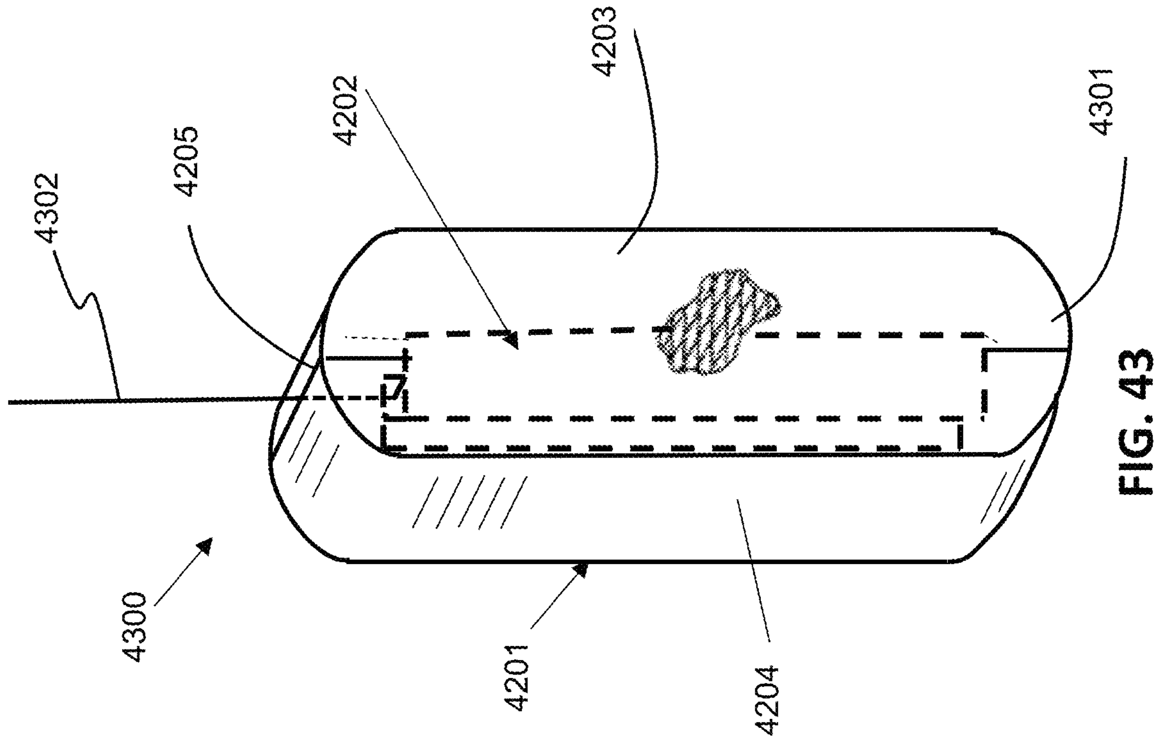
FIG. 43 is a perspective view of a vertically oriented lighting system that hangs from an overhead structure.

FIG. 43 shows a lighting system 4300, which is similar to 4200, but is arranged in a hanging configuration. The exterior body 4201 is similar, but the bottom portion 4301 has an end panel that is folded to be in the closed position. A hanging cable or wire 4302 is connected to an end of the internal supporting structure 4202, and the cable or wire 4302 extends up and out of the exterior body.

Figure 44A:
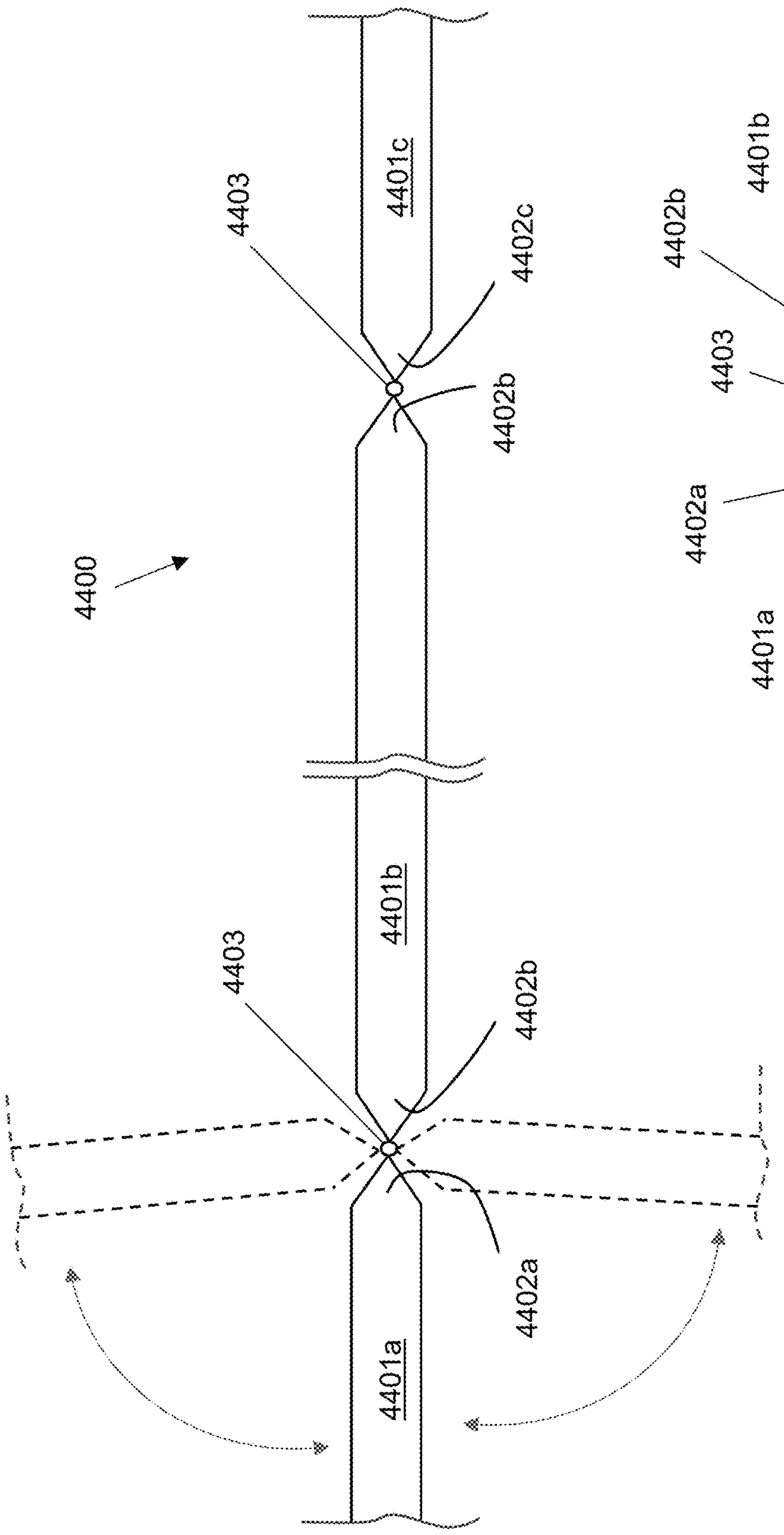
FIG. 44*a* is a top view of a series of internal structures joined together in seriatim with a movable joint, according to another example embodiment.

Turning to FIG. 44*a*, multiple internal structures 4401*a*, 4401*b*, 4401*c* are shown in a top view being connected to each other in seriatim. They are joined together with movable joints 4403. The exterior body or exterior bodies that shroud the internal structures are not shown here so as to more clearly show the features of the internal structures and their connection to each other. Different types of exterior bodies can be used to shroud the internal structures.

As can be seen, the end portion 4402*a* of the internal structure 4401*a* narrows or gradually becomes smaller towards its outermost end, where it connects to the movable joint 4403. The end portion 4402*b* of the internal structure 4401*b*, which also connects to the movable joint 4403 to connect to the internal structure 4401*a*, also narrows towards its outermost end. In this way, when the internal structures 4401*a* and 4401*b* rotate relative to each other (e.g., yaw), there is space for them to rotate across a large range of angles.

The end portions 4402*b* and 4402*c* of the respective internal structures 4401*b* and 4401*c* are also narrowed or angled to a small size to allow for a larger range of rotation.

Figure 44B:
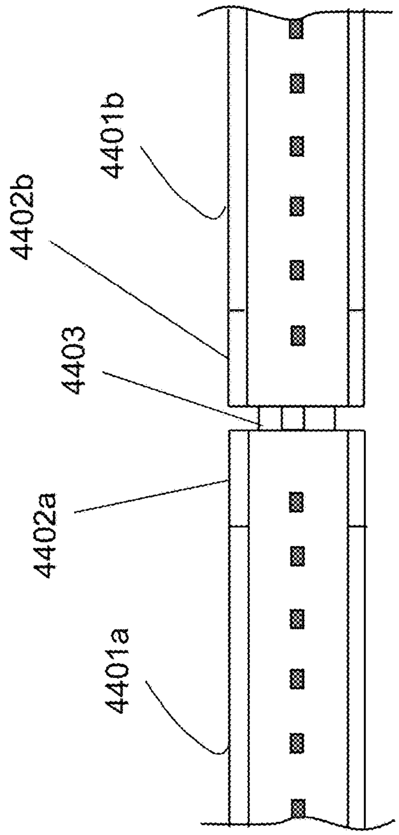
FIG. 44*b* is a side view of two of the internal structures shown in FIG. 44*a*.

FIG. 44*b* shows a side view of the internal structures 4401*a* and 4401*b* shown in FIG. 44*a*. The movable joint 4403, in this example, is a hinge that includes interlocking knuckles held together with a pin. The internal structures are able to rotate (e.g., yaw) around the vertical axis defined by the pin.

It can be appreciated that other types of movable joints can be used.

Figure 45A:
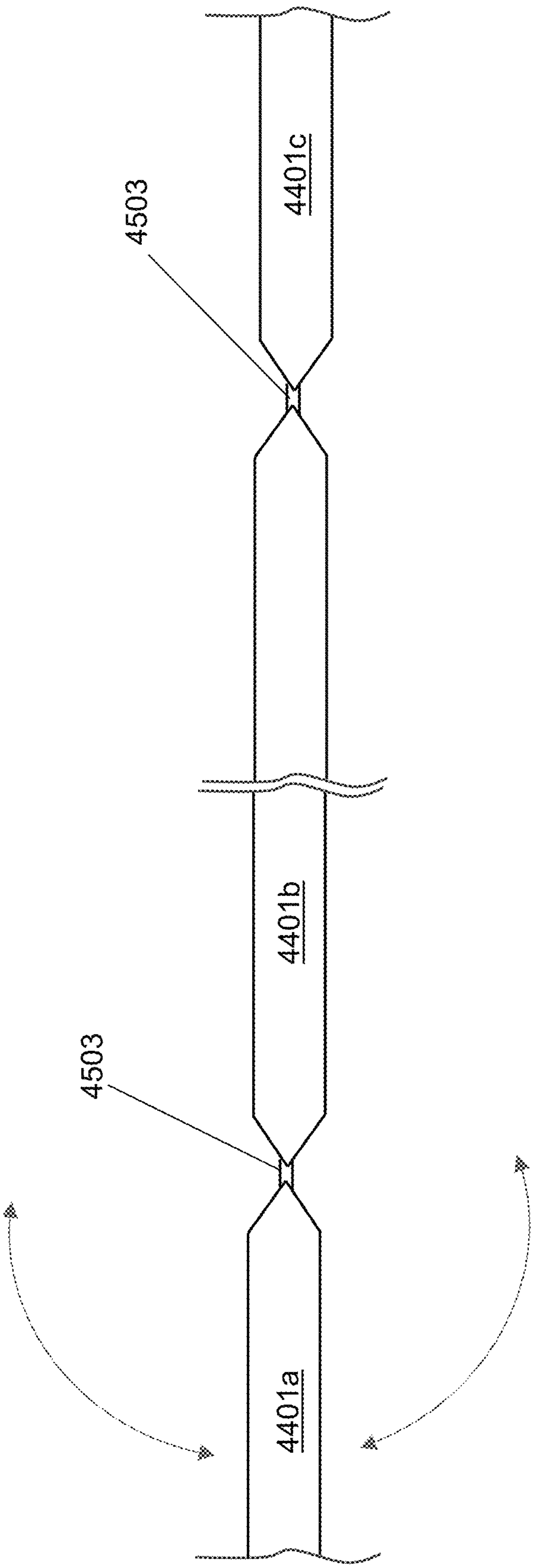
FIG. 45*a* is a top view of a series of internal structures joined together in seriatim with a movable joint, according to another example embodiment.
Figure 45B:
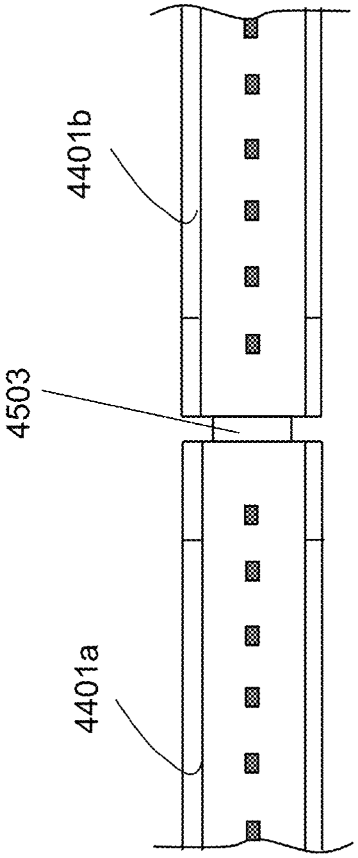
FIG. 45*b* is a side view of two of the internal structures shown in FIG. 45*a*.

FIGS. 45*a* and 45*b* shown another movable joint 4503 that is a flexible material that allows connected internal structures to rotate relative to each other. For example, the flexible material is one or more of plastic, rubber, fabric, a textile, a metal, etc. that allows for flexing back and forth.

Figure 46B:
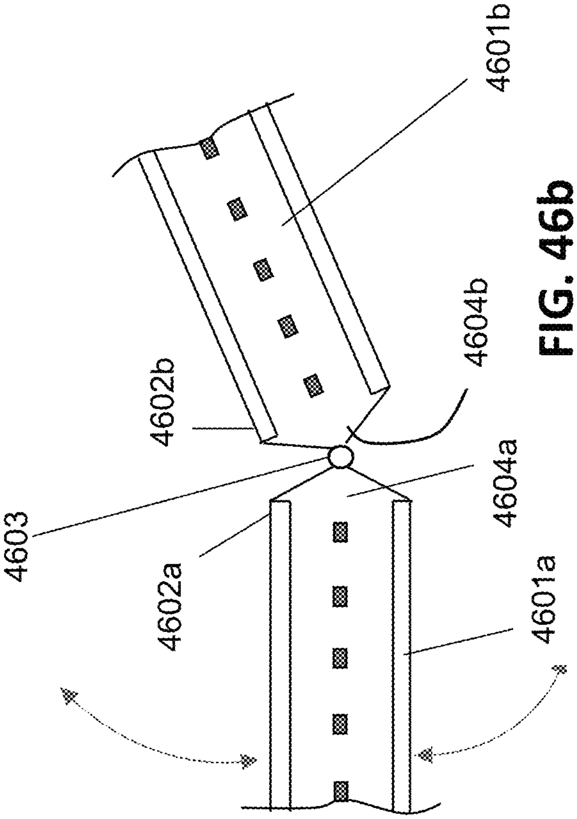
FIG. 46*b* is a side view of two of the internal structures shown in FIG. 46*a*.
Figure 46A:
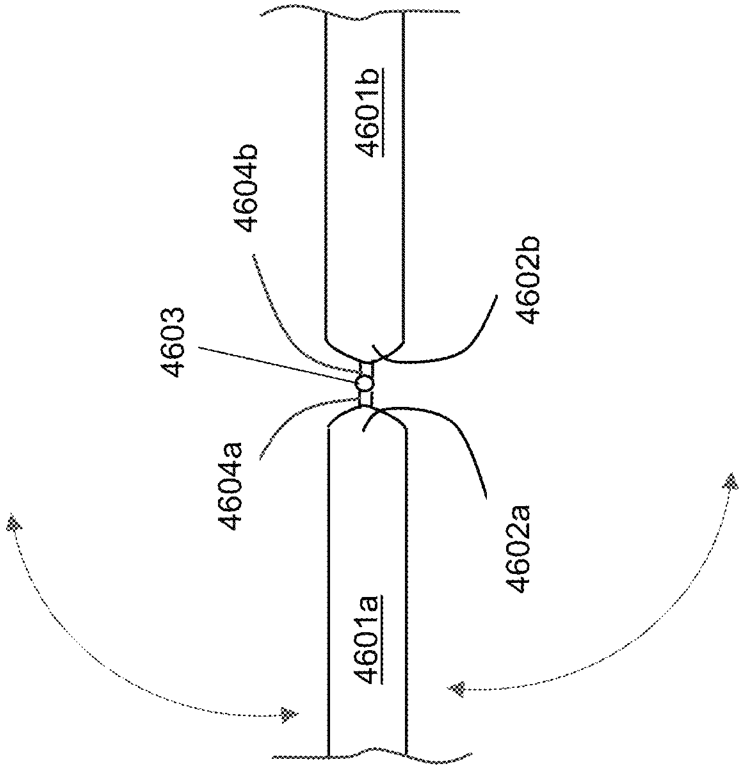
FIG. 46*a* is a top view of a series of internal structures joined together in seriatim with a movable joint, according to another example embodiment.

FIG. 46*a* shows, from a top view, another example embodiment of two internal structures 4601*a* and 4601*b* connected together using a ball joint 4604. The end portion 4602*a* of a flange of the internal structure 4601*a* has a curved end, and the end portion 4602*b* of a flange of the internal structure 4601*b* also has a curved end. They are curved to allow for a larger range of rotation (e.g., in the yawing motion). In other words, the narrowing shape does not need to be linear (e.g., a straight line), but can take on other shapes, including and not limited to a curved end.

As can be seen in FIG. 46*b*, which shows the side view, an end portion of the web 4604*a* juts out from the flange and the end portion of the web 4604*a* also narrows as it extends towards the ball joint 4603. Similarly, the end portion of the web 4606*b* also narrows as it extends towards the same ball joint 4603. This allows for a greater range of angles that the two internal structures 4601*a* and 4601*b* can pitch relative to each other.

Other types of joints that can be used to connect two ends of internal structures, while providing yaw or pitch rotational freedom, or both, between these internal structures, are applicable to the principles described herein.

Figure 47A:
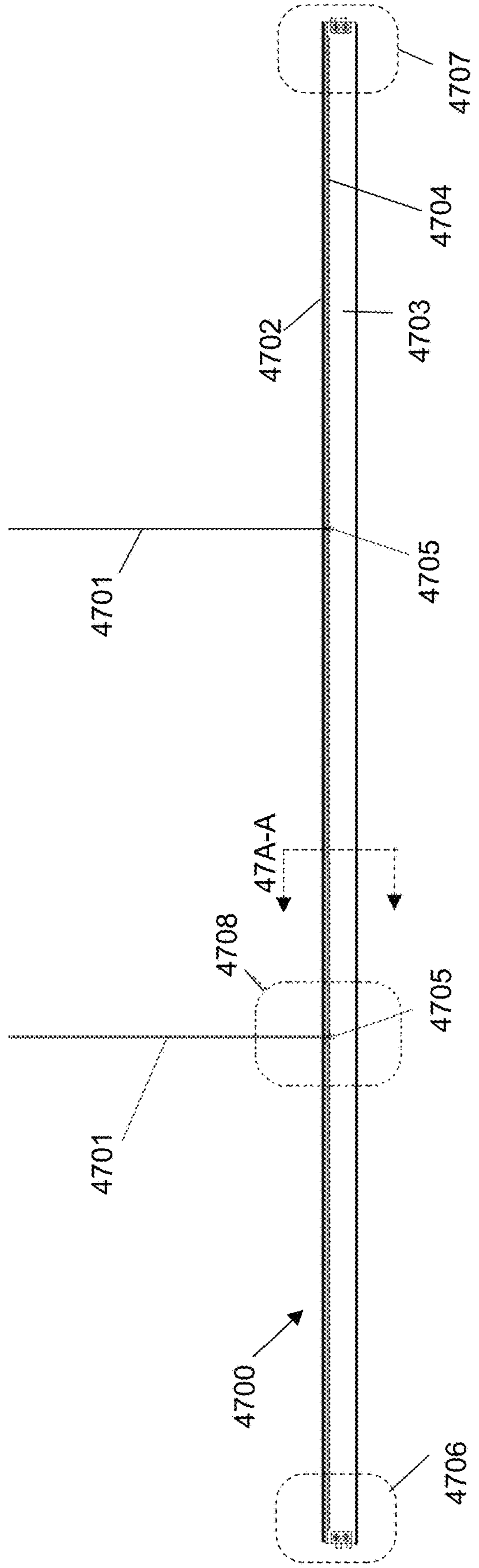
FIG. 47*a* is a side view of an internal structure shown in isolation, according to an example embodiment.
Figure 47B:
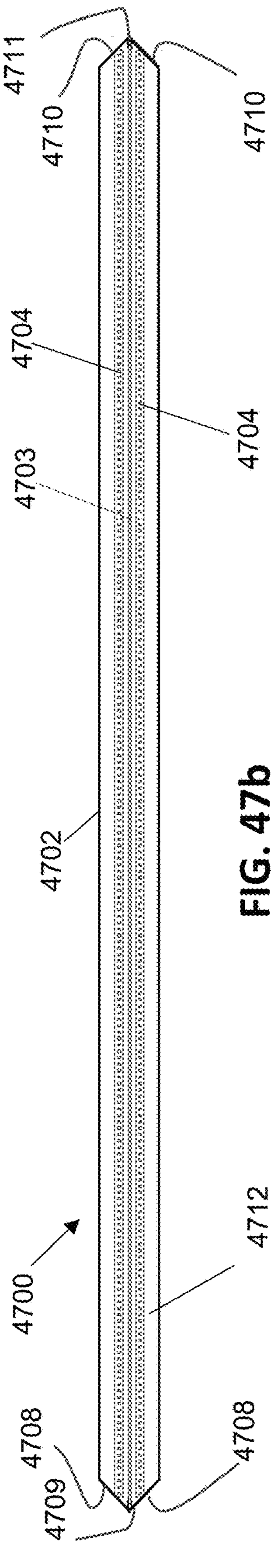
FIG. 47*b* is a bottom view of the internal structure of FIG. 47*a*.
Figure 47C:
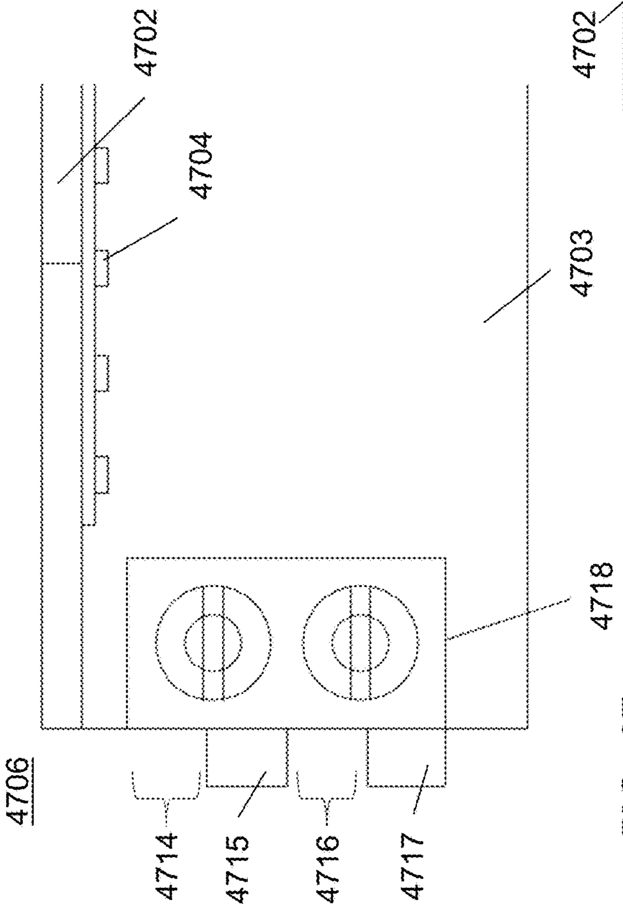
FIGS. 47*c* and 47*d* are close-up side views of the end portions of the internal structure shown in FIG. 47*a*.
Figure 47D:
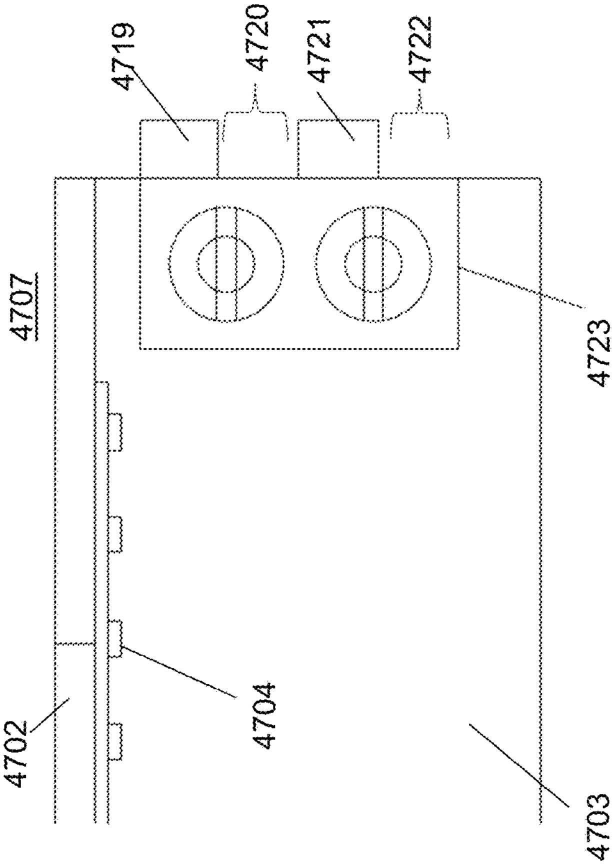
Figure 47E:
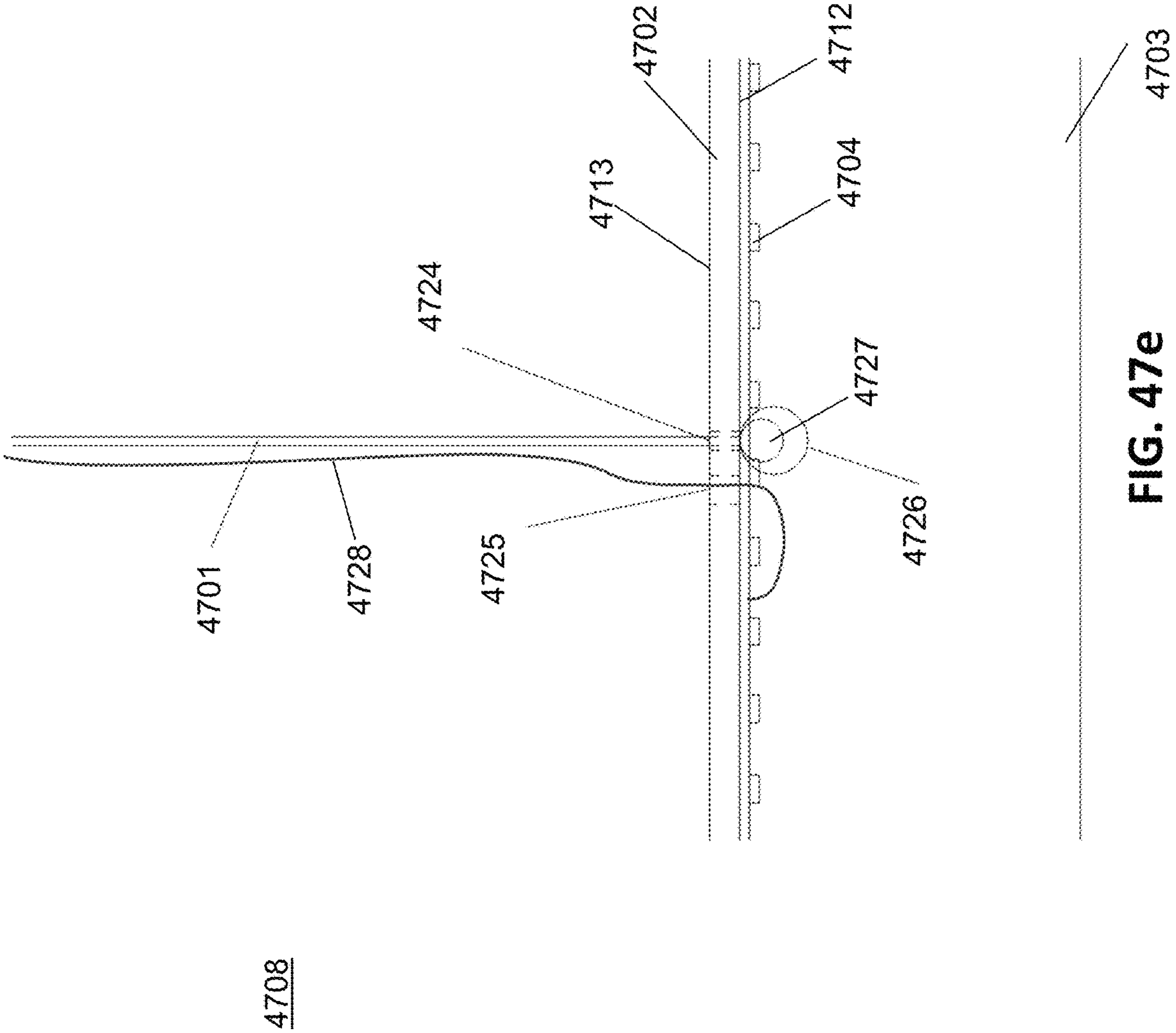
FIG. 47*e* is a close-up side view of the suspension cable attached to the internal structure shown in FIG. 47*a*.
Figure 47F:
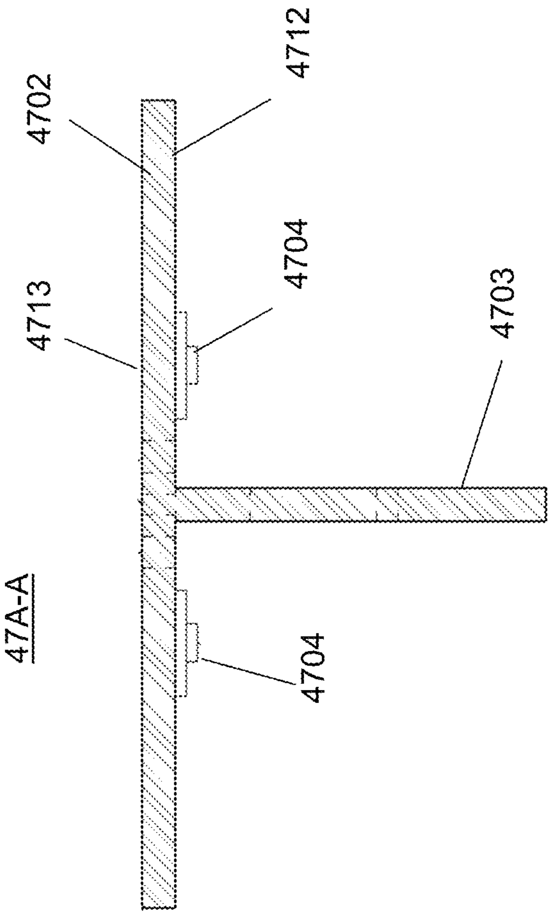
FIG. 47*f* is a cross-sectional view of the internal structure shown in FIG. 47*a*.

Turning to FIGS. 47*a* to 47*f*, an example embodiment of an internal supporting structure 4700 is shown in isolation connected to two wires or suspension supports 4701 to suspend the internal supporting structure. The exterior body, which can hang from the internal supporting structure, is not shown. FIG. 47*a* shows a side view and FIG. 47*b* shows a bottom view. The internal supporting structure has a T-shaped cross-section as best shown in FIG. 47*f*. Lighting elements 4704 are positioned on the underside surface 4712 of the flange 4702, on both sides of the web 4703. The lighting elements point downwards. This configuration can be used with a hanging wall, such as shown in FIGS. 34*a* to 34*d*. In another example, this configuration of the internal supporting structure and lighting elements can be combined with other types of exterior bodies. In another example embodiment, there are no lighting elements 4704.

As better seen in FIG. 47*b*, the end sections 4706 and 4707 of the internal supporting structure has tapered flanges. In other words, the flange width 4708 at each end narrows or gradually becomes smaller towards its outermost point 4709. This also occurs with the flange width 4710 narrowing to the outermost point 4711. This allows for multiple internal supporting structures to be connected at their ends, and at various angles to each other.

As shown in FIGS. 47*c* and 47*d*, the end sections 4706 and 4707 of the internal supporting structure include knuckles. On one end section 4706, in FIG. 47*c*, starting from the top down, there is a space 4714; followed by a knuckle 4715; followed by a space 4716; and followed by a knuckle 4717. The components are, for example, part of a hinge bracket 4718. In an opposite end section 4707, in FIG. 47*d*, starting from the top down, there is a knuckle 4719; followed by a space 4720; followed by a knuckle 4721; and followed by a space 4722. These components are part of a hinge bracket 4723. This configuration allows the ends of a first internal supporting structure to connect to a second internal supporting structure with the same end sections. The knuckles from the first and the second internal supporting structures align vertically with each other, and a pin is inserted through the knuckles to form a hinge.

FIG. 47*e* shows a close-up view of the hanging wire or suspension wire 4701 connected to the internal supporting structure. A flange hole 4724 is defined in the flange 4702, extending from the top surface 4713 to the underside surface 4712, and it is aligned with the web 4703. This flange hole 4724 is created, for example, by drilling or cutting a hole into the flange from the top surface 4713 of the flange. A web hole 4726 is defined in the web 4703 and it is aligned to intersect with the flange hole 4724. For example, the web hole 4726 is drill or cut from the side into the web 4703. The suspension wire 4701 passes through the flange hole 4724 and into the space or void of the web hole 4726. The web hole 4726 is sized larger than the flange hole 4724, and is sized large enough to hold a stopping element 4727, also herein called a stopper. In particular, the end of the suspension wire 4724 is secured to a stopping element 4727, and the stopping element 4727 holds the suspension wire to the internal supporting structure. In other words, the end of the wire is secured to the stopping element 4727, which is positioned in the web hole 4726, and the stopping element stops the end of the wire from slipping through the flange hole 4724. In an example embodiment, the stopping element 4727 is a ball, or a knotted bundle of the suspension wire, or a washer, or some other mass that is larger in size than the flange hole 4724.

Also shown in FIG. 47*e* is a hole 4725 defined in the flange 4702 for an electrical wire 4728 to pass through. One end of the electrical wire is connected to the lighting elements (e.g., LED strip) and supplies electrical power to the lighting elements. The electrical wire, for example, passes through the hole 4725 in the flange and travels up alongside the suspension wire 4701.

It will be appreciated that other mechanisms for attaching a hanging support, such as a wire or a rod, to the internal supporting structure can be used. For example, hooks and eye loops can be used.

Figure 48:
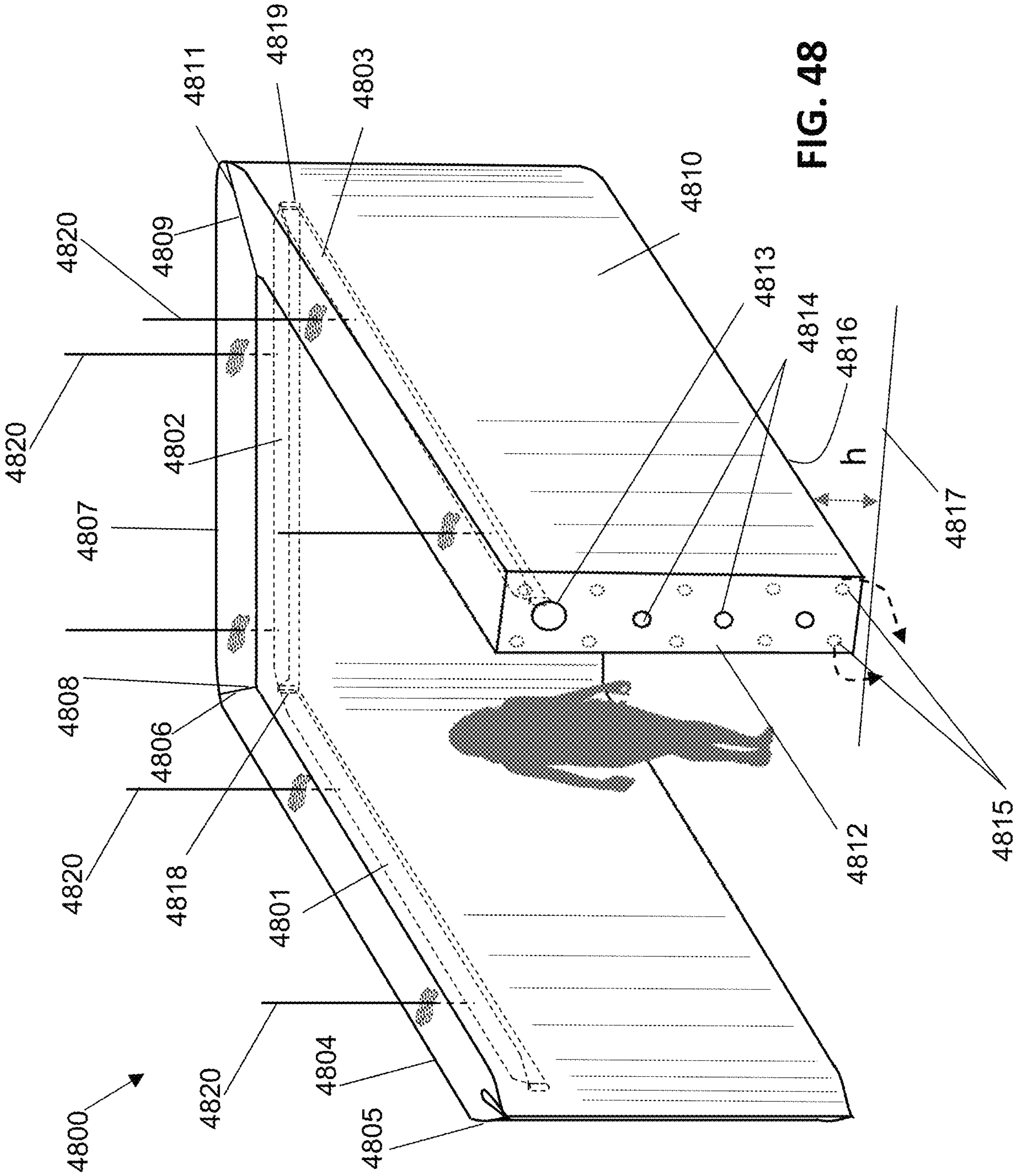
FIG. 48 is a perspective view of a partially enclosed room formed from suspended walls, which include internal structures, according to an example embodiment.

Turning to FIG. 48, an example embodiment of a partially enclosed room 4800 is shown, which is form from suspended or hanging walls. In an example embodiment, these walls, also herein called partitions, are internally illuminated. In another example, there is no internal illumination in these hanging walls or partitions. Internal support structures 4801, 4802, and 4803 are suspended from a structure located above (e.g., a ceiling structure) by suspension wires 4820. An exterior body 4804 hangs from, or is supported by, the internal support structure 4801; an exterior body 4807 hangs from, or is supported by, the internal support structure 4802; and the exterior body 4810 hangs from, or is supported by, the internal support structure 4803. Each exterior body has defined therein a longitudinal passage that extends along the length of the exterior body, and an internal support structure is positioned within the longitudinal passage. An opening 4813 to a longitudinal passage is shown in the end surface 4812 of the exterior body 4810.

Each exterior body forms a suspended wall of the room. Preferably, the exterior body has a flexible core that can be extended and compressed along its length. For example, the exterior body's core includes vertically oriented cells with openings at the top and the bottom of the exterior body, and the vertically oriented cells can compress or expand. An example of an exterior body is a "softwall" or a "thinwall" sold by the company molo design, ltd. Other types of flexible exterior bodies can be used to form the walls of the partially enclosed room 4800. Alternatively, the exterior bodies shown in FIG. 48 are rigid.

In an example aspect, the internal support structure 4801 is connected using a rotatable connector 4818 (e.g., a hinge or another type of connector) to the internal support structure 4802, and the internal support structure 4802 is connected using rotatable connector 4819 (e.g., a hinge or another type of connector) to the internal support structure 4803.

In an example aspect, the internal support structures 4801, 4802, and 4803 have the same configuration as the internal support structure 4700. In another example aspects, a different type of internal support structure is used to form the partially enclosed room.

In an example aspect, the internal support structures 4801, 4802, and 4803 include lighting elements. Preferably, each of the exterior bodies is formed from a translucent material so that light from lighting elements can illuminate the suspended walls, which are the exterior bodies, thereby illuminating the partially enclosed room 4800. This can provide a visually pleasing effect as a person in the room is surrounded by light.

In an alternative example, there are no lighting elements on the internal support structure.

As also shown on the end surface 4812 of an exterior body 4810, there are fasteners 4815 and openings to additional passages 4814. These additional passages 4814 were also described as additional passages 3413 in FIGS. 34*a*, 34*b*, 34*c*, and 34*d*. It will be appreciated that the fasteners and the openings for the additional passages are located on both end surfaces of each of the exterior bodies 4804, 4807, and 4810.

In an example aspect, the end surface 4805 of the exterior body is shown in a folded position. The fasteners 4815 located towards opposite edges of the end surface are used to hold the end surface in a folded position. In the example shown, the end surface 4805 is flexible about its vertical axis and can be folded. By contrast, the end surface 4812 is shown in an open or unfolded position.

The fasteners can also be used to connect abutting end surfaces to each other. For example, the end surface 4806 of the exterior body 4804 is connected to the end surface 4808 of the exterior body 4807, which are held together by fasteners. The end surface 4809 of the exterior body 4807 is connected to the end surface 4811 of the exterior body 4810, which are held together by fasteners. As shown by the two dotted arrows, the vertical edges of the end surface 4812 can be folded together to form a similar folded position shown by the end surface 4805. This would visually conceal the internal support structure 4803.

In an example aspect, the bottom surface 4816 of the exterior bodies is positioned at a distance h above the floor 4817. This gives the appearance and feel that the room and the walls are floating above the floor 4817.

Although one room is shown in FIG. 48, it will be appreciated that multiple suspended rooms can be setup beside each other.

Figure 49A:
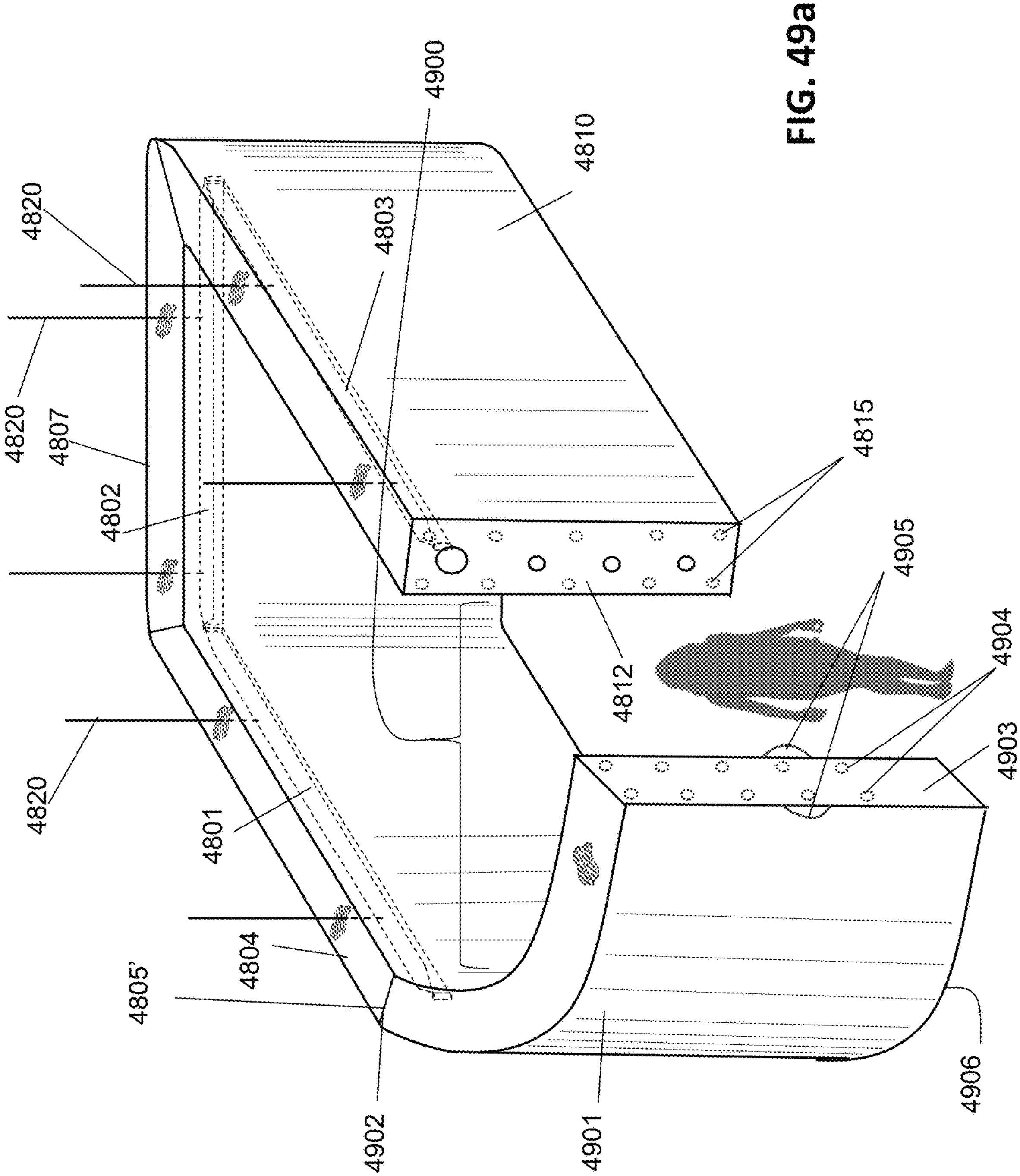
FIG. 49*a* is a perspective view of a partially enclosed room with a flexible door in an open position, and the room is formed from suspended walls that include internal structures.
Figure 49B:
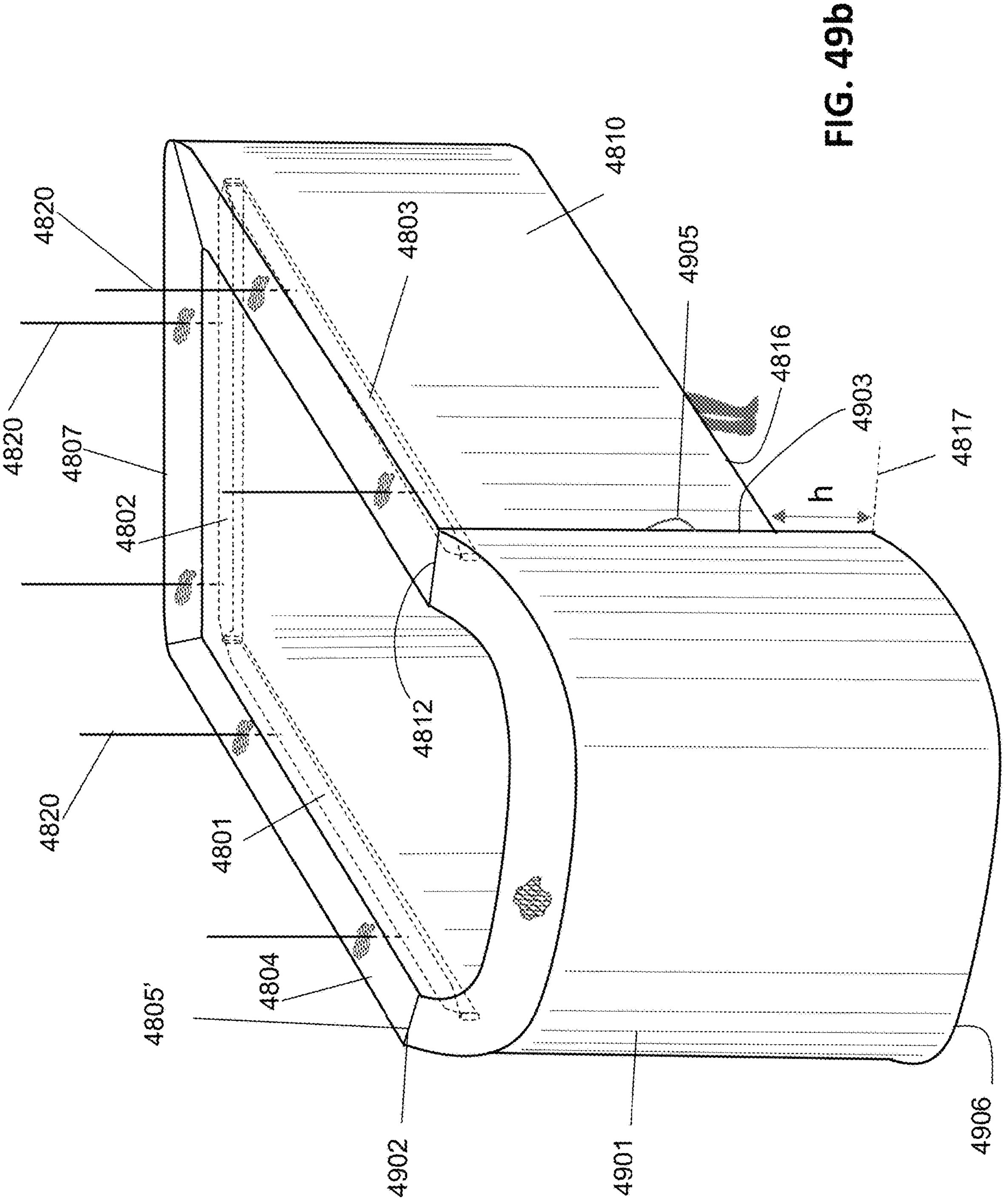
FIG. 49*b* is shows the flexible door in a closed position.

FIGS. 49*a* and 49*b* show a suspended room with a doorway 4900 defined between two suspended walls 4804 and 4810. The door 4901, which is positioned at the doorway 4900, is a flexible wall or partition that connects to the suspended walls. In FIG. 49*a*, the door 4901 is in an open position, and in FIG. 49*b*, the door 4901 is in a closed position. In the example shown, one end surface 4902 of the door 4901 connects to an end surface 4805' of the exterior body 4804. The end surface 4805' shown in FIGS. 49*a* and 49*b* is in an open position, compared to the folded position of the end surface 4805 shown in FIG. 48. The other end surface 4903 of the door 4901 connects to an end surface 4812 of the exterior body 4810. Fasteners 4904 on the end surface 4903 releasably connect to the fasteners 4815 on the end surface 4812. Preferably, the fasteners are magnetic (e.g., magnets, magnetic material, or a combination thereof). However, other types of fasteners can be used. Handles 4905 are positioned on or near the end surface 4903. A person can grasp a handle 4905 to open or close the door.

In the example shown in FIGS. 49*a* and 49*b*, one end surface 4903 of the door releasably connects to the hanging wall section 4810. In another example aspect, another end surface of the door 4902 also releasably connects to the other hanging wall section 4804 using one or more fasteners. In other words, the door 4901 can be opened from both ends.

In an example embodiment, the bottom surface 4906 of the door 4901 stands on the ground 4817. In other words, the door 4901 is unsuspended. In an example embodiment, the door 4901 includes a flexible core that can be compressed and extended along its longitudinal dimension.

The door 4901, for example, includes a core formed from many vertically oriented channels or cells that can compress, stretch and deform. In an example aspect, the door is a “softwall” or a “thinwall” sold by molo design, ltd.

In an alternative example, the door 4901 is formed by multiple rigid panels that are joined by flexible joints, and can flexed relative to each other. In yet another alternative example embodiment, the door is a rigid structure.

Figure 50A:
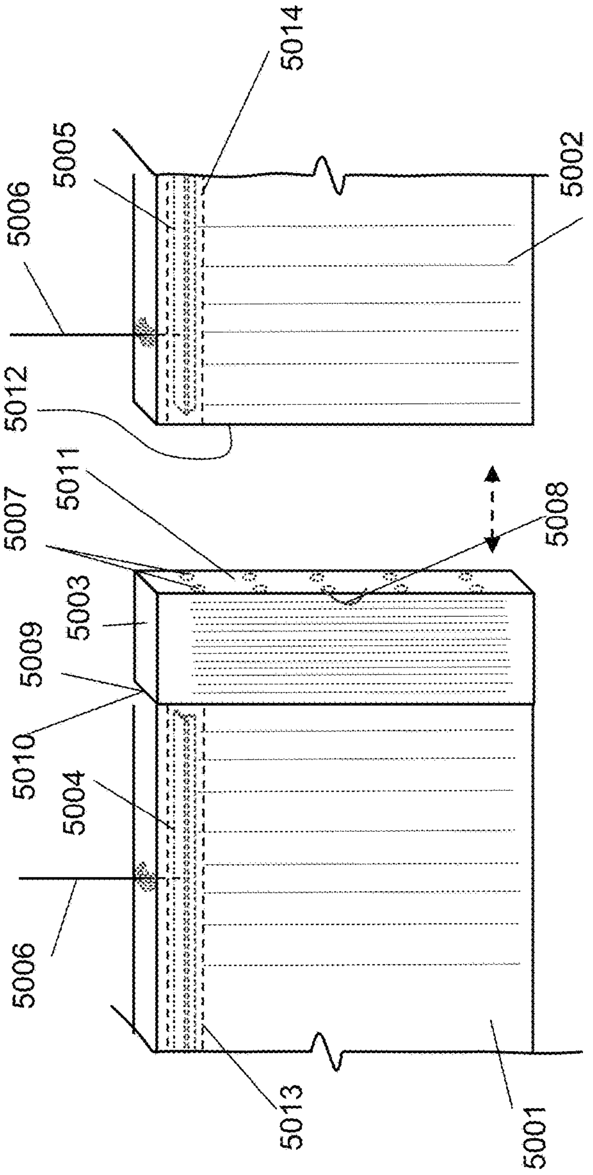
FIG. 50*a* is a perspective view of a flexible door between two suspended walls, and the door is in an open position, according to an example embodiment.
Figure 50B:
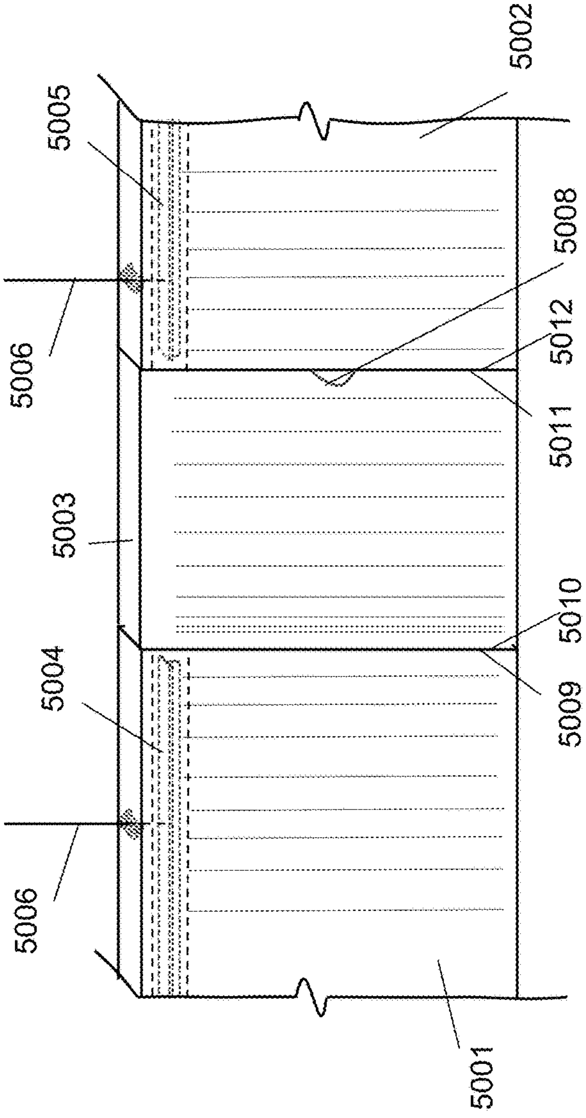
FIG. 50*b* shows the door in a closed position.

Turning to FIGS. 50*a* and 50*b*, two exterior bodies 5001 and 5002, which are hanging walls, are supported by internal support structures 5004 and 5005. The internal support structures 5004 and 5005 are hung by suspension wires 5006 or by another type of suspension structure. In an example aspect, voids 5013 and 5014 or elongate internal passages are defined within the exterior bodies and extend along the length of the exterior bodies. The internal supports 5004 and 5005 are respectively within the voids 5013 and 5014. An end surface 5009 of the exterior body 5001 is connected to an end surface 5010 of a compressible and extendable door 5003. The end surfaces of the exterior bodies 5001, 5002 and the door 5003 include fasteners 5007 that connect the end surfaces together. In an example aspect, one or more fasteners 5007 on the end surface 5011 of the door 5003 removably connects to one or more fasteners on the end surface 5012 of the exterior body 5005. The door 5503 can compress to create an opening, as shown in FIG. 50*a*, or can extend to a closed position, as shown in FIG. 50*b*. In particular, the door includes a core that is expandable and compressible, and the end surface 5010 of the door and the other end surface 5011 of the door move apart from each other as the core expands. Conversely, the end surfaces 5010 and 5011 of the door move towards each other as the core compresses. A handle 5008 is positioned on the door 5003 to open and close the door. In an example embodiment, there is a first handle positioned on the door near the end surface 5011, and there is a second handle positioned on the door near the end surface 5010. In an example embodiment, the bottom surfaces of the exterior bodies and the bottom surface of the door sit on the floor. In another example embodiment, the bottom surfaces of the exterior bodies and the bottom surface of the door are positioned at a distance above the floor.

In an example embodiment, the lighting elements are included on the internal structures 5004 and 5005. In an alternative example embodiment, there are no lighting elements on the internal structures 5004 and 5005.

Figure 56:
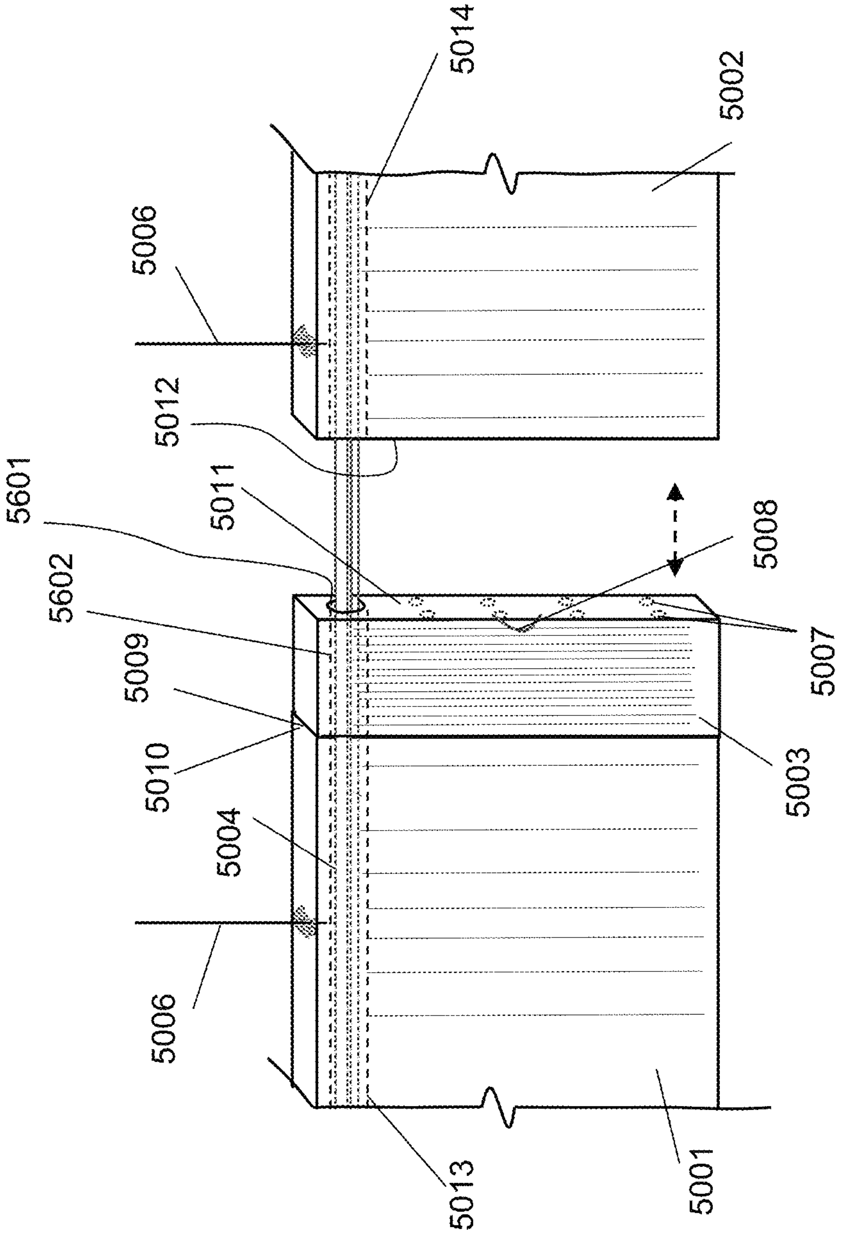
FIG. 56 is a perspective view of a suspended wall with an entranceway defined therein, and a flexible door is suspended in the entranceway, according to an example embodiment.

Turning to FIG. 56, another example embodiment is shown similar to FIGS. 50*a* and 50*b*. However, the door 5003 defines therein a void 5602, or internal passageway, that is aligned with the voids 5013 and 5014. The internal structure 5004 is positioned within the voids 5013, 5602, and 5014. As can be seen in FIG. 56, the opening 5601 of the void 5602 is positioned on the end surface 5011 of the door 5003.

Figure 51:
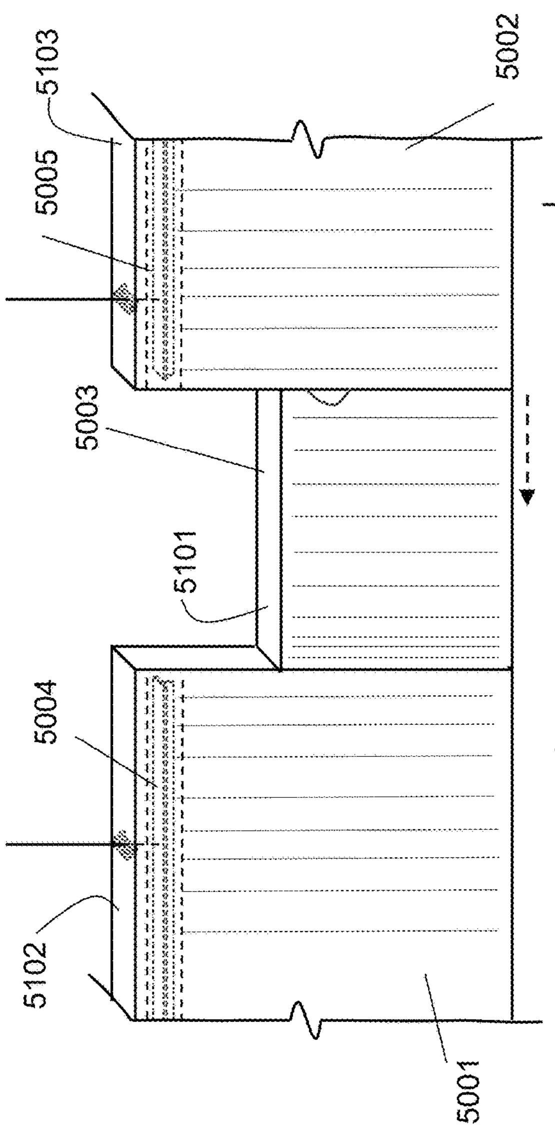
FIG. 51 is a perspective view of a flexible door between two suspended walls, according to an example embodiment.
Figure 52:
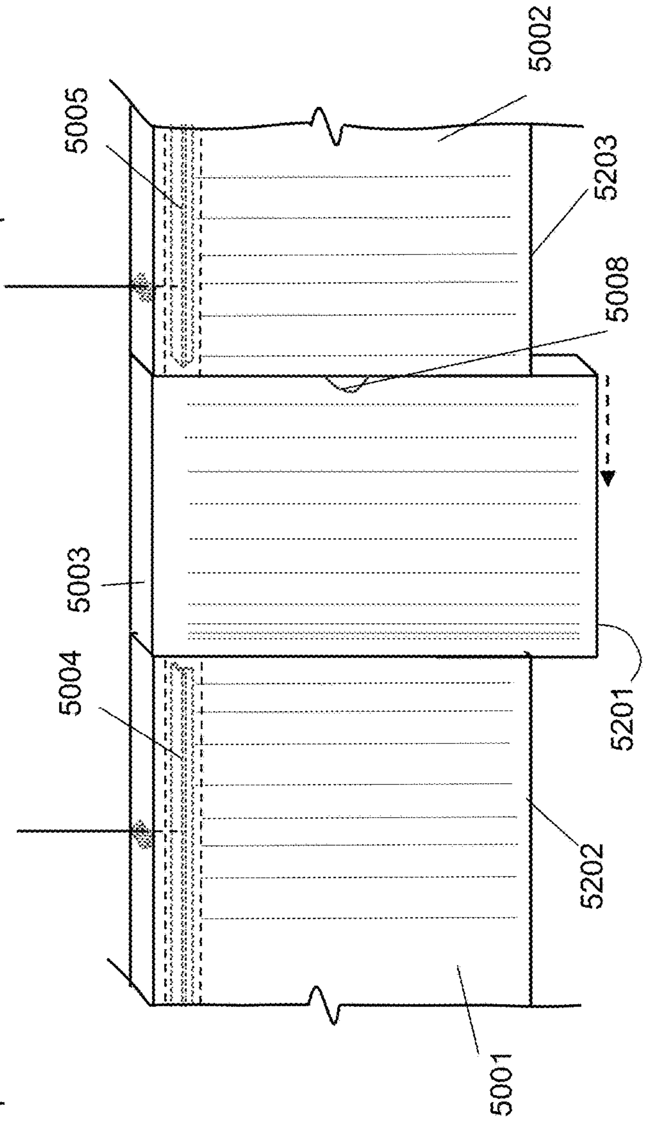
FIG. 52 is a perspective view of a flexible door between two suspended walls, according to another example embodiment.

FIGS. 51 and 52 show similar embodiments to the embodiment shown in FIGS. 50*a* and 50*b*. However, the door in FIG. 51 has a shorter height compared to the exterior bodies. In other words, the top surfaces 5102, 5103 of the exterior bodies is at a taller height compared to the top surface 5101 of the door. In FIG. 52, the bottom surface 5201 of the door is lower than the bottom surfaces 5202, 5203 of the exterior bodies. For example, the bottom surface 5201 of the door sits on a floor, and the bottom surfaces 5202, 5203 of the exterior bodies are positioned at a distance above the floor.

Figure 53:
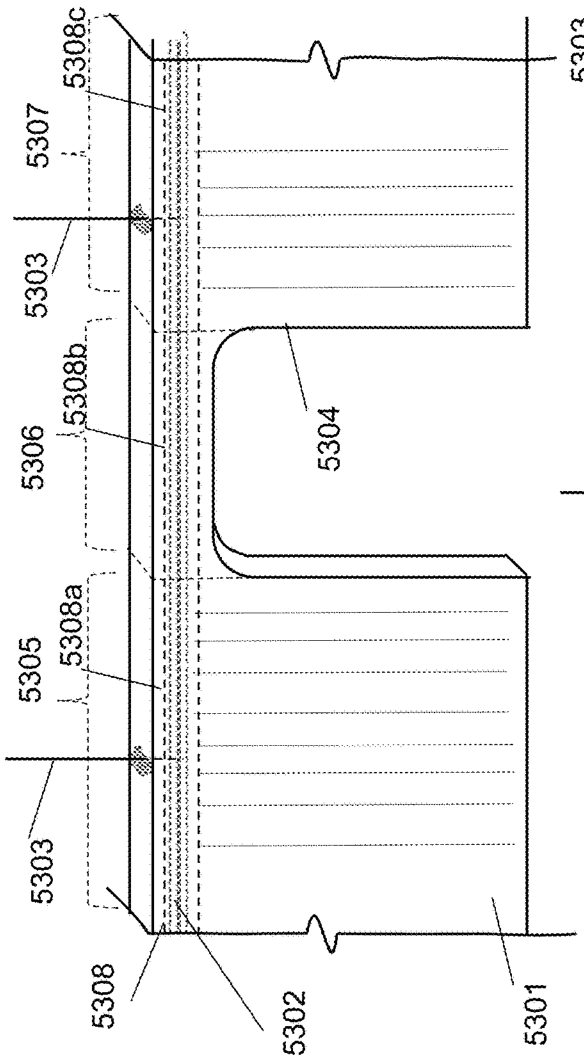
FIG. 53 is a perspective view of a suspended wall with an entranceway defined therein, according to an example embodiment.

Turning to FIG. 53, another example embodiment is shown of a suspended wall 5301 with an entranceway or opening 5304 defined therein. The suspended wall 5301 is similar to the other exterior bodies described above. In particular, the suspended wall 5301 defines therein a longitudinal passageway 5308 (also herein called a void or a longitudinal void) in which there is positioned an internal supporting structure 5302. Suspension structures 5303, such as suspension wires, are connected to the internal supporting structure 5302, and the suspended wall hangs from the internal supporting structure. Lighting elements can be positioned on the internal supporting structure. In an alternative example embodiment, there are no lighting elements.

In an example embodiment, the entranceway 5304 is cut into the suspended wall, below the internal supporting structure 5302. In other words, the exterior body forming the suspended wall includes a unitary core.

In an alternative example embodiment, the suspended wall 5301 is formed from three sections 5305, 5306, 5307 that abut against each another, and each section defines therein a longitudinal internal passageway that are together longitudinally aligned for the internal supporting structure 5302. In other words, the internal passageways 5308*a*, 5308*b*, 5308*c* of each section together form a continuous internal passageway 5308. The section 5306 has a shorter height, so as to form the entranceway. In other words, the bottom surface of section 5306 is significantly higher above the ground, compared to the bottom surfaces of sections 5.05 and 5307, to form the entranceway. In an example aspect, the sections 5305, 5306, 5307 are connected to each other using one or more fasteners at their end surfaces.

Figure 54:
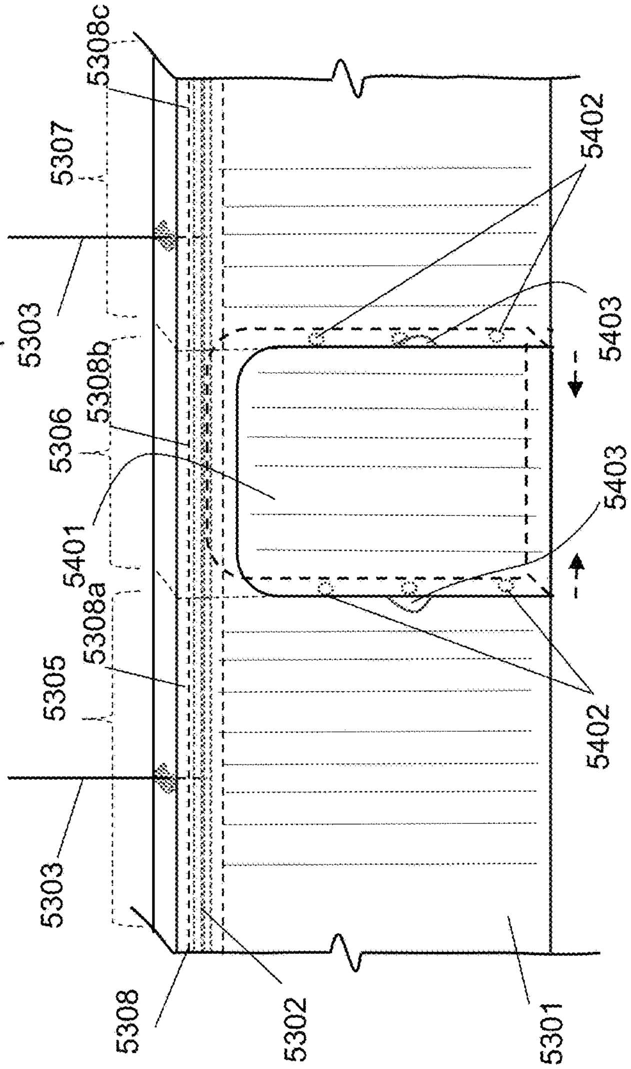
FIG. 54 is a perspective view of a suspended wall with an entranceway defined therein, and including a flexible door positioned at the entranceway, according to an example embodiment.

Turning to FIG. 54, another example embodiment is shown that is similar to the example embodiment of FIG. 53. However, in FIG. 54, a door 5401 is positioned in the entranceway 5304. The door 5401, for example, includes a compressible and expandable core, similar to the doors 4901 and 5003 from the above embodiments. The end surfaces of the door include fasteners 5402 that releasably connect to other fasteners on the end surfaces of the entranceway.

Handles 5403 are positioned on one or both sides of the door 5401, as the door can be opened from the left side or the right side, or both.

Figure 55A:
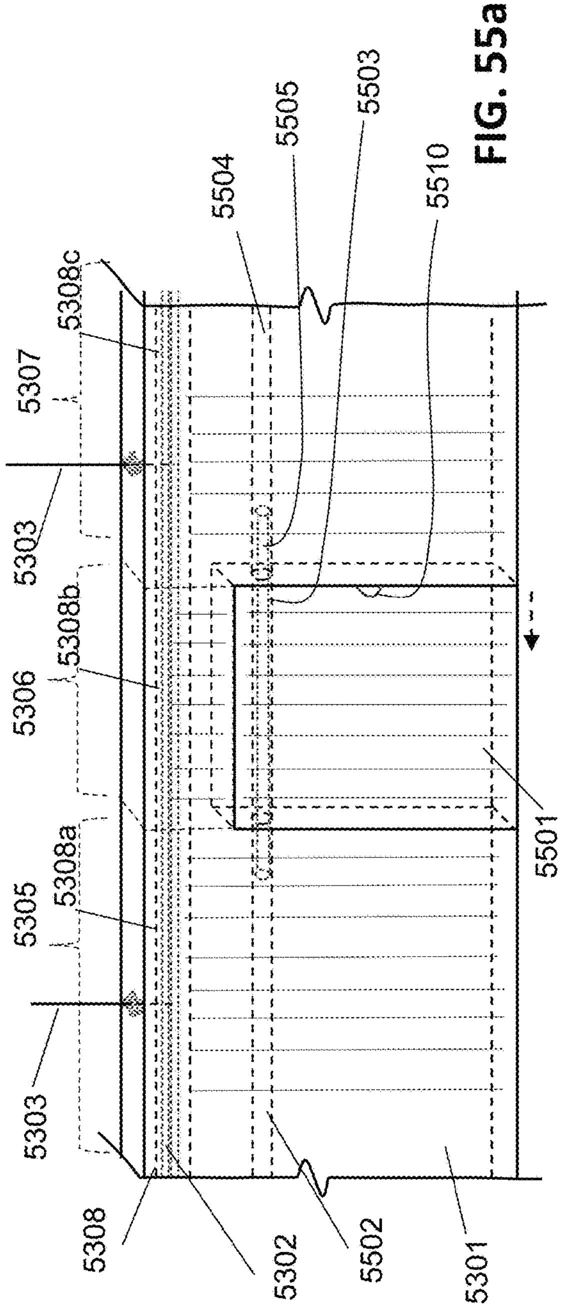
FIG. 55*a* is a perspective view of a suspended wall with an entranceway defined therein and a flexible door is suspended in the entranceway using a second internal structure, according to an example embodiment.
Figure 55B:
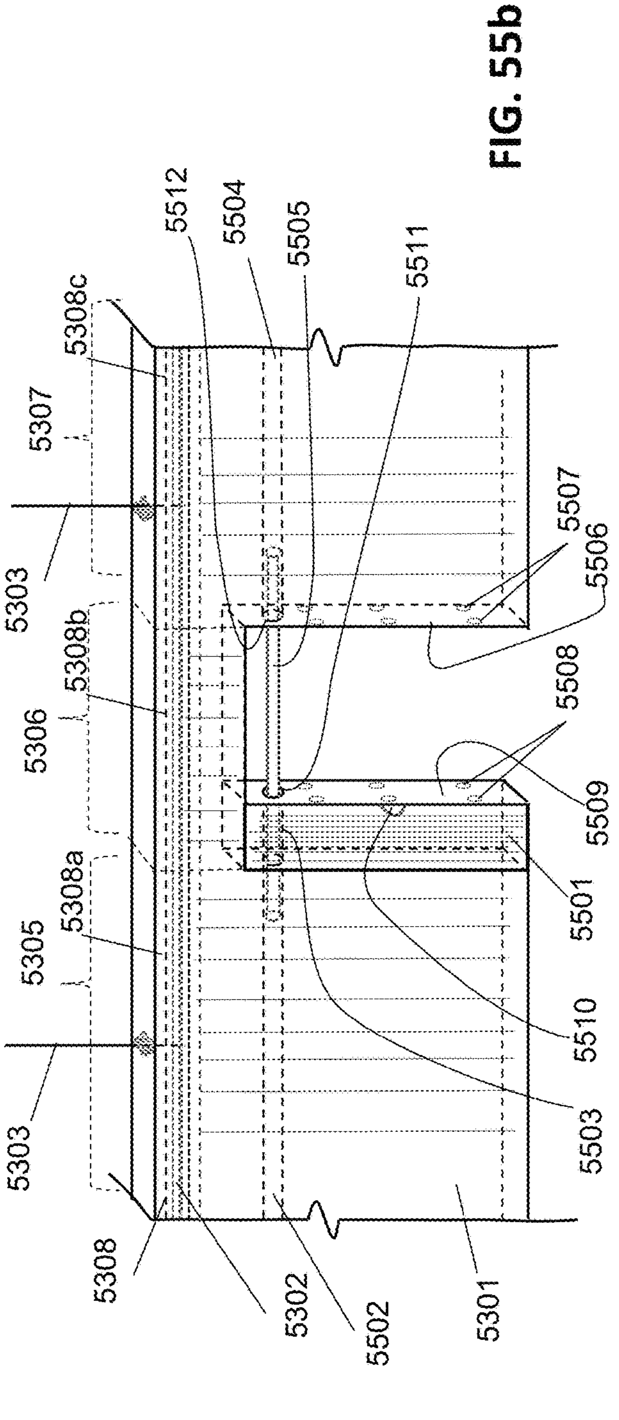
FIG. 55*b* is a perspective view showing the flexible door in an open position.

Turning to FIGS. 55*a* and 55*b*, another example is shown, which is similar to the example embodiment in FIG. 54. However, in the example embodiment in FIGS. 55*a* and 55*b* the door 5501 is suspended by a second internal supporting structure 5505. In particular, a second longitudinal passage 5502, 5503, 5504 is defined in the exterior body and the door. In the section 5305 of the exterior body 5301, there is defined a second longitudinal passage 5502 which is positioned below the longitudinal passage holding the internal supporting structure 5302. In the door 5501, there is defined therein a longitudinal passage 5503. In the section 5307 of the exterior body 5301, there is defined a second longitudinal passage 5504 which is positioned below the longitudinal passage holding the internal supporting structure 5302. The longitudinal passages 5502, 5503, 5504 are longitudinally aligned with each other, and an elongate second internal supporting structure 5505 is positioned in all the passages 5502, 5503, 5504.

As can be seen in FIG. 55*b*, an opening 5511, which leads to the passage 5503, is positioned on the end surface 5509 of the door 5501. The opening 5512, which leads to the passage 5504, is positioned on the end surface 5506 of the section 5307. When the door 5501 is in the closed position, the openings 5511 and 5512 abut against each other.

Also shown in FIG. 55*b*, fasteners 5507 are positioned on the end surface 5506 of the section 5307. Fasteners 5508 are also positioned on the end surface 5509 of the door 5501. The fasteners 5508 and 5507 are releasably connectable to each other. In an example aspect, the fasteners are magnetically attracted to each other. Other types of fasteners can be used. The fasteners hold the door in a closed position.

A handle 5510 is positioned on the door 5501 to open and close the door.

In the closed position, the door 5501 is in an expanded form and covers the entranceway. In the open position, the door 5501 is in a compressed form and opens the entranceway.

It will be appreciated that the suspended or hanging entranceways and doors can be connected to hanging walls or suspended walls, to form a hanging room.

It will also be appreciated that the entranceways and doors shown herein are rectangular. In other example embodiments, different shapes of entranceways or doors, or both, can be used, including arched entranceways or arched doors, or both. In other example embodiments, the entranceways or the doors, or both, are curved. For example, the entranceway or the door, or both, are curved outwards as part of a curved wall. The internal supporting structure, for example, is curved. In another example, the second internal supporting structure is also curved. Preferably, although not necessarily, the longitudinal curvature of the second internal supporting structure matches the longitudinal curvature of the internal supporting structure located above itself.

Figure 57C:
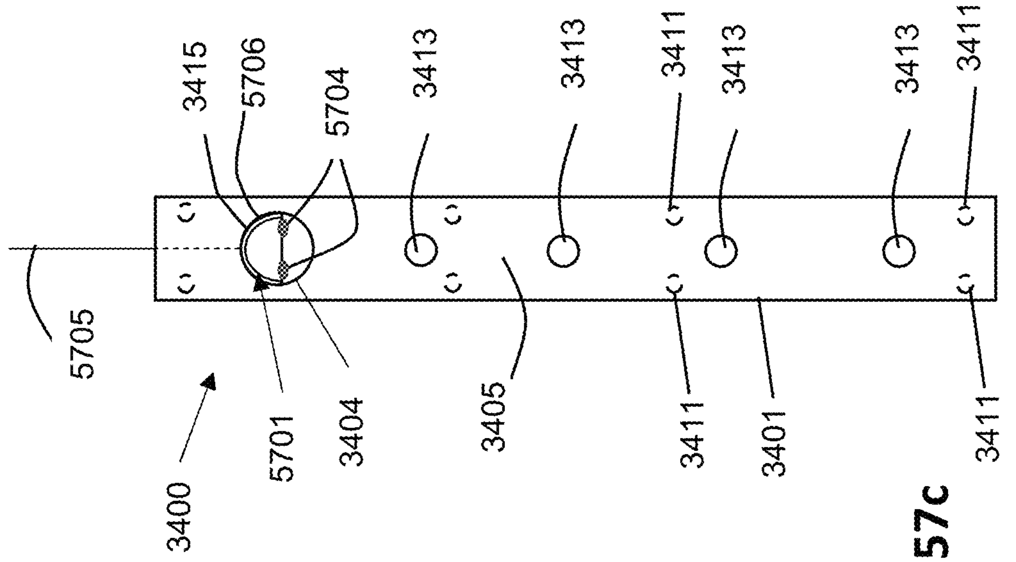
FIG. 57*c* is a side view of a suspended wall with the rounded internal structure positioned within a void defined in the suspended wall.
Figure 57A:
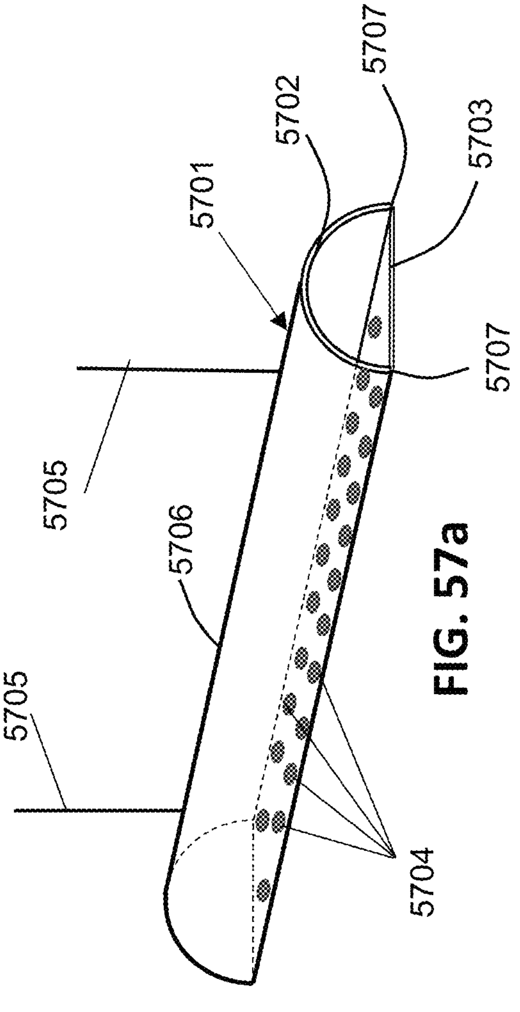
FIG. 57*a* is a perspective view of a rounded internal structure shown in isolation, according to an example embodiment.
Figure 57B:
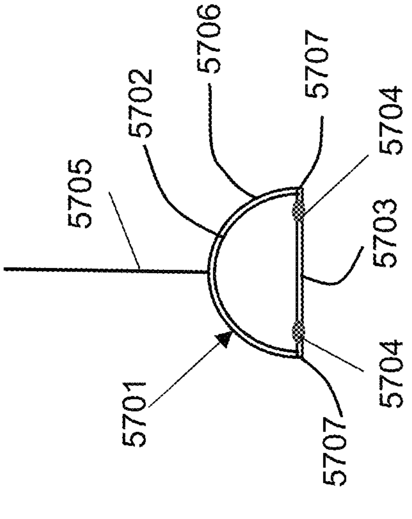
FIG. 57*b* is a side view of the rounded internal structure shown in FIG. 57*a*.

Turning to FIGS. 57*a*, 57*b*, and 57*c*, an example embodiment of another internal structure 5701 is provided. In FIGS. 57*a* and 57*b*, the internal structure 5701 is shown in isolation.

The internal structure 5701 includes a rounded elongate structure 5702 that is rounded along its length. In particular, an outer and upper surface 5706 is rounded. For example, the rounded elongate structure is part of a pipe cut in half along its length. In another example aspect, the rounded elongate structure 5702 is shaped as a horizontal cylindrical segment. It will be appreciated that the outer surface 5706 can have another type of rounded or curved surface, such as a horizontal segment of an ovoid pipe.

The rounded elongate structure 5702 defines two outer edges 5707 that extend along a length of the rounded elongate structure 5702, and an outer surface 5706 defined between the two edges is rounded upwards above the two edges 5707.

A web 5703 spans across the outer edges 5707 of the rounded elongate structure. For example, the web 5703 is a rectangular plate. One or more lights 5704 are positioned along the length of the internal structure 5701, preferably on the web 5703 and oriented to emit light in a downwards direction. For example, the light can be an LED strip, or a series of LED elements.

One or more hanging supports 5705 are attachable or attached at the top of the rounded elongate structure 5702. As best seen in FIG. 57*c*, which shows a side view of an exterior body 3401 of a hanging wall 3400, the hanging supports 5705 extends through the top of the exterior body 3401 to attach to an above structure, such as a beam or a ceiling. The hanging supports 5705, for example, are wires or are rods. It will be appreciated that FIG. 57*c* is similar to the embodiment shown in FIG. 34*b*, but the internal structure 5701 is positioned within the void 3404.

As also seen in FIG. 57*c*, the outer and upper surface 5706 of the rounded elongate structure 5701 has a large surface area that is in contact with the upper surface 3415 that defines the upper portion of the void 3404. In the example shown in FIG. 57*c*, the upper surface 3415 that defines the upper portion of the internal void 3415 forms an arc, such as part of a circle or part of an ovoid shape. And, in a further example aspect, the upper surface 5706 of the rounded elongate structure 5701 has an arc that sits flush within the arc of the upper surface 3415 when viewed from the side, as shown in FIG. 57*c*.

Figure 58C:
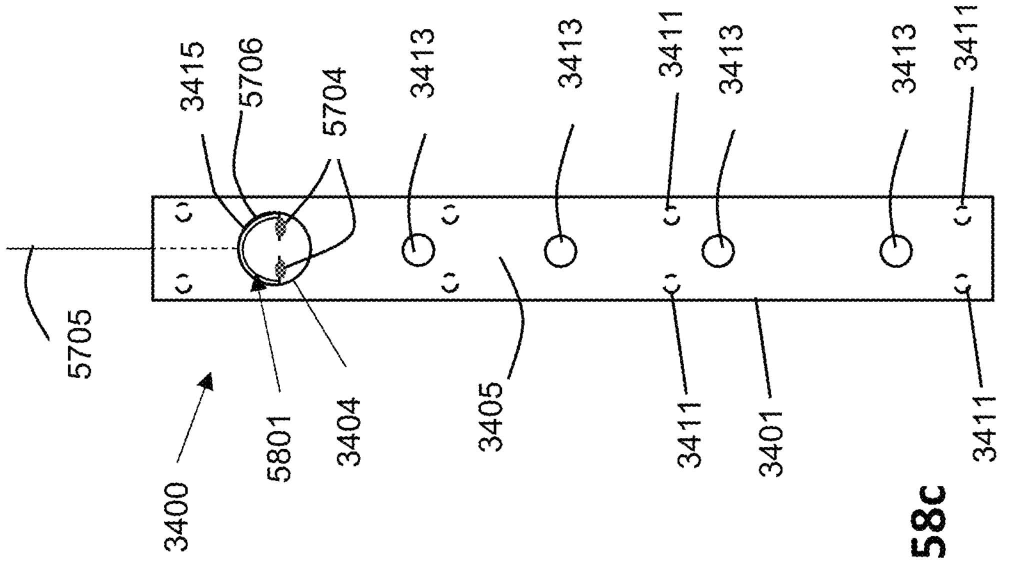
FIG. 58*c* is a side view of a suspended wall with the rounded internal structure shown in FIG. 58*a*, positioned within a void defined in the suspended wall
Figure 58A:
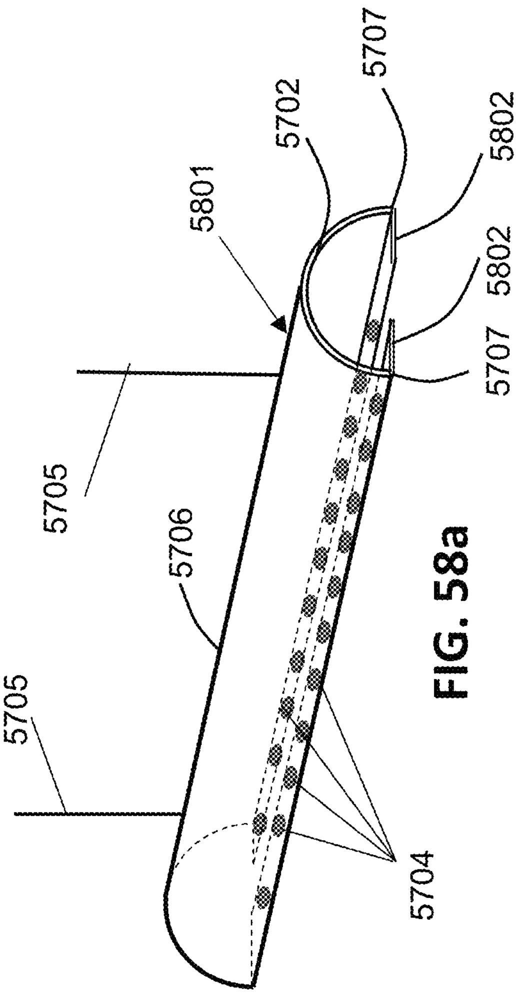
FIG. 58*a* is a perspective view of a rounded internal structure shown in isolation, according to another example embodiment.
Figure 58B:
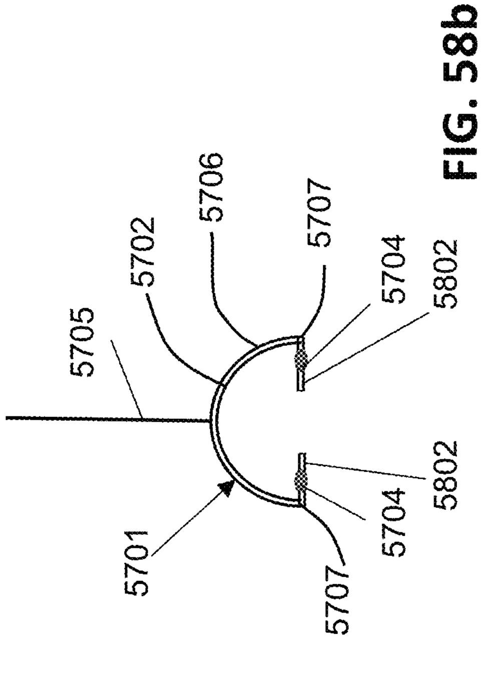
FIG. 58*b* is a side view of the rounded internal structure shown in FIG. 58*a*.

Turning to FIGS. 58*a*, 58*b*, 58*c*, another example embodiment of a rounded elongate structure 5801 is shown, which is similar to the internal structure 5701. However, the rounded elongate structure 5801 further includes two flanges 5802 that respectively extend from the two edges 5707. One or more lights 5704 are positioned on at least one of the two flanges 5802. For example, this makes it easier for a person to access the underside of the rounded elongate structure (e.g., the concave surface).

It will be appreciated that the internal structures 5701 and 5801 can be used to support other types of exterior bodies, not limited to hanging walls. It will also be appreciated that these structures can be used to support hanging rooms.

Below are general example embodiments and example features of the embodiments.

In a general example embodiment, a hanging wall system is provided that comprises: a wall comprising a flexible exterior body defining a void therein and an internal structure, which is separate from the flexible exterior body, is positioned within the void; the void defined by at least an upper surface and the upper surface of the void rests on the internal structure, which supports the flexible exterior body; the internal structure comprising at least a web and a flange extending from the web; and, one or more supports configured for hanging the hanging wall system are connected to the internal structure and extend above a top surface of the flexible exterior body.

In an example aspect of the hanging wall system, the flexible exterior body comprises a translucent material, and one or more lights are positioned along a length of the internal structure and are configured to illuminate the hanging wall system.

In another example aspect of the hanging wall system, the flange and the web form a T-shaped cross-section of the internal structure, and wherein the web protrudes downwards from the flange.

In another example aspect of the hanging wall system, the flexible exterior body comprises a translucent material, and one or more lights are positioned on an underside surface of the flange and are configured to illuminate the hanging wall system.

In another example aspect of the hanging wall system, the flexible exterior body further defines therein one or more additional voids that are positioned below the void which has the internal structure positioned therein; and the one or more additional voids extend longitudinally along the length of the flexible exterior body.

In another example aspect of the hanging wall system, the void and the one or more additional voids are parallel to each other.

In another example aspect of the hanging wall system, a cross section area of the void is larger than a cross sectional area of a given one of the one or more additional voids.

In another example aspect of the hanging wall system, the web protrudes downwards from the flange; the flange defines therein at least a flange hole that extends from a top surface of the flange to a bottom surface of the flange; the web defines therein at least a web hole; the flange hole extends to the web hole; a support line, which forms at least one of the one or more supports, extends through the flange hole and into the web hole; and, an end of the support line is secured to a stopper, which is positioned in the web hole, that stops the end of the support line from slipping through the flange hole.

In another example aspect of the hanging wall system, an area of the web hole and a size of the stopper are larger than the flange hole.

In another example aspect of the hanging wall system, the flexible exterior body comprises a translucent material; one or more lights are positioned on an underside surface of the flange that are configured to illuminate the hanging wall system; and the flange defines therein a hole to pass an electrical wire from the one or more lights upwards through the flange and towards the one or more supports.

In another example aspect of the hanging wall system, the flexible exterior body comprises two end surfaces at opposite ends of the flexible exterior body, and at least one of the two end surfaces comprise one or more fasteners to connect to a second wall in the hanging wall system.

In a general example embodiment, a hanging room system comprises a plurality hanging walls connected in seriatim to form a continuous wall that at least partially encloses a space defined within the hanging room system. Each of the plurality of hanging walls comprises:

- a wall comprising an exterior body defining a void therein and an internal structure, which is separate from the flexible exterior body, is positioned within the void; the void defined by at least an upper surface and the upper surface of the void rests on the internal structure, which supports the exterior body; the internal structure comprising at least a web and a flange extending from the web; and, one or more supports configured for hanging the internal structure are connected to the internal structure and extend above a top surface of the flexible exterior body.

In an example aspect of the hanging room system, at least two of the plurality of hanging walls each comprise an end surface, and the end surface of each one of the two of the plurality of hanging walls abut against each other at an angle.

In another example aspect of the hanging room system, a first given internal structure in a first given hanging wall is positioned at a distance between a second given internal structure in a second given hanging wall.

In another example aspect of the hanging room system, a first given internal structure in a first given hanging wall is connected by a movable joint to a second given internal structure in a second given hanging wall.

In another example aspect of the hanging room system, the movable joint connects an end portion of the first given internal structure to an end portion of the second given internal structure, and the end portion of the first given internal structure tapers in width to the moveable joint, and the end portion of the second given internal structure tapers in width to the movable joint.

In another example aspect of the hanging room system, at least a given internal structure is curved along its length.

In another example aspect of the hanging room system, at least a given internal structure is straight along its length.

In another example aspect of the hanging room system, at least a given exterior body of the plurality of hanging walls comprises a translucent material; one or more lights are positioned on a given internal structure located within the given exterior body; and, the one or more lights are configured to illuminate the given exterior body.

In another example aspect of the hanging room system, the exterior body of each one of the plurality of hanging walls comprises a flexible core that is compressible and expandable.

In another example aspect of the hanging room system, the system further comprises a door that sits on a ground surface and is positioned between two given hanging walls, and wherein the door opens and closes an entranceway to the space defined within the hanging room system.

In another example aspect of the hanging room system, an end surface of the door comprises one or more fasteners that are releasably connectable to one or more complimentary fasteners positioned on an end surface of at least one of the two given hanging walls.

In another example aspect of the hanging room system, the system further comprises a door that is positioned between two given hanging walls and opens and closes an entranceway to the space defined within the hanging room system, and the door comprises a flexible core that is compressible and expandable.

In another example aspect of the hanging room system, each of the two given hanging walls further define therein a second longitudinal void; the door has defined therein a longitudinal void; a second internal structure is positioned within and extends along the longitudinal void of the door aligns and the second longitudinal void of each of the two given hanging walls; and the door hangs from the second internal structure.

In another general example embodiment, a hanging wall system comprises:

- a wall comprising an exterior body defining therein a void extending along a length of the exterior body, and an internal structure, which is separate from the exterior body, is positioned within the void; the void positioned in an upper portion of the wall; the void defined by at least an upper surface and the upper surface of the void rests on the internal structure, which supports the exterior body; the exterior body comprising a translucent material; one or more lights are positioned on the internal structure to illuminate the exterior body; and, one or more supports configured for hanging the hanging wall system are connected to the internal structure and extend above a top surface of the exterior body.

In an example aspect of the hanging wall system, the exterior body comprises a core that is compressible and expandable; and the length of the exterior body is configured to shorten and expand along the internal structure.

In a general example embodiment, a hanging doorway system comprises: a first hanging wall section and a second hanging wall section in spaced relation to each other and defining a doorway therebetween, and a door positioned in the doorway;

the first hanging wall section comprising a first exterior body defining a first void therein and a first internal structure, which is separate from the first exterior body, is positioned within the first void; the first void defined by at least a first upper surface and the first upper surface of the first void rests on the first internal structure, which supports the first exterior body; one or more first supports configured for hanging the first hanging wall section are connected to the first internal structure and extend above a first top surface of the first exterior body; and the first exterior body comprising a first end surface;

the second hanging wall section comprising a second exterior body defining a second void therein and a second internal structure, which is separate from the second exterior body, is positioned within the second void; the second void defined by at least a second upper surface and the second upper surface of the second void rests on the second internal structure, which supports the second exterior body; one or more second supports configured for hanging the second hanging wall section are connected to the second internal structure and extend above a second top surface of the second exterior body; and the second exterior body comprising a second end surface; and, the door comprising a core that is configured to expand and compress along a length of the core, and the door further comprising a first end surface of the door and a second end surface of the door that move apart from each other as the core expands and that move towards each other as the core compresses.

In an example aspect of the hanging doorway system, the system further comprises one or more first fasteners configured to releasably connect the first end surface of the door to the first end surface of the first hanging wall section.

In another example aspect of the hanging doorway system, the system further comprises one or more second fasteners configured to releasably connect the second end surface of the door to the second end surface of the second hanging wall section.

In another example aspect of the hanging doorway system, the first exterior body comprises a translucent material, and one or more first lights are positioned along a length of the first internal structure and are configured to illuminate the first hanging wall section; and the second exterior body comprises the translucent material, and one or more second lights are positioned along a length of the second internal structure and are configured to illuminate the second hanging wall section.

In a general example embodiment, a lighting system includes: an exterior body defining a void therein and an internal structure positioned within the void; the internal structure comprising at least a web and a flange extending from the web, and one or more lights positioned along the length of the web; and the internal structure supports the exterior body.

In an example aspect, the exterior body comprises a bottom surface having holes for light to pass through.

In another example aspect, the flange is a lower flange relative to the web.

In another example aspect, the lower flange is translucent.

In another example aspect, the lower flange is opaque.

In another example aspect, the internal structure further comprises an upper flange extending from the web.

In another example aspect, the upper flange is opaque.

In another example aspect, at least a lower surface of the upper flange is textured.

In another example aspect, at least the lower surface of the upper flange is powder coated.

In another example aspect, at least the lower surface of the upper flange is reflective.

In another example aspect, the upper flange is translucent.

In another example aspect, the upper flange is a same color or a similar color as the exterior body.

In another example aspect, the lower flange is a same color or a similar color as the exterior body.

In another example aspect, the internal structure is an elongate beam that comprises the web and the flange, and the web and the flange are made of metal.

In another example aspect, the web and the flange are curved to form a curved internal structure.

In another example aspect, the curved internal structure is ring-shaped.

In another example aspect, there are multiple lights positioned on one side of the web and there are multiple lights positioned on an opposite side of the web.

In another example aspect, the number of lights positioned on the one side of the web is greater than the number of lights positioned on the opposite side of the web.

In another example aspect, the internal structure is a ring-shaped internal structure, and the one side of the web faces outwards on the ring-shaped internal structure and the opposite side of the web faces inwards on the ring-shaped internal structure.

In another example aspect, the number of lights positioned on the one side of the web is equal to the number of lights positioned on the opposite side of the web.

In another example aspect, there are at least two rows of lights positioned on the one side of the web and there are at least two rows of lights positioned on the opposite side of the web.

In another example aspect, there are two rows of lights positioned on the one side of the web and there is one row of lights positioned on the opposite side of the web.

In another example aspect, the upper flange has a greater width than the lower flange.

In another example aspect, the upper flange has a greater length than the lower flange.

In another example aspect, the upper flange and the web have the same length.

In another example aspect, the internal structure further comprises a second flange extending from the web and positioned on the web opposite to the flange.

In another example aspect, one of the flange and the second flange are opaque, the other one of the flange and the second flange is translucent.

In another example aspect, both the flange and the second flange are opaque.

In another example aspect, both the flange and the second flange are translucent.

In another example aspect, the web and one of the flange and the second flange are a unitary structure, and the other one of the flange and the second flange is attached to the unitary structure.

In another example aspect, both the flange and the second flange are horizontally oriented relative to the web.

In another example aspect, at least one of the flange and the second flange are curved about a longitudinal axis defined by the web.

In another example aspect, at least one of the flange and the second flange are angled more than 90 degrees relative to the web.

In another example aspect, at least one of the flange and the second flange are angled less than 90 degrees relative to the web.

In another example aspect, the web is translucent.

In another example aspect, the web is transparent.

In another example aspect, the web is opaque.

In another example aspect, an inner surface of the exterior body rests on the flange, the inner surface defining part of the void.

In another example aspect, the flange and the web form an L-shaped cross-section of the internal structure.

In another example aspect, the flange and the web form a T-shaped cross-section of the internal structure.

In another example aspect, one or more lines are attached to the internal structure to hang the lighting system.

In another example aspect, multiple ones of the internal structure are positioned within the void of the exterior body.

In another example aspect, the multiple internal structures are angled relative to each other.

In another example aspect, the multiple internal structures are arranged in a line and the exterior body covers the length of the line.

In another general example embodiment, a lighting system comprises: an exterior body defining a void therein and an elongate internal structure positioned within the void; the internal structure comprising a web, an upper flange that is opaque and extends outwards on both sides of the web, a lower flange that is translucent and extends outwards on both sides of the web, and lights positioned on both sides of the web; and the internal structure supports the exterior body.

In an example aspect, the upper flange has a greater width than the lower flange.

In another example aspect, the upper flange has a greater length than the lower flange.

In another example aspect, the web and the upper flange are a metal structure.

In another example aspect, the metal structure is powder coated.

In another example aspect, the exterior body, the web, the upper flange and the lower flange are of a similar color.

In another example aspect, the exterior body has holes located on its top surface and holes located on its bottom surface.

In another general example embodiment, a lighting system comprises: a circular exterior body defining a circular void therein with a circular internal structure and an outer ring positioned within the circular void; the circular internal structure comprising a web and a flange and lights positioned on the web; the outer ring having a larger diameter than the circular internal structure with multiple lines that extend radially from the circular internal structure to the outer ring; and the circular internal structure and the outer ring support the circular exterior body.

In an example aspect, the flange is a lower flange that extends radially outwards from the web.

In another example aspect, the lower flange is opaque.

In another example aspect, multiple lights are positioned on an outward facing surface of the web and multiple lights are positioned on an inward facing surface of the web.

In another example aspect, the number of the multiple lights positioned on the outward facing surface of the web is greater than the number of the multiple lights positioned on the inward facing surface of the web.

In another example aspect, the outer ring comprises multiple rods joined together at their ends by joints.

In another example aspect, the multiple lines respectively extend between the joints and the circular internal structure.

In another example aspect, the rods are resiliently flexible to form a curved section of the outer ring and, in a relaxed state, each of the rods are straight.

In another example aspect, the rods are carbon fiber rods.

In another example aspect, there are three rods that are joined together by three joints.

In another example aspect, the joints are rigid tubes that have hollow ends, and a given joint has inserted into it ends of two given rods.

In another example aspect, the outer ring comprises a single rod structure.

In another general example embodiment, a lighting system includes at least two elongate structures positioned within the void and connected in seriatim with each other at the ends with a movable joint. Each of the internal structures comprising at least a web and a flange extending from the web, and one or more lights positioned along the length of the web; and each of the internal structures support the exterior body.

In an example aspect, the lighting system further includes an exterior body defining a void therein and the at least two elongate structures are positioned within the void.

In another example aspect, the exterior body is flexible and flexes around the movable joint.

In another example aspect, the movable joint is a hinge.

In another general example embodiment, a kit of parts for a lighting system includes an expandable exterior body defining a void therein. The kit also includes an internal structure comprising at least a web and a flange extending from the web, and one or more lights positioned along the length of the web. In assembly, the internal structure is positioned within the void of the expandable exterior body and the internal structure supports the exterior body.

The kit of parts can be for the parts described above to form one or more of a hanging wall, a hanging room, a hanging doorway, and a hanging light. More generally, the parts of the different embodiments described herein can be provided as a kit and assembled to form the embodiments described herein.

Various features described herein from different example embodiments can be combined together, although such combinations have not been explicitly described. For example, the different types of flanges can be combined together to form different configurations of internal support structures. Different types of internal support structures can be combined with different types of exterior bodies to form different lighting systems.

It will be appreciated that the particular example embodiments shown in the figures and described above are for illustrative purposes only and many other variations can be used according to the example embodiments described herein. Although the above has been described with reference to specific example embodiments, various modifications thereof will be apparent to those skilled in the art as outlined in the appended claims.

The invention claimed is:

1. A lighting apparatus comprising:

a circular exterior body defining a circular void therein with a circular internal structure and an outer ring positioned within the circular void; the circular internal structure comprising a plurality of lights positioned thereon; the outer ring having a larger diameter than the circular internal structure with a plurality of lines that extend radially from the circular internal structure to the outer ring, wherein the outer ring comprises a plurality of rods joined together at their ends by a plurality of joints; and the circular internal structure and the outer ring support the circular exterior body.

2. The lighting apparatus of claim 1 wherein the circular internal structure comprises a web and a flange, the plurality of lights are positioned on the web, and the flange is a lower flange that extends radially outwards from the web.

3. The lighting apparatus of claim 2 wherein the lower flange is opaque.

4. The lighting apparatus of claim 1 wherein the circular internal structure comprises a web and a flange, a first set of the plurality of lights are positioned on an outward facing surface of the web and a second set of the plurality of lights are positioned on an inward facing surface of the web.

5. The lighting apparatus of claim 4 wherein a number of the first set of the plurality of lights positioned on the outward facing surface of the web is greater than a number of the second set of the plurality of lights positioned on the inward facing surface of the web.

6. The lighting apparatus of claim 1 wherein the circular internal structure comprises a web and a flange; the plurality of lights are positioned on the web; the flange of the circular internal structure is a lower flange that extends radially outwards from the web; at least a portion of the plurality of lights are positioned on an outward facing surface of the web; and the circular internal structure further comprises two ends, a split formed between the two ends, and the two ends are securable together.

7. The lighting apparatus of claim 1 wherein the plurality of lines respectively extend between the plurality of joints and the circular internal structure.

8. The lighting apparatus of claim 1 wherein the plurality of rods are resiliently flexible to form a curved section of the outer ring and, in a relaxed state, each of the rods are straight.

9. The lighting apparatus of claim 8 wherein the plurality of rods are carbon fiber rods.

10. The lighting apparatus of claim 1 wherein the outer ring comprises three rods that are joined together by three joints.

11. The lighting apparatus of claim 1 wherein the joints are rigid tubes that have hollow ends, and a given joint has inserted into it ends of two given rods.

12. The lighting apparatus of claim 1 wherein: the plurality of rods are resiliently flexible; the plurality of lines respectively extend between the plurality of joints and the circular internal structure; and a plurality of hanging lines further extend from and pull up on the plurality of joints to hang the lighting apparatus.

13. The lighting apparatus of claim 12 wherein: the circular exterior body rests on the plurality of the rods; and each of the plurality of rods sags between the plurality of joints.

14. The lighting apparatus of claim 13 wherein the circular exterior body is flexed to form a circle and the lighting apparatus comprises a plurality of undulations.

15. The lighting apparatus of claim 12 wherein at least a given one of the plurality of hanging lines and a given one of the plurality of lines form a given single line that is threaded through a hole in a given one of the plurality of joints.

16. A kit of parts for a lighting apparatus comprising:

a circular exterior body defining a circular void;

a circular internal structure comprising a plurality of lights positioned thereon;

an outer ring comprising a larger diameter than the circular internal structure, and wherein the outer ring comprises a plurality of rods joined together at their ends by a plurality of joints;

a plurality of lines; and, in assembly of the lighting apparatus, the circular internal structure and the outer ring are positioned within the circular void with the plurality of lines assembled to extend radially from the circular internal structure to the outer ring, and the circular internal structure and the outer ring support the circular exterior body.

17. The kit of parts of claim 16 wherein the circular internal structure comprises a web and a flange, the plurality of lights are positioned on the web, and the flange of the circular internal structure is a lower flange that extends radially outwards from the web.

18. The kit of parts of claim 17 wherein the lower flange is opaque.

19. The kit of parts of claim 16 wherein the circular internal structure comprises a web and a flange, a first set of the plurality of lights are positioned on an outward facing surface of the web and a second set of the plurality of lights are positioned on an inward facing surface of the web.

20. The kit of parts of claim 19 wherein a number of the first set of the plurality of lights positioned on the outward facing surface of the web is greater than a number of the second set of the plurality of lights positioned on the inward facing surface of the web.

21. The kit of parts of claim 16 wherein the circular internal structure comprises a web and a flange; the plurality of lights are positioned on the web; the flange of the circular internal structure is a lower flange that extends radially outwards from the web; at least a portion of the plurality of lights are positioned on an outward facing surface of the web; and the circular internal structure further comprises two ends, a split formed between the two ends, and the two ends are securable together.

22. The kit of parts of claim 16 wherein the plurality of lines respectively extend between the plurality of joints and the circular internal structure.

23. The kit of parts of claim 16 wherein the plurality of rods are resiliently flexible and, in assembly, form a curved section of the outer ring and, in a relaxed state, each of the plurality of rods are straight.

24. The kit of parts of claim 23 wherein the plurality of rods are carbon fiber rods.

25. The kit of parts of claim 16 wherein the outer ring comprises three rods that are joined together by three joints.

26. The kit of parts of claim 16 wherein the plurality of joints are rigid tubes that comprise hollow ends, and a given joint has inserted into it ends of two given rods.

27. The kit of parts of claim 16 wherein the circular body is collapsible and expandable and, in assembly, is flexed to form a circle.

28. The kit of parts of claim 16 wherein the circular internal structure comprises a set of ends that, in assembly, define a gap between the set of ends or overlap each other to form a continuous circle.

29. A lighting apparatus comprising:

a circular exterior body defining a circular void therein with a circular internal structure and an outer ring positioned within the circular void;

the circular internal structure comprising a web and a flange and a plurality of lights positioned on the web;

the outer ring having a larger diameter than the circular internal structure with a plurality of lines that extend radially from the circular internal structure to the outer ring, the outer ring comprising a plurality of rods that are resiliently flexible and that are joined together by a plurality of joints positioned between the plurality of rods, and the plurality of lines respectively extend between the plurality of joints and the circular internal structure;

a plurality of hanging lines extend from and pull up on the plurality of joints to hang the lighting apparatus, and the plurality of hanging lines extend above a top surface of the circular exterior body; and the circular internal structure and the outer ring support the circular exterior body.

30. The lighting apparatus of claim 29 wherein the circular exterior body rests on the plurality of the rods; and each of the plurality of rods sags between the plurality of joints.

31. The lighting apparatus of claim 29 wherein each of the plurality of joints comprises: a tube with hollow ends that each receive an end of two given rods of the plurality of rods, and a hole is positioned through the tube and orthogonal to a major axis of the tube.

32. The lighting apparatus of claim 31 further wherein a single given wire forms a given hanging line of the plurality of hanging lines and a given line of the plurality of lines, and the single given wire is threaded through the hole in a given joint.

33. A lighting apparatus comprising:

a circular exterior body defining a circular void therein with a circular internal structure and an outer ring positioned within the circular void;

the circular internal structure comprising a web and a lower flange that extends radially outwards from the web and a plurality of lights positioned on the web;

the outer ring having a larger diameter than the circular internal structure, and the outer ring comprising a plurality of joints;

a plurality of connection pieces that extend radially from the circular internal structure to the outer ring;

a plurality of hanging lines extend from and pull up on the plurality of joints to hang the lighting apparatus, and the plurality of hanging lines extend above a top surface of the circular exterior body; and the circular internal structure and the outer ring support the circular exterior body.

34. The lighting apparatus of claim 33 wherein each of the plurality of connection pieces is a wire, and each of the wires is threaded through a hole in a respective one of the plurality of joints and extends upwards to form each of the respective plurality of hanging lines.

35. The lighting apparatus of claim 33 wherein the outer ring further comprises a plurality of resiliently flexible carbon fiber rods that form a curved section of the outer ring and are joined together using the plurality of joints.

36. The lighting apparatus of claim 33 wherein the plurality of joints comprises three joints, and the outer ring further comprises three resiliently flexible rods that are flexed to form the outer ring and are joined together with the three joints positioned between the three resiliently flexible rods; wherein the circular exterior body rests on the three resiliently flexible rods, and each of the three resiliently flexible rods sags between the plurality of joints.

* * * * *